United States Patent [19]
Maeda et al.

[11] Patent Number: 6,014,765
[45] Date of Patent: Jan. 11, 2000

[54] DATA TRANSMISSION APPARATUS AND METHOD

[75] Inventors: Yasutoshi Maeda; Katsuya Mitsutake; Koh Kamizawa; Yuji Kozawa; Takanori Hisanaga; Ichiro Yamashita, all of Kanagawa, Japan

[73] Assignee: Fuji Xerox Co., Ltd., Tokyo, Japan

[21] Appl. No.: 08/872,104

[22] Filed: Jun. 10, 1997

[30] Foreign Application Priority Data

Jun. 12, 1996 [JP] Japan ................................. 8-150551

[51] Int. Cl.[7] .............................. G08C 25/02; H04L 1/18
[52] U.S. Cl. ........................................... 714/748; 714/749
[58] Field of Search .................................. 714/748, 749, 714/750, 751, 797

[56] References Cited

U.S. PATENT DOCUMENTS

| | | | |
|---|---|---|---|
| 5,608,738 | 3/1997 | Matsushita | 714/758 |
| 5,617,333 | 4/1997 | Oyamada et al. | 395/200.77 |
| 5,629,948 | 5/1997 | Hagiwara et al. | 714/750 |
| 5,638,384 | 6/1997 | Hayashi et al. | 714/758 |

FOREIGN PATENT DOCUMENTS 63-46032  2/1988  Japan.
4-107660  4/1992  Japan.

*Primary Examiner*—Emmanuel L. Moise
*Attorney, Agent, or Firm*—Oliff & Berridge, PLC

[57] ABSTRACT

A data transmission apparatus having a storage device for storing at least one structure data piece of a data processing device in a receiving data processing apparatus, a computation device for computing a transmission error detection code from the structure data stored in the storage device and a device for attaching the transmission error detection code computed by the computation device to the structure data stored in the storage device. The data transmission apparatus further includes a transmitter for transmitting the structure data to which the transmission error detection code is attached to a receiving apparatus, a receiver for receiving a retransmission request for each structure data piece returned from the receiving apparatus when a transmission error is detected based on the transmission error detection code and structure data transmitted by the transmitter, and a device for responding to the restransmission request for each structure data piece received by the reception means by retransmitting the corresponding structure data piece to the receiving apparatus.

32 Claims, 62 Drawing Sheets

FIRST BASIC CONFIGURATION OF THE INVENTION

CHARACTERISTICS OF DATA

APPARATUS CONFIGURATION OF
CONVENTIONAL TRANSMISSION SERVICE

RELATIONSHIP BETWEEN THROUGHPUT AND PROPAGATION DELAY

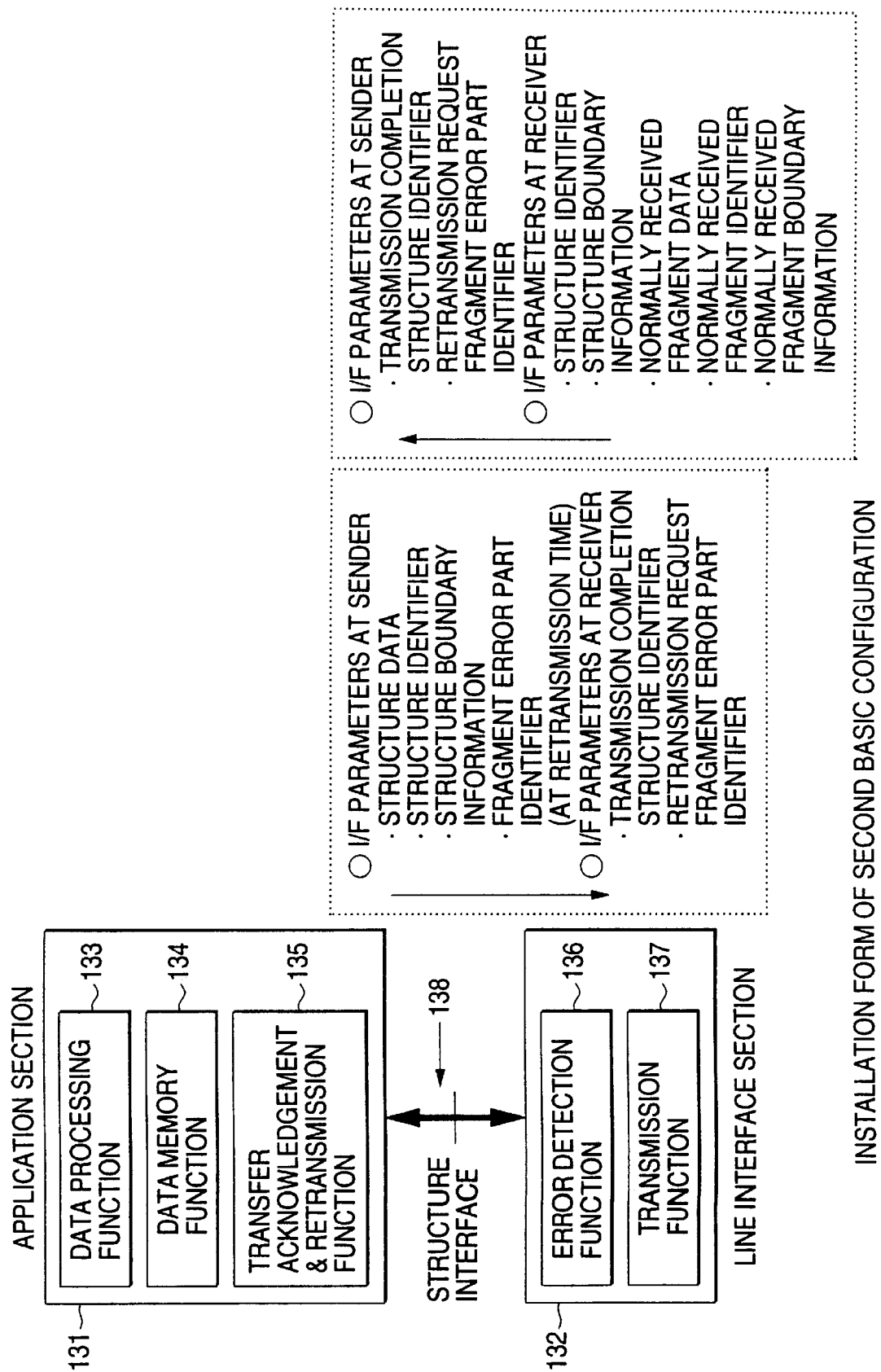

FIG. 15

EXAMPLES OF PROCESSING

- IMAGE PROCESSING EXAMPLES:
  QUALITY ENHANCEMENT OF RASTER IMAGE, CONVERSION OF RASTER IMAGE
  COMPRESSION AND DECOMPRESSION OF VIDEO AND RASTER IMAGES

- IMAGE SYNTHESIS PROCESSING EXAMPLES:
  PRINT IMAGE CREATION AND SYNTHESIS
  CG, ANIMATION IMAGE CREATION AND SYNTHESIS

- NUMERICAL SIMULATION PROCESSING EXAMPLES:
  COMPUTATION FOR WEATHER FORECASTING
  COMPUTATION FOR FLUID MECHANICS

- INFORMATION RETRIEVAL AND ANALYSIS PROCESSING EXAMPLES:
  REMOTE SENSING IMAGE RETRIEVAL AND ANALYSIS
  RDB INFORMATION RETRIEVAL

EXAMPLE 1 FOR SHOWING COORDINATE AXES

EXAMPLE 2 FOR SHOWING COORDINATE AXES

EXAMPLE FOR HOLDING DATA IN ARRAY

EXAMPLE WHEREIN DATA BOUNDARY IS INDICATED BY DELIMITER

Header    "Interpress / Xerox / 3.0 "BEGIN {preamble 0} {page 1} {page 2 {.....SHOW....} ....} {page 3} END

WHOLE CONFIGURATION OF EMBODIMENT

ILLUSTRATION OF FILE, STRUCTURE AND STRUCTURE DATA

EXAMPLE OF STRUCTURE FRAME

EXAMPLE OF STRUCTURE IDENTIFIERS AND
STRUCTURE BOUNDARY INFORMATION

EXAMPLE 1 OF ADDITION OF ERROR DETECTION CODE TO STRUCTURE FRAME

EXAMPLE 2 OF ADDITION OF ERROR DETECTION CODE TO STRUCTURE FRAME

FIG. 28

EXAMPLE 1 OF FORMAT OF INFORMATION MEMORIZED IN SENDING DATA TRANSMISSION APPARATUS TO REINPUT STRUCTURE DATA

| STRUCTURE IDENTIFIER OF STRUCTURE (STRUCTURE LOCATION) IN WAITING FOR TRANSFER ACKNOWLEDGEMENT | STRUCTURE BOUNDARY INFORMATION OF STRUCTURE (STRUCTURE SIZE) IN WAITING FOR TRANSFER ACKNOWLEDGEMENT |
|---|---|
| . | . |

FIG. 29

EXAMPLE 2 OF FORMAT OF INFORMATION MEMORIZED IN SENDING DATA TRANSMISSION APPARATUS TO REINPUT STRUCTURE DATA

| STRUCTURE IDENTIFIER OF STRUCTURE (STRUCTURE SERIAL NUMBER) IN WAITING FOR TRANSFER ACKNOWLEDGEMENT | STRUCTURE LOCATION OF STRUCTURE IN WAITING FOR TRANSFER ACKNOWLEDGEMENT | STRUCTURE BOUNDARY INFORMATION OF STRUCTURE (STRUCTURE SIZE) IN WAITING FOR TRANSFER ACKNOWLEDGEMENT |
|---|---|---|
| . | . | . |
| . | . | . |
| . | . | . |

EXAMPLE OF ERROR DETECTION CODE ADDITION TO STRUCTURE FRAME ERROR DETECTION CODE IS CREATED FOR EACH FRAGMENT AND IS ADDED THERETO (EMBODIMENT 2)

OUTPUT EXAMPLE FROM STRUCTURE EXTRACTION FUNCTION

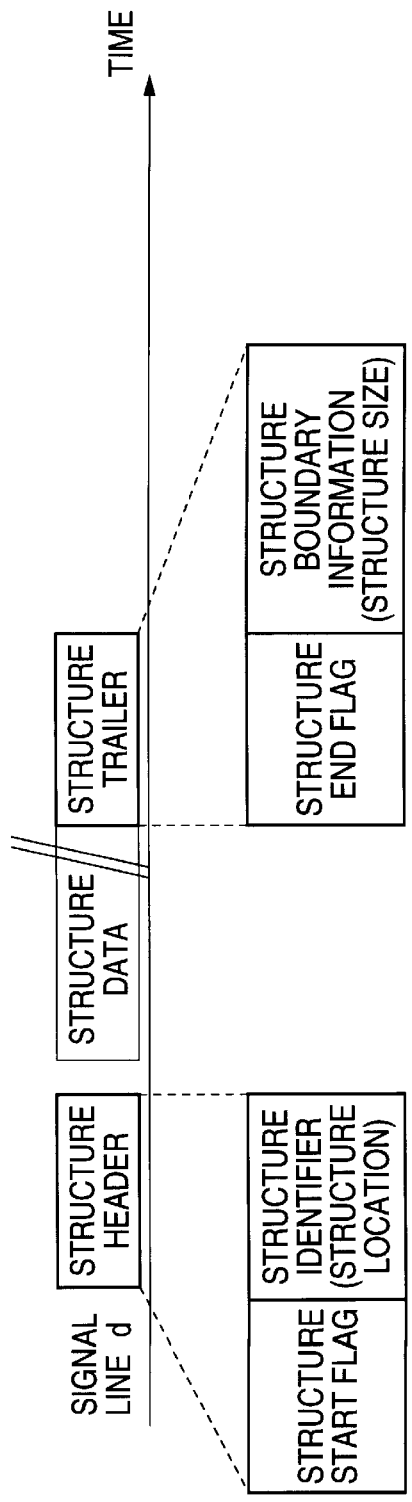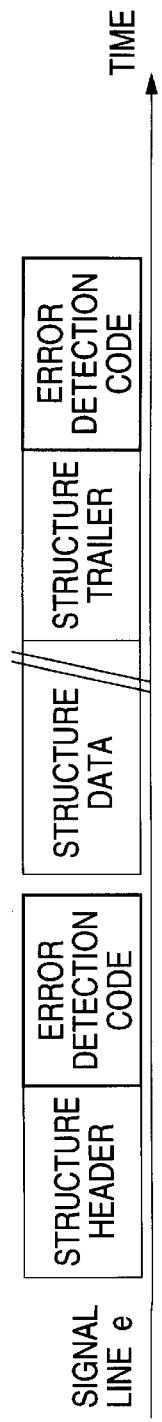

FIG. 38

FORMAT EXAMPLE OF STRUCTURE INFORMATION HELD IN
STRUCTURE BOUNDARY INFORMATION MEMORY FUNCTION

| STRUCTURE IDENTIFIER (STRUCTURE LOCATION) | STRUCTURE BOUNDARY INFORMATION (STRUCTURE SIZE) |
|---|---|
| - | - |

FIG. 39

FORMAT EXAMPLE OF RETRANSMISSION
REQUEST FOR STRUCTURE

| STRUCTURE IDENTIFIER (STRUCTURE LOCATION) |
|---|
| - |

FIG. 40

FORMAT EXAMPLE OF TRANSMISSION
ACKNOWLEDGEMENT FOR STRUCTURE

| STRUCTURE IDENTIFIER (STRUCTURE LOCATION) |
|---|
| - |

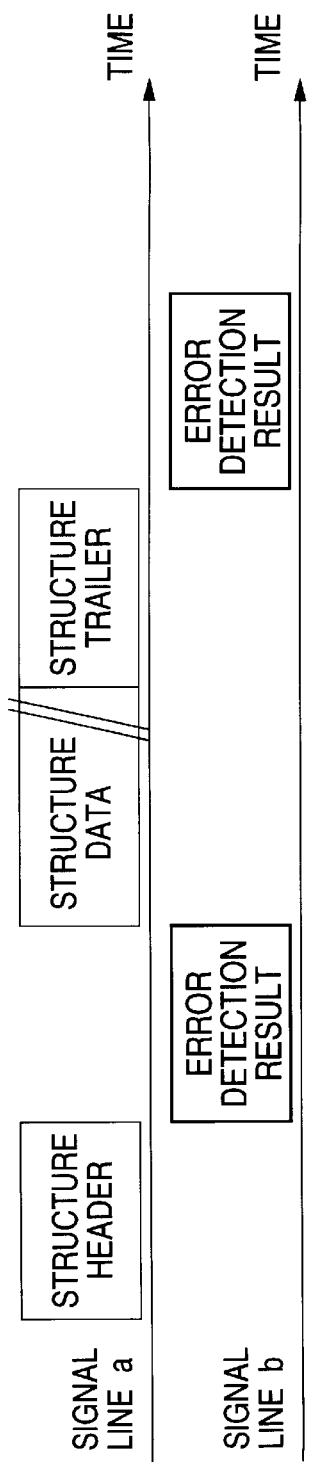
FIG. 42  OUTPUT EXAMPLE FROM ERROR DETECTION FUNCTION
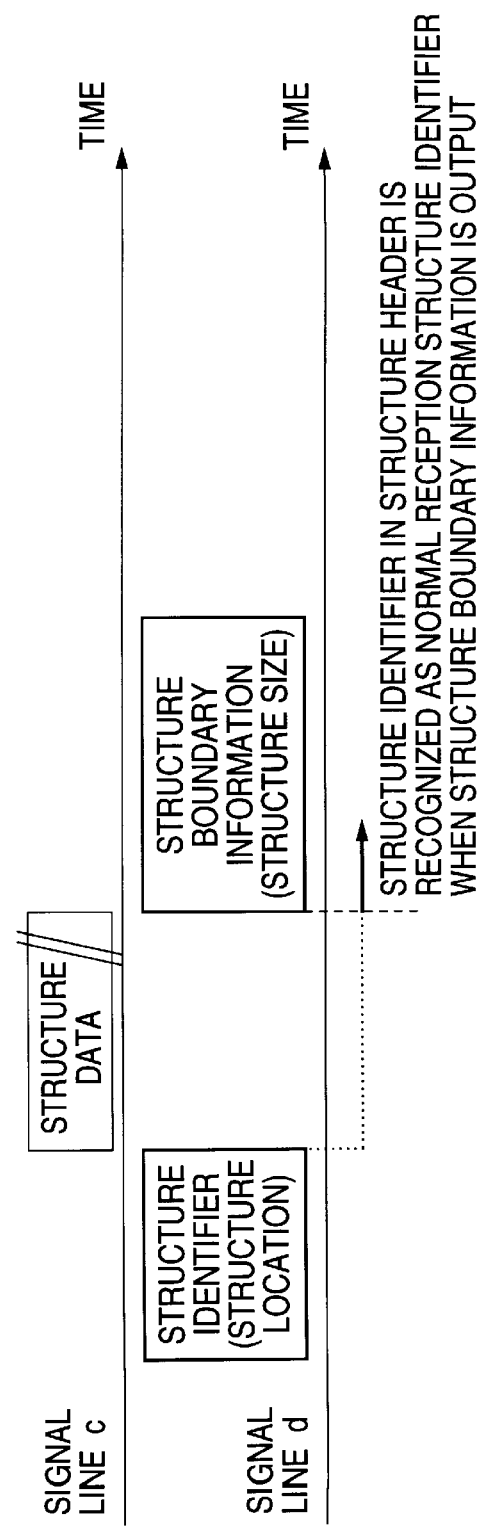
FIG. 43  OUTPUT EXAMPLE OF STRUCTURE DEFRAMING FUNCTION WHEN NO ERROR IN STRUCTURE HEADER, STRUCTURE DATA AND STRUCTURE TRAILER

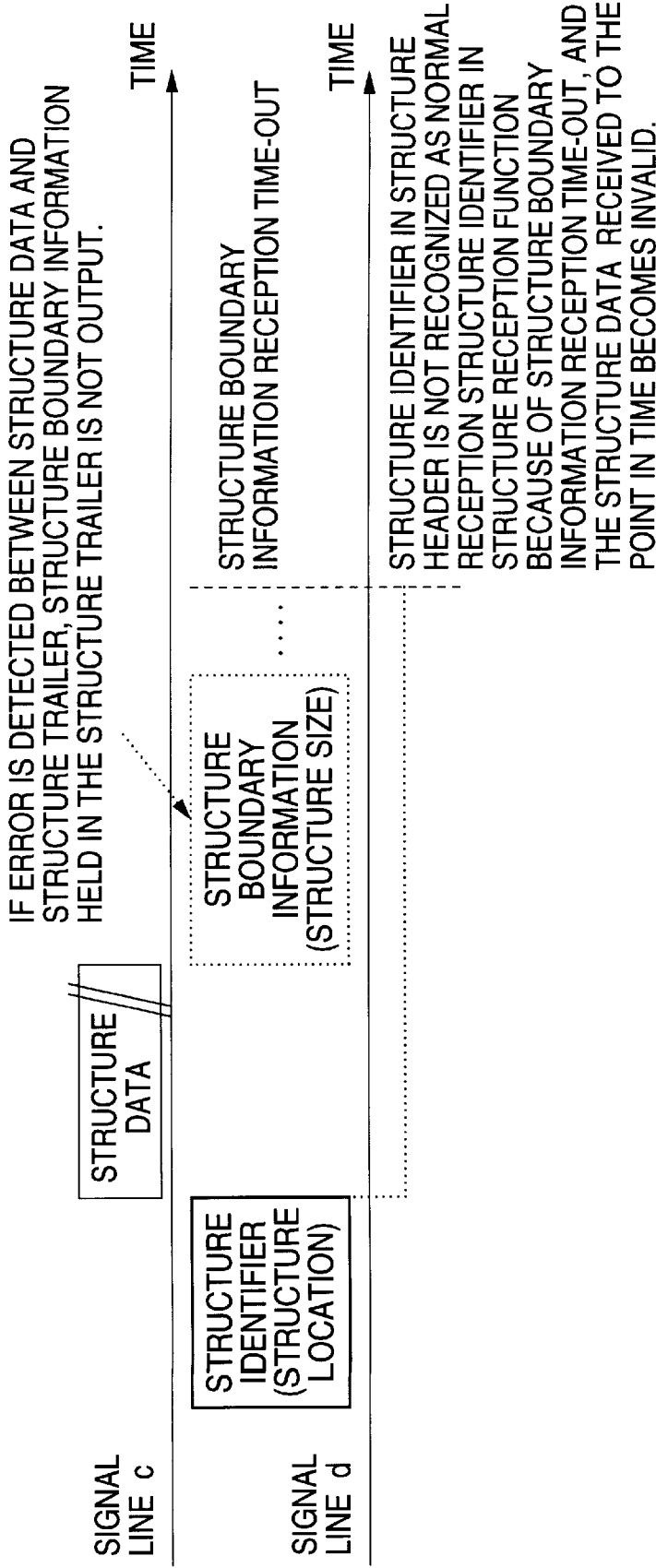

OUTPUT EXAMPLE OF STRUCTURE RECEIVING FUNCTION IN NORMAL RECEPTION

FIG. 48

FORMAT EXAMPLE OF INFORMATION HELD IN RETRANSMISSION
REQUEST STRUCTURE IDENTIFIER MEMORY FUNCTION

| STRUCTURE IDENTIFIER (STRUCTURE LOCATION) | STRUCTURE RECEPTION TIME-OUT TIME |
|---|---|
| - | - |

MAIN PART OF SENDING DATA TRANSMISSION APPARATUS OF EMBODIMENT 2

213: STRUCTURE FRAMING FUNCTION

OUTPUT EXAMPLE OF STRUCTURE FRAMING FUNCTION

FORMAT EXAMPLE OF RETRANSMISSION REQUEST FRAGMENT
ERROR PART IDENTIFIER INPUTTED IN RETRANSMISSION FUNCTION

OUTPUT EXAMPLE OF ERROR DETECTION FUNCTION

FIG. 64

FORMAT EXAMPLE OF INFORMATION HELD IN RETRANSMISSION REQUEST STRUCTURE PART IDENTIFIER MEMORY FUNCTION

| STRUCTURE IDENTIFIER (STRUCTURE LOCATION) | RETRANSMISSION REQUEST FRAGMENT ERROR PART IDENTIFIER (FRAGMENT LOCATION) | RETRANSMISSION REQUEST FRAGMENT ERROR PART BOUNDARY INFORMATION (FRAGMENT SIZE) | RETRANSMISSION REQUEST FRAGMENT ERROR PART RECEPTION TIME-OUT TIME |
|---|---|---|---|
| . | . | . | . |
| . | . | . | . |
| . | . | . | . |
| . | . | . | . |

DATA STRUCTURE OF COMPRESSED DATA STRUCTURE WHEN JPEG IS USED

DATA LEVELS IN JPEG

FIG. 68

EXAMPLE OF MIME

```
Mime-Version:1.0
Content-Type: Multipart/Mixed;
    boundary = "——Next_Part(Tue_May_21_15:36:03_1996)——"

——Next_Part(Tue_May_21_15:36:03_1996)——
Content-Type: Text/Plain; charset = iso-2022-jp
```
STRUCTURE

```
MULTIPART MAIL

——Next_Part(Tue_May_21_15:36:03_1996)——
Content-Type: Text/Plain; charset = us-ascii
```
STRUCTURE

```
This part is English.

——Next_Part(Tue_May_21_15:36:03_1996)——
Content-Type: audio/basic
Content-Transfer-Encoding: base64
```
STRUCTURE

```
X19eX3/z + + /t7PPx7uzq5ebm5uTtcvb6cnN4b21ua2toaGxqcm9s/vzx6OX35N7h3uvr8vh7
enpubnBoYm9md3x59/79 + 3xpZ3ppdXz3 + Ozi4uTt7Xny19/q73xxZGBfYmVqa21qfO//6 + vv
7 + f19u7p6e3u9/R7eXhvdW9taGdseHBwbG10d3D35uri7u3m8 + 7q5u/u8/x/dHhwZGJmbXhw
3 + P37u/w5ebp8v/z + Xdybmxoef5namtrcvPm4d/q8/j39nprZFxeY2hobv137uPY3uLd4Ofn
93FzfXh0/W1gX1pZaW1ufHx57unn5Ozm7/bt8ujvfvx0bfRyaWVoYm1sePj15 + nj ——Next_Part(Tue_May_21_15:36:03_1996)——
```

FIG. 69

```
EXAMPLE OF DOCUMENT DATA IN PAGE DESCRIPTION

PROGRAM FORMAT

Header  "Interpress / Xerox / 3.0 "
    BEGIN
        {preamble 0}
        {page 1}
        {page 2}
        {page 3}
    END
```

FIG. 70

EXAMPLE OF INTERPRESS PROGRAM

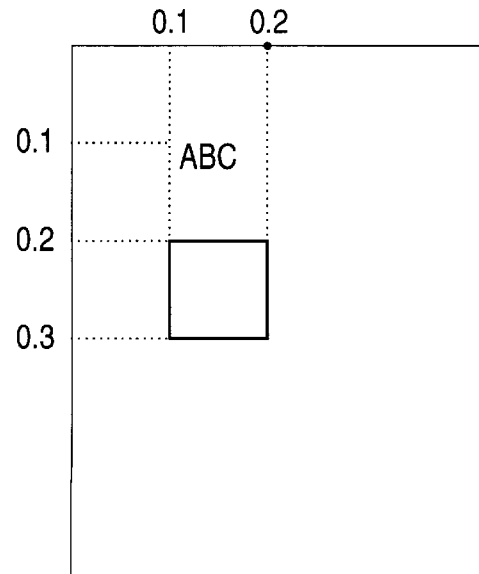

```
Header  "Interpress / Xerox / 3.0 "
BEGIN
    {}
    {
        Identifier "xerox"
        Identifier "XC1-1-1"
        Identifier "times"
        3 MAKEVEC
        0.00635 SCALE
        MODIFYFONT
        0 FSET
        0 SETFONT
        0.1 0.1 SETXY
        String "ABC"
        SHOW
        0.1 0.2 MOVETO
        0.1 0.3 LINETO
        0.2 0.3 LINETO
        0.2 0.2 LINETO
        0.1 0.2 LINETO
        MASKSTROKE
    }
END
```

EXAMPLE OF POSTSCRIPT PROGRAM

```
%! PS-Adobe-3.0
320 100 moveto
(ABC) show
320 200 8 [ 320 0 0 -200 0 200 ]
currentfile / ASCIIHexDecode filter
image
6666666666666666777766666666655566656    ⎤ IMAGE
...                                       ⎬ DATA 1
7766666666555556666666666666667776666    ⎦
>
320 200 8 [ 480 0 0 -500 0 500 ]
currentfile / ASCIIHexDecode filter
image
6666666666666666777766666666655566656    ⎤ IMAGE
...                                       ⎬ DATA 2
7766666666555556666666666666667776666    ⎦
>
showpage
```

EXAMPLE OF DOCUMENT DATA OF PAGE DESCRIPTION PROGRAM FORMAT

%! PS-Adobe-30.
%%Pages: 3
preamble#
%%Page: 11
page 1#
%%Page: 22
page 2#
%%Page: 33
page 3#

STRUCTURE EXAMPLE 1 OF STRUCTURE EXTRACTING FUNCTION

STRUCTURE EXAMPLE 2 OF STRUCTURE EXTRACTING FUNCTION

STRUCTURE EXAMPLE 3 OF STRUCTURE EXTRACTING FUNCTION

FIG. 76

| DOCUMENT TYPE | STRUCTURE DEVICE | STRUCTURE DATA AMOUNT (AVERAGE) |
|---|---|---|
| RASTER IMAGE DOCUMENT (A4, 600spi, 32bit/pix) | LINE | 16KBytes |
| RASTER IMAGE DOCUMENT (A4, 600spi, 32bit/pix) | PAGE | 144MBytes |
| PDL DOCUMENT (COMPLICATED GRAPHIC FORM) | PAGE | 100KBytes ~ 5MBytes |
| PDL DOCUMENT (PARTIAL RASTER) | PAGE | 1MBytes ~ 144MBytes |
| PDL DOCUMENT (TEXT, ESY GRAPHIC FORM) | PAGE | 1KBytes ~ 100kBytes |

FIG. 77

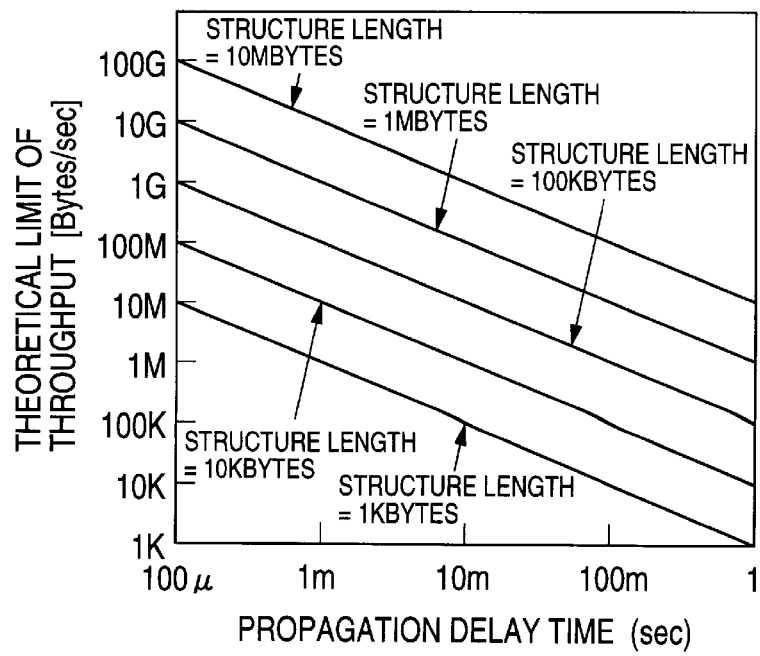

EFFICIENCY ESTIMATE: RELATIONSHIP BETWEEN THROUGHPUT AND PROPAGATION DELAY TIME

DATA TRANSMISSION APPARATUS AND METHOD

BACKGROUND OF THE INVENTION

This invention relates to a data transmission apparatus and method for retransmitting data when an error occurs in data transmission and in particular to a data transmission apparatus and method optimum for a network where a plurality of data transmission apparatuses are connected to a transmission line and image data is transmitted from the sending data transmission apparatus to the receiving data transmission apparatus over the transmission line for performing subsequent print processing of the image data at the receiving site.

Transmission data to which transmission service is applied is classified into three types of stream data, non-structure file data, and structure file data, as shown in FIG. 1.

(1) The stream data is data with only data sequence on time base.

(2) The file data (non-structure) is data having data top and size (end).

(3) The file data (structure) is data having a structure (=processing device top and size(end)) in addition to the data top and size (end). Image data belongs to this type.

Conventional transmission service such as a telephone or telex is to transmit stream data input from moment to moment to a distant location. FIG. 2 shows an apparatus configuration for this service. In the figure, a sending data transmission apparatus 10 and a receiving data transmission apparatus 11 are connected by a transmission line 12. The sending data transmission apparatus 10 and the receiving data transmission apparatus 11 marked in a length to be suitable for transmission control of stream data and perform transmission control.

With the development of data memory devices such as disk drives and memories and data processing apparatuses such as computers, data processed by the data processing apparatus is memorized in the data memory device and the memorized data is exchanged between the data memory devices over a transmission line. The memorized data is file data. FIG. 3 shows an apparatus configuration for this transmission service. In the figure, data processed by a sending data processing apparatus 13 is memorized in a sending data memory device 14 as file data. Data transmission apparatuses 10 and 11 mark a stream data in a length suitable for transmission control of file data and perform transmission control. The sent file data is memorized in a receiving data memory device 15 and is processed by a receiving data processing apparatus 16.

Transmission of file data assumes asynchronous transmission and error correction by retransmission.

(1) Asynchronous transmission

Data created in the sending data processing apparatus 13 is memorized as file data having a finite size. Data transmitted to a receiver is also once memorized before it is transferred to the receiving data processing apparatus 16. The data memory devices 14 and 15 have a sufficient capacity for processing devices, whereby sending data processing, transmission, and receiving data processing can be operated at separate timings.

(2) Error correction by retransmission

An error correction code (ECC) apparatus and an automatic repeat request (ARQ) are available as error correction techniques.

(a) ECC apparatus: A transmission error correction code is attached to transmission data and a transmission error is corrected at the receiver. However, generally the correction capability is limited.

(b) Automatic repeat request: A transmission error detection code is attached to transmission data and a transmission error is detected at the receiver. Data where the transmission error occurred is again transmitted, whereby transmission free from error is accomplished.

Generally, data processing performed in the receiver does not allow any transmission error in data. Thus, the automatic repeat request is adopted.

Hitherto, generally transmission data has been handled as stream data in asynchronous and error-unallowed transmission of file data. The stream data, which is data having only time base information, has only the simplest data characteristic in transmission. Thus, the transmission apparatus that can transmit stream data becomes the most versatile apparatus that can be applied to transmission of data having various characteristics. The most versatile apparatus means transmission with delay as little as possible while correcting a data error by retransmission. The less average delay for each bit, the larger the transmission technology application range. Therefore, image data of a structure file is also handled as stream data in transmission.

Next, the transmission technology of file data as stream data will be discussed with reference to FIG. 4. File data is read from a sending data memory device in sequence for transmission as stream data. To transmit the stream data without allowing any error by retransmission, it becomes necessary to provide a data device in a length for making an error check. That is, it becomes necessary to attach a transmission structure to the stream data for transmission error control. (See FIG. 6.) In FIG. 4, transmission structure attaching means 20 in a transmitting station reads a file data in a length over a signal line 21 from the sending data memory device 14 (FIG. 3) as one transmission structure. This transmission structure is sent over a signal line 22 to transmission means 23, which then adds an error detection code to the transmission structure and sends the transmission structure to the transmission line 12.

To respond to a retransmission request from the receiver if a transmission error occurs, transmission structure memory means 24 in the transmitting station holds the transmission structure until the normal reception is acknowledged.

Reception means 25 in the receiver receives the transmission structure over the transmission line 12 and performs transmission error detection processing. If the reception means 25 does not detect an error, it transfers the transmission structure and the result indicating no error to transmission structure reception means 27 over a signal line 26. If the reception means 25 detects an error, it transfers only the result indicating an error to the transmission structure reception means 27 over the signal line 26 and discards the transmission structure.

If the transmission structure reception means 27 receives a notification indicating no error, it transfers the transmission structure received from the reception means 25 to conversion-to-stream means 29 over a signal line 28 and returns a notification of the normal reception to the transmitting station over a signal line 30. If the transmission structure reception means 27 receives a notification indicating an errors it returns a request for retransmitting the transmission structure to the transmitting station over a signal line 31.

The conversion-to-stream means 29 converts the transmission structure received from the transmission structure reception means 27 into stream data and writes the stream data into the receiving data memory device 15 (FIG. 3) in sequence over a signal line 35.

Transmission structure transfer acknowledgement means 32 in the transmitting station receives the normal reception notification from the transmission structure reception means 27 over the signal line 30. Then, the transmission structure transfer acknowledgement means 32 instructs the transmission structure attaching means 20 to read the next transmission structure from the sending data memory means 14 (FIG. 3) over a signal line 33.

Retransmission means 34 in the transmitting station receives the retransmission request from the transmission structure reception means 27. Then, the retransmission means 34 reads the transmission structure held in the transmission structure memory means 24 over a signal line 36 and transfers the transmission structure to the transmission means 23, which then adds an error detection code to the transmission structure and again sends the transmission structure to the transmission line 12.

FIG. 5 shows the installation configuration of the means in FIG. 4. In FIG. 5, the installation configuration is divided into an application section 40 and a line interface section 41. The application section 40 is provided with a data processing function 42 and a data memory function 43. It provides functions corresponding to the data processing apparatus 13, 16 and the data memory device 14, 15 in FIG. 3. The line interface section 41 is provided with a packet buffer function 44, a transfer acknowledgement (retransmission) function 45, an error detection function 46, and a transmission function 47.

In the sending data transmission apparatus 10, the packet buffer function 44 provides the transmission structure attaching means 20 and the transmission structure memory means 24. The transfer acknowledgement (retransmission) function 45 provides the transmission structure transfer acknowledgement means 32 and the retransmission means 34. The error detection function 46 and the transmission function 47 provide the transmission means 23.

Likewise, in the receiving data transmission apparatus 11, the packet buffer function 44 provides the conversion-to-stream means 29. The transfer acknowledgement (retransmission) function 45 provides the transmission structure reception means 27. The error detection function 46 and the transmission function 47 provide the reception means 25.

The interface between the application section 40 and the line interface section 41 is called a file interface 48.

On the file interface 48 of the sending station, file data, a file identifier for uniquely identifying each file, and file boundary information indicating the boundary of the file are passed from the application section 40 to the line interface section 41, and a transmission completion file identifier indicating the normal reception of the file at the receiver is passed from the line interface section 41 to the application section 40.

On the file interface 48 of the receiver, normally received file data, a normally received file identifier for uniquely identifying each normally received file, and normally received file boundary information indicating the boundary of the normally received file are passed from the line interface section 41 to the application section 40, and no information is passed from the application section 40 to the line interface section 41. Transmission of the file data is accomplished by the means.

Control overhead required for securing that one transmission structure has been normally received (transfer acknowledgement) is constant. For example, the length of an error detection code attached to one transmission structure, the time of interrupt service executed each time one transmission structure is received, and the like result in overhead. If the length of one transmission structure is shortened, the ratio of the control overhead to the data amount contained in the transmission structure increases and the efficiency lowers. In contrast, the transmission structure length is made long, the ratio of the control overhead to the data amount contained in the transmission structure decreases, but the probability that a transmission error will occur in the transmission structure devices increases and the retransmitted data amount also grows. Therefore, the efficiency may be degraded depending on the transmission error quality of a transmission line. (See FIG. 7.) That is, the transmission structure length involves upper and lower limits and an intermediate value is determined from the transmission error quality and the band width of the transmission line. Generally, a length of several KBytes or less is used.

Next, the transfer acknowledgement operation of a transmission structure having an intermediate length will be discussed. The time interval between the instant at which a transmission station transmits one transmission structure and the instant at which the transmission station secures the normal reception of the transmission structure at the receiver is called a window. (See FIG. 8.) In the window, transmission and reception of the transmission structure are repeated until a transmission structure error is eliminated. (See FIG. 9.) That is, a transmission error correction is made by retransmission. Then, when the normal reception of the transmission structure is secured, the transition to the next transmission structure is made.

Thus, a structure is attached even to stream data only input with the time and the window is slid for each transmission structure, whereby error-free transmission is executed in sequence.

The throughput in the transfer acknowledgement technique of transmission structure devices is found from the following expression:

Expression 1

$$T = \Sigma L / \Sigma W$$

$$W = L/B + D + OH + R$$

where T is throughput, W is window time, L is transmission structure length, B is transmission band width, D is round trip round trip time, OH is overhead time, and R is retransmission time.

The window time contains the round trip delay time D determined by the distance between the transmitting and receivers and the control overhead time OH required for transfer acknowledgement of one structure described above. Therefore, the longer the distance, the longer the time taken for security of the normal reception of one structure, resulting in degradation of the throughput. If the distance between the transmitting and receivers is short, the control overhead time per structure device is constant, thus the throughput tops out. This problem occurs independently of retransmission.

FIG. 10 is a graph to show the relationship between the throughput and round trip time in an ideal case where no transmission error occurs. The conventional transmission structure transfer acknowledgement technique is intended mainly for a LAN environment, namely, the range in which the propagation time is about 10 msec. Therefore, the throughput is to about 10 MBytes/sec.

On the other hand, the amount of image data transmitted to a printer is several Kbytes to several Mbytes per page of A4-size paper and the image data is printed on a printer at processing speed of about several pages/min. The transmission throughput required for operating the printer consecutively is about several Kbytes/sec to several Mbytes/sec and the conventional transmission structure device transfer acknowledgement technique can be applied.

Recently, however, high-speed and high-definition printers have been developed; it is forecasted that the image data amount will become several hundreds of Mbytes per page of A4-size paper and the print processing speed will become several tens of pages to hundred pages/min. In this case, the transmission throughput required for operating the printer consecutively is raised to several GBytes/sec and the conventional technique described above cannot be applied.

Nowadays, broad-band transmission lines of up to about several hundreds of Mbps are also constructed increasingly on public networks and high-speed transmission between distant locations is being enabled. Then, it is hoped that high-speed image transmission across a wide area will be enabled. However, the propagation on a wide area may become about one second and the conventional technique described above cannot be applied.

Parallel processing of windows may be performed to improve the throughput of the prior art besides guaranteeing error-free transmission. In this apparatus, however, as the throughput is improved or if the propagation time is large, a large amount of transmission structure memory buffer becomes required, resulting in an increase in costs. For example, to hold transmission throughput=100 MBytes/sec in a network with propagation delay time of transfer acknowledgement=1 s, the buffer amount of 100 MBytes/sec×1 s=100 MBytes becomes required. This buffer amount furthermore grows with improvement in the transmission throughput or an increase in the propagation time. In the Unexamined Japanese Patent Application Publication No. Hei 4-107660, use of a large-capacity work file, such as a disk, is proposed to cope with the growing transmission structure memory buffer. In doing so, an increase in costs is inevitable.

As we have discussed, in the conventional apparatus for attaching a transmission structure to transmission data and making transfer acknowledgement in the transmission structure devices, the throughput cannot be improved without increasing costs. Therefore, for example, the conventional apparatus is remarkably difficult to cope with high-speed, high-definition print service requiring unprecedented high throughput.

In other words, the prior art cannot sufficiently bring out the powerful processing capability of the receiver associated with the recent technology improvement, etc. That is, the data amount in data processing and the processing speed at the receiver grow because of the recent technology improvement, etc. The processing speed at the receiver exceeds the upper limit of the communication speed from a data supply source to the receiver and the upper limit becomes a bottleneck in drawing out the full data processing capability at the receiver.

It is therefore an object of the invention to provide data transmission techniques for removing the throughput limitations caused by transfer acknowledgement of transmission structure devices executed to realize error-free transmission and providing high throughput for data transmission covering short to long distances.

SUMMARY OF THE INVENTION

If data is transmitted from a transmitting station to a receiver and subsequently the data is processed at the receiver, when the transmitted data amount is large and data processing is executed at high speed at the receiver, high throughput is required for the transmission. A typical example of such large-capacity data is image data. Generally, the image data is made up of two dimensions and has a structure based on each data piece and the locations of the data pieces. On the other hand, a structure indicating a data cluster and the capability of identifying the structure are indispensable to transmission which must be error free. Then, the invention is intended to accomplish the object for data essentially having a structure such as image data by applying the structure to transfer acknowledgement.

That is, to the end, according to a first aspect of the invention, there is provided a sending data transmission apparatus comprising means for memorizing at least one structure data piece of a data processing device in a receiving data processing apparatus, means for computing a transmission error detection code from the structure data memorized in the memory means, means for attaching the transmission error detection code computed by the transmission error detection code computation means to the structure data memorized in the memory means, means for transmitting the structure data to which the transmission error detection code is attached by the transmission error detection code attaching means to the receiving apparatus, means for receiving retransmission request for each structure data piece returned from the receiving apparatus when a transmission error is detected based on the transmission error detection code and structure data transmitted by the transmission means, and means responsive to the retransmission request for each structure data piece received by the reception means for retransmitting the corresponding structure data piece to the receiving apparatus.

In the configuration, retransmission request is created for each structure data piece, a data processing device in the receiving data processing apparatus, and data is retransmitted based on the retransmission request, thus data transmission can be secured for each structure data piece and processing following the transmission can be started for each structure data piece. Therefore, total processing throughput containing transmission can be improved. If the data amount of structure data is large as in high-definition print service, high throughput is often required for transmission of a large amount of structure data. According to the configuration, the larger the data amount of structure data, the less relatively the data transfer acknowledgement overhead; the transmission throughput improves matching the service. Therefore, the configuration can also deal sufficiently with the case where large transmission throughput is required as in the high-definition print service.

To the end, according to a second aspect of the invention, there is provided a sending data transmission apparatus comprising means for memorizing a file containing at least one structure data piece of a data processing device in a receiving data transmission apparatus, means for marking up structure data from the file memorized in the memory means, means for computing a transmission error detection code from the structure data marked up by the structure data marking up means, means for attaching the transmission error detection code computed by the transmission error detection code computation means to the structure data marked up by the structure data marking up means, means for transmitting the structure data to which the transmission error detection code is attached by the transmission error detection code attaching means to the receiving apparatus, means for receiving retransmission request for each structure data piece returned from the receiving apparatus when a transmission error is detected based on the transmission error detection code and structure data transmitted by the transmission means, and means responsive to the retransmission request for each structure data piece received by the reception means for retransmitting the corresponding structure data piece to the receiving apparatus.

Also in the configuration, processing following transmission can be started for each structure data piece and total processing throughput containing transmission can be improved. The transmission throughput improves matching the service and the configuration can also deal sufficiently with the case where large transmission throughput is required as in the high-definition print service.

In the configuration, the structure data in the file memorized in the memory means in the sending data transmission apparatus may begin with a delimiter of a data separation indication code and the structure data marking up means may mark up data between the top delimiter of structure data and that of the next structure data in the file memorized in the memory means, thereby marking up structure data.

The structure data in the file memorized in the memory means in the sending data transmission apparatus may begin with a delimiter of a data separation indication code and end with a delimiter and the structure data marking up means may mark up data between the top delimiter and the corresponding end delimiter in the file memorized in the memory means, thereby marking up structure data.

The file memorized in the memory means in the sending data transmission apparatus may be a document file described in a page description language, the top delimiter of the structure data may be a delimiter indicating the top of a page, and the end delimiter of the structure data may be a delimiter indicating the end of a page.

The file memorized in the memory means in the sending data transmission apparatus may be a document image file consisting of a plurality of pages and the structure data marking up means may mark up a document image in page devices in the document image file memorized in the memory means, thereby marking up structure data.

The file memorized in the memory means in the sending data transmission apparatus may be a document image file consisting of a plurality of division images and the structure data marking up means may mark up an image in division image devices in the document image file memorized in the memory means, thereby marking up structure data.

The file memorized in the memory means in the sending data transmission apparatus may be a document image file consisting of image data for each color component and the structure data marking up means may mark up an image in color component devices in the document image file memorized in the memory means, thereby marking up structure data.

The file memorized in the memory means in the sending data transmission apparatus may contain location information of structure data in the file and the structure data marking up means may mark up structure data in response to the location information in the file memorized in the memory means.

The file memorized in the memory means in the sending data transmission apparatus may be a document image file coded in layers and the structure data marking up means may mark up coded data for each layer in the document image file memorized in the memory means, thereby marking up structure data.

In the first and second aspects of the invention, the sending data transmission apparatus may further include second memory means for memorizing correspondence between structure data and a memory location of the structure data in the memory means, wherein the retransmission means may be responsive to the retransmission request for retransmitting structure data to be retransmitted based on the correspondence between the structure data and the memory location of the structure data, memorized in the second memory means.

To the end, according to a third aspect of the invention, there is provided a sending data transmission apparatus comprising means for memorizing a file containing at least first one structure data piece of a data processing device in a receiving data processing apparatus, means for marking up a plurality of first contiguous structure data pieces from the file memorized in the memory means as second structure data, means for computing a transmission error detection code from the second structure data marked up by the structure data marking up means, means for attaching the transmission error detection code computed by the transmission error detection code computation means to the second structure data marked up by the structure data marking up means, means for transmitting the second structure data to which the transmission error detection code is attached by the transmission error detection code attaching means to the receiving apparatus, means for receiving retransmission request for each second structure data piece returned from the receiving apparatus when a transmission error is detected based on the transmission error detection code and second structure data transmitted by the transmission means, and means responsive to the retransmission request for each second structure data piece received by the reception means for retransmitting the corresponding second structure data piece to the receiving apparatus.

Also in the configuration, processing following transmission can be started for each structure data piece and total processing throughput containing transmission can be improved. The transmission throughput improves matching the service and the configuration can also deal sufficiently with the case where large transmission throughput is required as in the high-definition print service. Further, in the configuration, the initial structure data is processed in batch as the second structure data, thus even if the initial size of the first structure data is small, transmission processing need not be subdivided. Also in the configuration, the various components described in the second aspect of the invention can be adopted.

To the end, according to a fourth aspect of the invention, there is provided a receiving data transmission apparatus comprising means for processing data, means for receiving structure data to which a transmission error detection code is attached, a data processing device in the data processing means, from a sending apparatus, means for detecting a transmission error based on the transmission error detection code and structure data received by the reception means, means for creating retransmission request of structure data wherein a transmission error is detected by the transmission error detection means for each structure data piece, and transmission means for returning the retransmission request created by the retransmission request creation means to the sending apparatus.

Also in the configuration, processing following transmission can be started for each structure data piece and total processing throughput containing transmission can be improved. The transmission throughput improves matching the service and the configuration can also deal sufficiently with the case where large transmission throughput is required as in the high-definition print service. Also in the configuration, the various components described in the second aspect of the invention can be adopted.

To the end, according to a fifth aspect of the invention, there is provided a data transmission apparatus comprising a sending data transmission apparatus for transmitting data, a receiving data transmission apparatus for receiving the data transmitted from the sending data transmission apparatus, and a data processing apparatus for processing the data received by the receiving data transmission apparatus, characterized in that the sending data transmission apparatus comprises means for memorizing at least one structure data piece of a data processing device in a receiving data processing apparatus, means for computing a transmission error detection code from the structure data memorized in the memory means, means for attaching the transmission error detection code computed by the transmission error detection code computation means to the structure data memorized in the memory means, and means for transmitting the structure data to which the transmission error detection code is attached by the transmission error detection code attaching means to the receiving apparatus, that the receiving data transmission apparatus comprises means for receiving structure data to which a transmission error detection code is attached, transmitted by the transmission means in the sending data transmission apparatus, means for detecting a transmission error based on the transmission error detection code and structure data received by the reception means, means for creating retransmission request of structure data wherein a transmission error is detected by the transmission error detection means for each structure data piece, and transmission means for returning the retransmission request created by the retransmission request creation means to the sending apparatus, and that the sending data transmission apparatus further includes means for receiving retransmission request for each structure data piece returned from the transmission means in the receiving data transmission apparatus, and means responsive to the retransmission request for each structure data piece received by the reception means for retransmitting the corresponding structure data piece to the receiving apparatus.

Also in the configuration, processing following transmission can be started for each structure data piece and total processing throughput containing transmission can be improved. The transmission throughput improves matching the service and the configuration can also deal sufficiently with the case where large transmission throughput is required as in the high-definition print service.

To the end, according to a sixth aspect of the invention, there is provided a sending data transmission apparatus comprising means for memorizing at least one structure data piece of a data processing device in a receiving data processing apparatus, means for dividing structure data memorized in the memory means into transmission device data for each device capacity applied when the structure data is transmitted, means for computing a transmission error detection code from the transmission device data into which the structure data is divided by the transmission device data division means, means for attaching the transmission error detection code computed by the transmission error detection code computation means to the transmission device data into which the structure data is divided by the transmission device data division means, means for transmitting the transmission device data to which the transmission error detection code is attached by the transmission error detection code attaching means to the receiving apparatus, means for receiving retransmission request containing an identification code of the transmission device data in the structure data returned from the receiving apparatus when a transmission error is detected based on the transmission error detection code and transmission device data transmitted by the transmission means, and means responsive to the identification code in the structure data in the retransmission request received by the reception means for retransmitting the transmission device data corresponding to the identification code to the receiving apparatus.

Also in the configuration, processing following transmission can be started for each structure data piece and total processing throughput containing transmission can be improved. The transmission throughput improves matching the service and the configuration can also deal sufficiently with the case where large transmission throughput is required as in the high-definition print service. Further, in the configuration, a transmission error is detected for each transmission device data piece smaller than the structure data device and each transmission device data piece containing the detected transmission error is retransmitted, thus the retransmitted data amount can be lessened.

To the end, according to a seventh aspect of the invention, there is provided a sending data transmission apparatus comprising means for memorizing a file containing at least one structure data piece of a data processing device in a receiving data processing apparatus, means for marking up structure data from the file memorized in the memory means, means for dividing the structure data marked up by the structure data marking up means into transmission device data for each device capacity applied when the structure data is transmitted, means for computing a transmission error detection code from the transmission device data into which the structure data is divided by the transmission device data division means, means for attaching the transmission error detection code computed by the transmission error detection code computation means to the transmission device data into which the structure data is divided by the transmission device data division means, means for transmitting the transmission device data to which the transmission error detection code is attached by the transmission error detection code attaching means to the receiving apparatus, means for receiving retransmission request containing an identification code of the transmission device data in the structure data returned from the receiving apparatus when a transmission error is detected based on the transmission error detection code and transmission device data transmitted by the transmission means, and means responsive to the identification code in the structure data in the retransmission request received by the reception means for retransmitting the transmission device data corresponding to the identification code to the receiving apparatus.

Also in the configuration, processing following transmission can be started for each structure data piece and total processing throughput containing transmission can be improved. The transmission throughput improves matching the service and the configuration can also deal sufficiently with the case where large transmission throughput is required as in the high-definition print service. Further, a transmission error is detected for each transmission device data piece smaller than the structure data device and each transmission device data piece containing the detected transmission error is retransmitted, thus the retransmitted data amount can be lessened. Also in the configuration, the various components similar to those described in the second aspect of the invention can be adopted.

To the end, according to an eighth aspect of the invention, there is provided sending data transmission apparatus comprising means for memorizing a file containing at least first one structure data piece of a data processing device in a receiving data processing apparatus, means for marking up a plurality of first contiguous structure data pieces from the file memorized in the memory means as second structure data, means for dividing the second structure data marked up by the structure data marking up means into transmission device data for each device capacity applied when the second structure data is transmitted, means for computing a transmission error detection code from the transmission device data into which the structure data is divided by the transmission device data division means, means for attaching the transmission error detection code computed by the transmission error detection code computation means to the transmission device data into which the structure data is divided by the transmission device data division means, means for transmitting the transmission device data to which the transmission error detection code is attached by the transmission error detection code attaching means to the receiving apparatus, means for receiving retransmission request containing an identification code of the transmission device data in the second structure data returned from the receiving apparatus when a transmission error is detected based on the transmission error detection code and transmission device data transmitted by the transmission means, and means responsive to the identification code in the second structure data in the retransmission request received by the reception means for retransmitting the transmission device data corresponding to the identification code to the receiving apparatus.

Also in the configuration, processing following transmission can be started for each structure data piece and total processing throughput containing transmission can be improved. The transmission throughput improves matching the service and the configuration can also deal sufficiently with the case where large transmission throughput is required as in the high-definition print service. A transmission error is detected for each transmission device data piece smaller than the structure data device and each transmission device data piece containing the detected transmission error is retransmitted, thus the retransmitted data amount can be lessened. The initial structure data is processed in batch as the second structure data, thus even if the initial size of the first structure data is small, transmission processing need not be subdivided. Also in the configuration, the various components described in the second aspect of the invention can be adopted.

To the end, according to a ninth aspect of the invention, there is provided a receiving data transmission apparatus comprising means for processing data, means for receiving transmission device data of a transmission device capacity to which a transmission error detection code is attached, transmitted from a sending apparatus, means for detecting a transmission error based on the transmission device data and transmission error detection code received by the reception means, means for creating retransmission request containing an identification code in the structure data, a data processing means processing device of the transmission device data wherein a transmission error is detected by the transmission error detection means transmission means for returning the retransmission request created by the retransmission request creation means to the sending apparatus, means for memorizing the transmission device data received by the reception means, and means for creating structure data from a plurality of transmission device data pieces memorized in the memory means.

Also in the configuration, processing following transmission can be started for each structure data piece and total processing throughput containing transmission can be improved. The transmission throughput improves matching the service and the configuration can also deal sufficiently with the case where large transmission throughput is required as in the high-definition print service. Further, a transmission error is detected for each transmission device data piece smaller than the structure data device and each transmission device data piece containing the detected transmission error is retransmitted, thus the retransmitted data amount can be lessened. Also in the configuration, the various components similar to those described in the second aspect of the invention can be adopted.

To the end, according to a tenth aspect of the invention, there is provided a data transmission apparatus comprising a sending data transmission apparatus for transmitting data, a receiving data transmission apparatus for receiving the data transmitted from the sending data transmission apparatus, and a data processing apparatus for processing the data received by the receiving data transmission apparatus, characterized in that the sending data transmission apparatus comprises means for memorizing at least one structure data piece of a data processing device in a receiving data processing apparatus, means for dividing structure data memorized in the memory means into transmission device data for each device capacity applied when the structure data is transmitted, means for computing a transmission error detection code from the transmission device data into which the structure data is divided by the transmission device data division means, means for attaching the transmission error detection code computed by the transmission error detection code computation means to the transmission device data into which the structure data is divided by the transmission device data division means, and means for transmitting the transmission device data to which the transmission error detection code is attached by the transmission error detection code attaching means to the receiving apparatus, that the receiving data transmission apparatus comprises means for receiving transmission device data of a transmission device capacity to which a transmission error detection code is attached, transmitted by the transmission means in the sending data transmission apparatus, means for detecting a transmission error based on the transmission device data and transmission error detection code received by the reception means, means for creating retransmission request containing an identification code in the structure data, a data processing means data processing device of the transmission device data wherein a transmission error is detected by the transmission error detection means, transmission means for returning the retransmission request created by the retransmission request creation means to the sending data transmission apparatus, means for memorizing the transmission device data received by the reception means, and means for creating structure data from a plurality of transmission device data pieces memorized in the memory means, and that the sending data transmission apparatus further includes means for receiving retransmission request containing an identification code of the transmission device data in the structure data returned from the transmission means in the receiving data transmission apparatus and means responsive to the identification code in the structure data in the retransmission request received by the reception means for retransmitting the transmission device data corresponding to the identification code to the receiving data transmission apparatus.

Also in the configuration, processing following transmission can be started for each structure data piece and total processing throughput containing transmission can be improved. The transmission throughput improves matching the service and the configuration can also deal sufficiently with the case where large transmission throughput is required as in the high-definition print service. Further, a transmission error is detected for each transmission device data piece smaller than the structure data device and each transmission device data piece containing the detected transmission error is retransmitted, thus the retransmitted data amount can be lessened.

The invention can also be embodied in a method category and a part thereof can also be embodied as a computer program product.

BRIEF DESCRIPTION OF THE DRAWING

In the accompanying drawings:

FIG. 14 is an illustration of the installation form of the basic configuration in FIG. 13;

FIG. 15 is an illustration of structures used in the invention for listing examples of processing performed by a receiving data processing apparatus;

FIG. 28 is an illustration of information memorized to fetch data to be retransmitted in the first embodiment of the invention;

FIG. 29 is an illustration of information memorized to fetch data to be retransmitted in the first embodiment of the invention;

FIG. 36 is an illustration of a structure framing function in FIG. 34;

FIG. 37 is an illustration of an error detection code attaching function in FIG. 34;

FIG. 38 is an illustration of a structure boundary information memory function in FIG. 34;

FIG. 39 is an illustration of a retransmission function in FIG. 34;

FIG. 40 is an illustration of a transfer acknowledgement function in FIG. 34;

FIG. 42 is an illustration of an error detection function in FIG. 41;

FIG. 43 is an illustration of a structure deframing function in FIG. 41;

FIG. 44 is an illustration of the structure deframing function in FIG. 41;

FIG. 48 is an illustration of a retransmission request structure identifier memory function in FIG. 41;

FIG. 64 is an illustration of a retransmission request structure error part identifier memory function in FIG. 55;

FIG. 68 is an illustration of an example of MIME;

FIG. 69 is an illustration of an example of document data in a page description language format;

FIG. 70 is an illustration of an example of document data in a page description language format;

FIG. 76 is an illustration of structure length examples of documents;

FIG. 77 is an illustration of effect estimation of the embodiments according to the relationship between throughput and the propagation time.

DETAILED DESCRIPTION OF THE PREFERRED EMBODIMENTS

Figure 11:
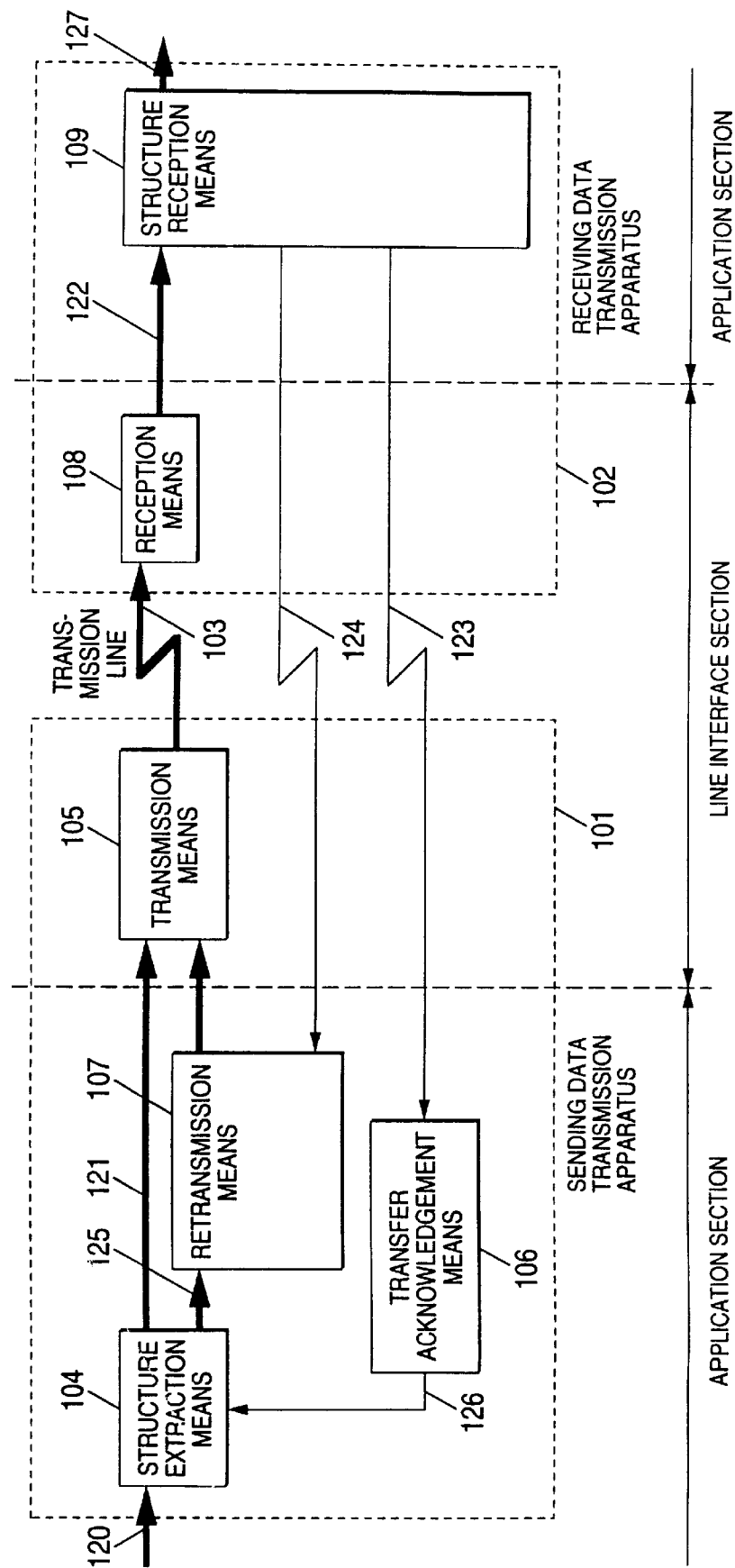
FIG. 11 is a block diagram to explain a first basic configuration of the invention.

The invention will be discussed in detail. First, the basic configuration of the invention will be discussed with reference to FIG. 11 to 14.
First basic configuration of the invention FIG. 11 shows a first basic configuration of the invention. In the figure, a data transmission apparatus of the invention consists of a sending data transmission apparatus 101, a receiving data transmission apparatus 102, and a transmission line 103. The sending data transmission apparatus 101 has structure marking up means 104, transmission means 105, transfer acknowledgement means 106, and retransmission means 107. The receiving data transmission apparatus 102 has reception means 108 and structure reception means 109. The structure marking up means 104 receives data in a structure file over a signal line 120, marks up structure information that the structure file originally has (structure device boundaries and structure identifier for identifying the structure), and sends structure data to a signal line 121. The structure data refers to data forming the structure. The transmission means 105 attaches an error detection code (for example, cyclic redundancy code CRC) to each structure data piece and transmits the structure data to a receiver over the transmission line 103.

Figure 1:
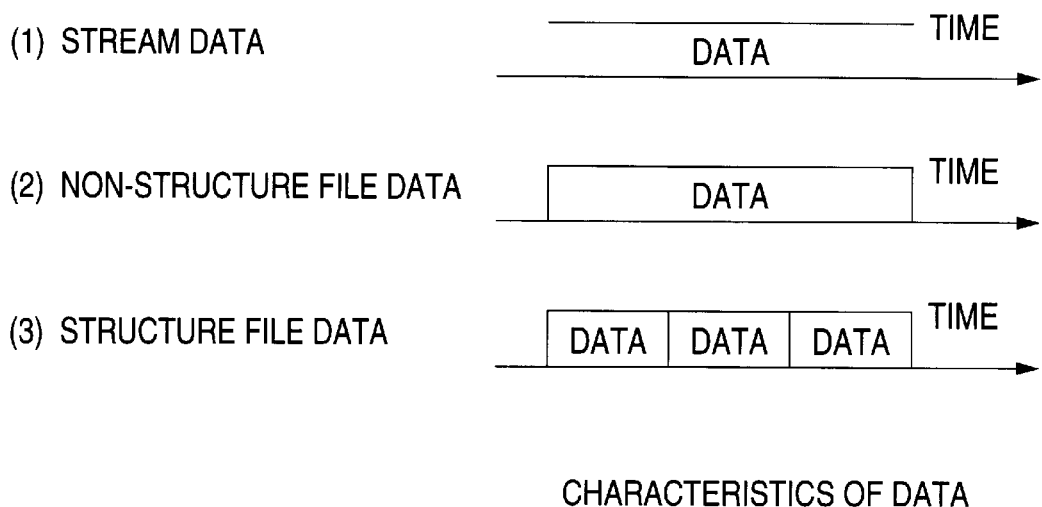
FIG. 1 is a time chart to explain characteristics of data.
Figure 2:
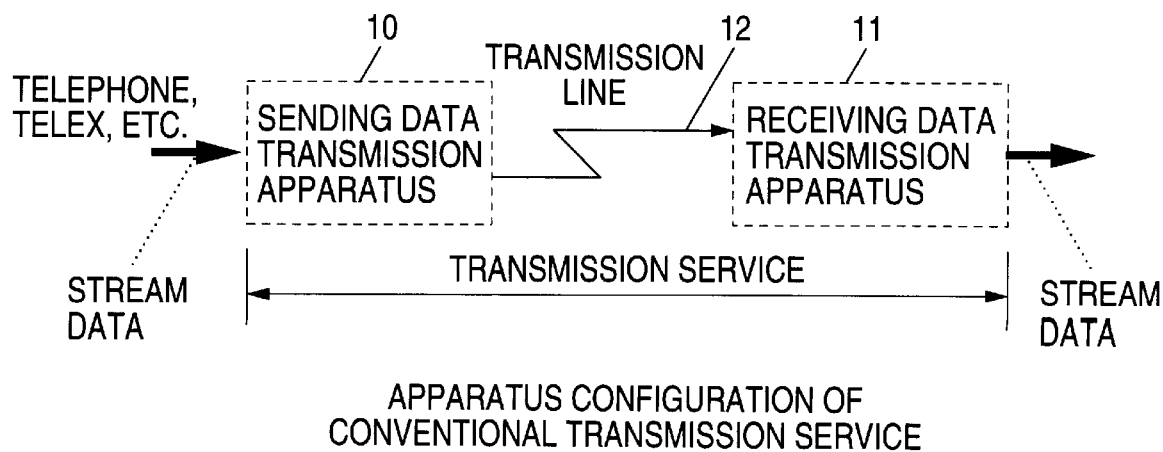
FIG. 2 is a block diagram to explain an apparatus configuration of stream data transmission service.
Figure 3:
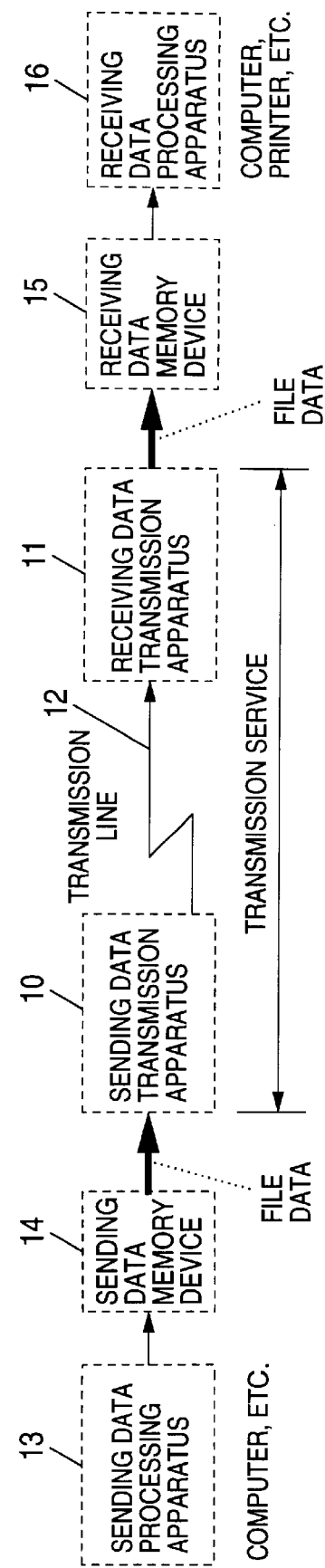
FIG. 3 is a block diagram to explain an apparatus configuration of conventional file data transmission service.
Figure 4:
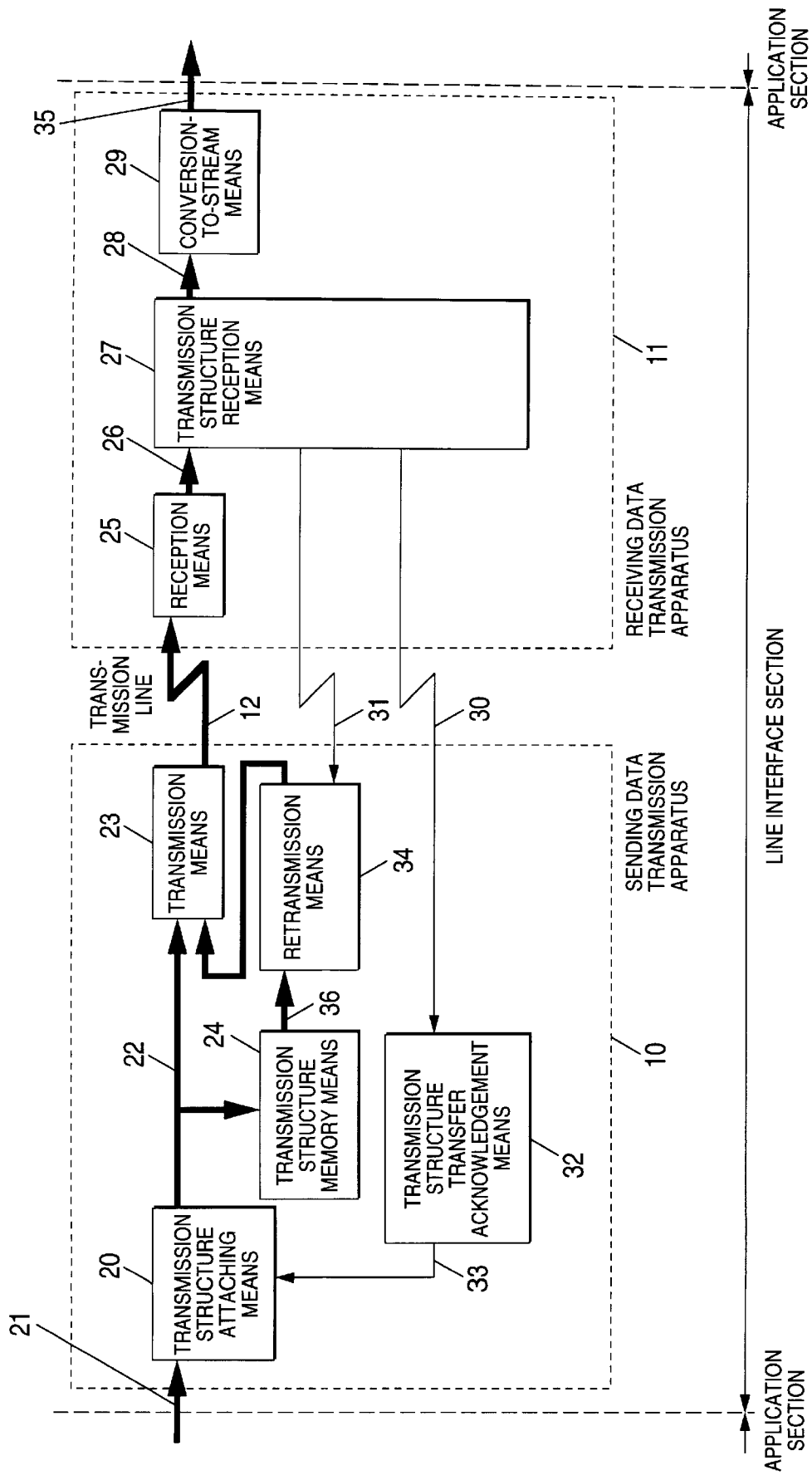
FIG. 4 is a block diagram to explain the conventional apparatus configuration in FIG. 3 in detail.
Figure 5:
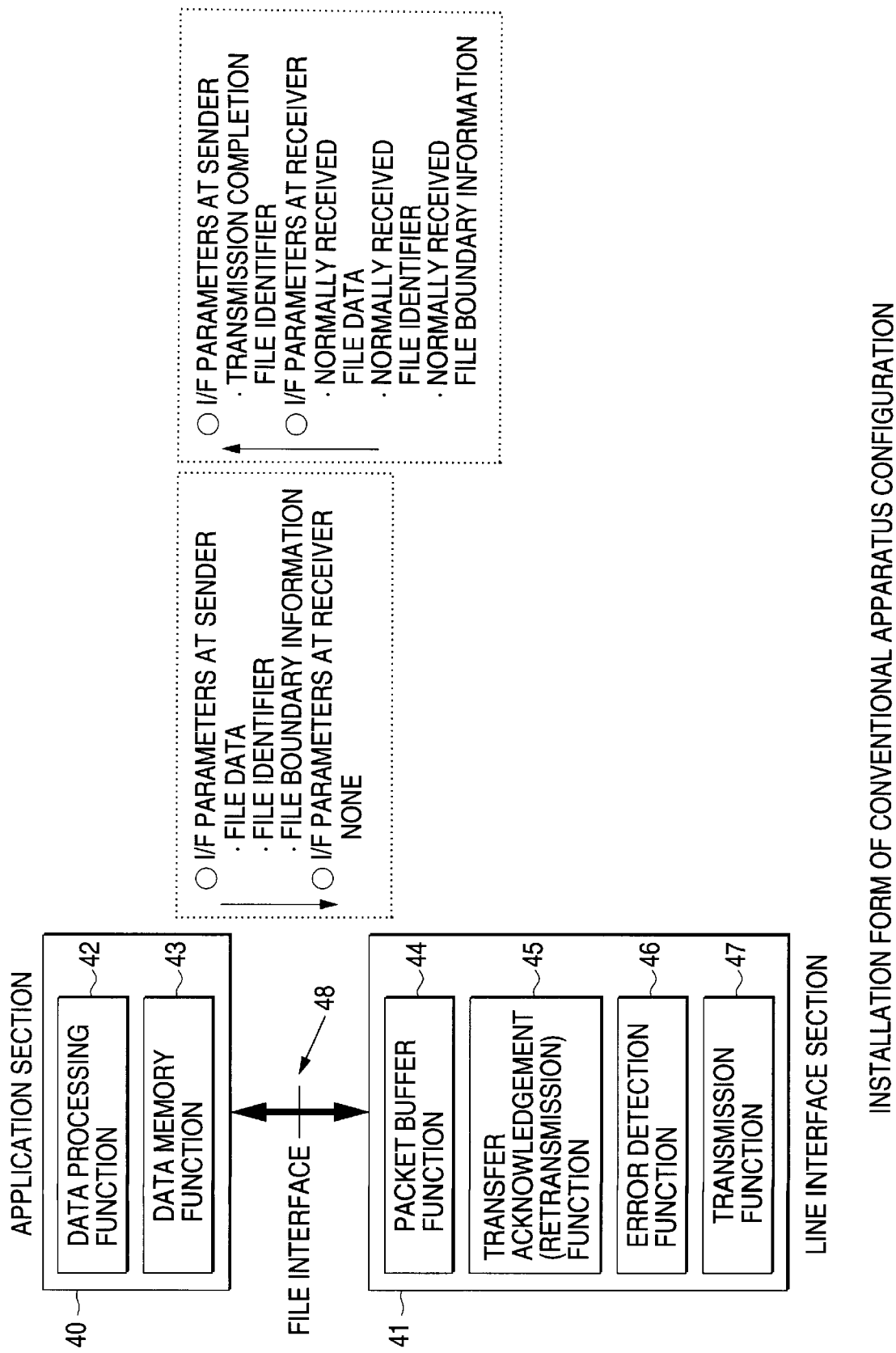
FIG. 5 is an illustration of the installation form of the configuration in FIG. 4.
Figure 6:
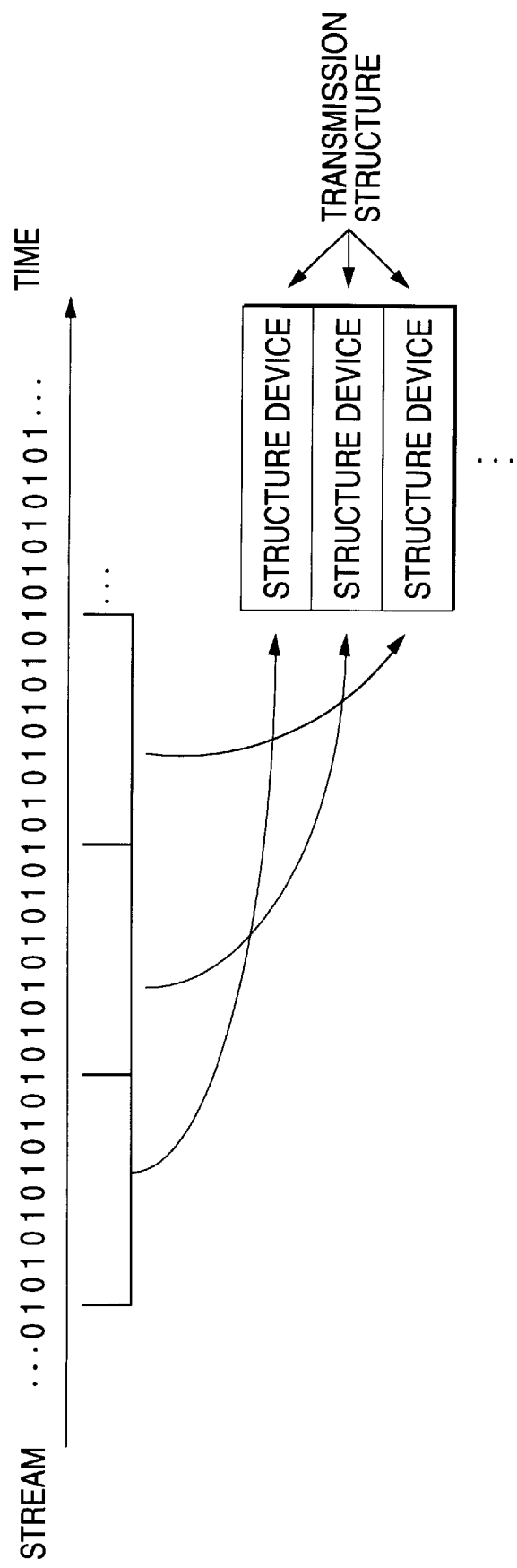
FIG. 6 is an illustration of a method of structuring stream data in transmission devices.
Figure 7:
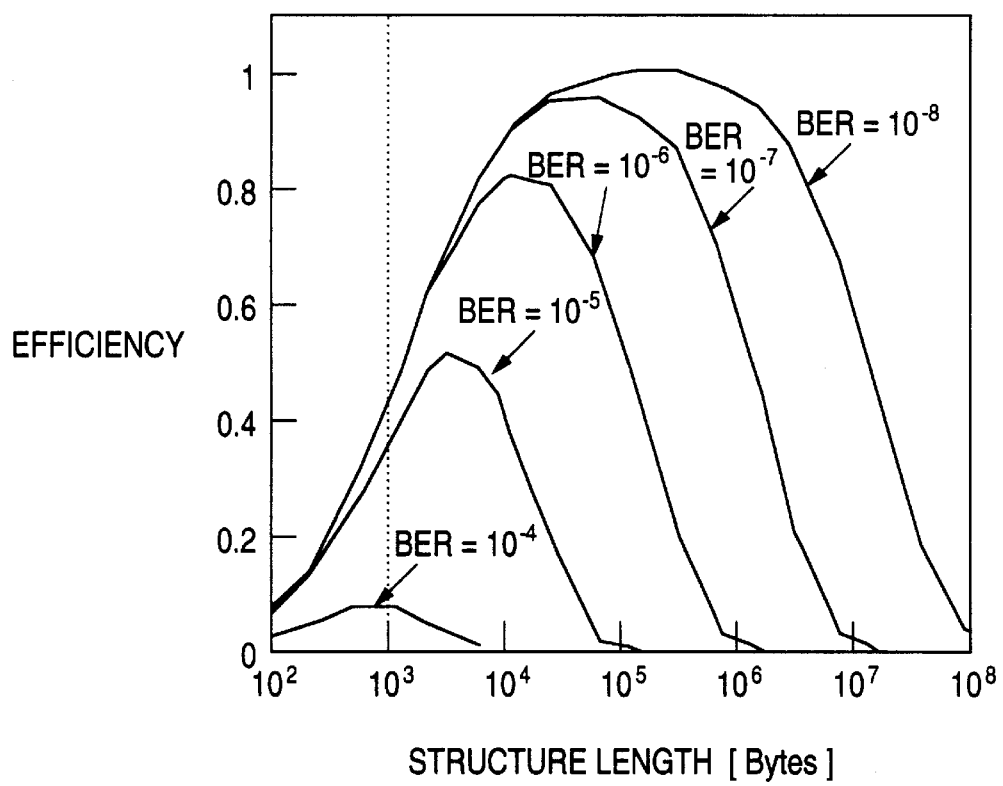
FIG. 7 is a graph to explain the relationship between the structure length and efficiency in prior art.
Figure 8:
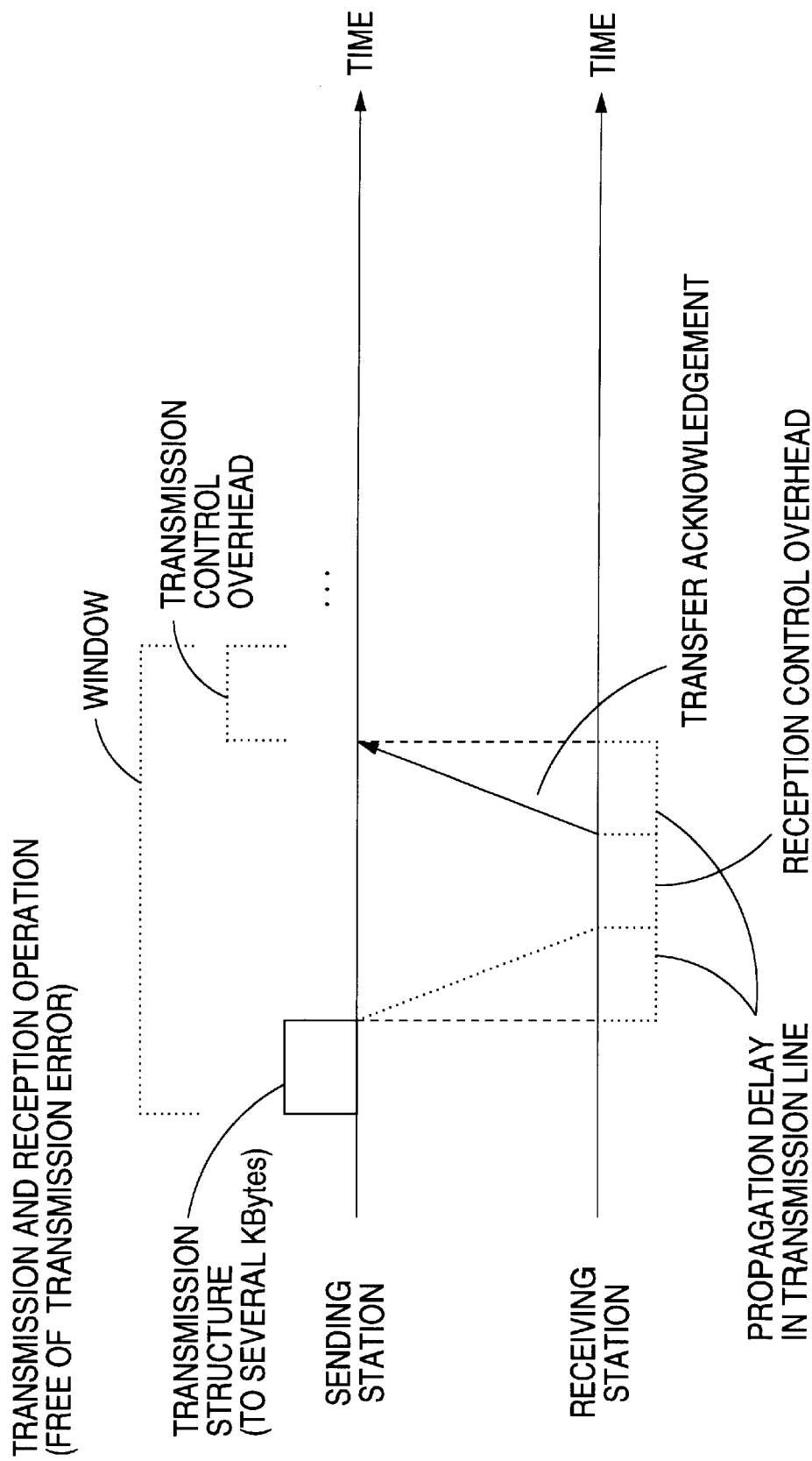
FIG. 8 is a time chart to explain transmission and reception operation (free from transmission error) in the prior art.
Figure 9:
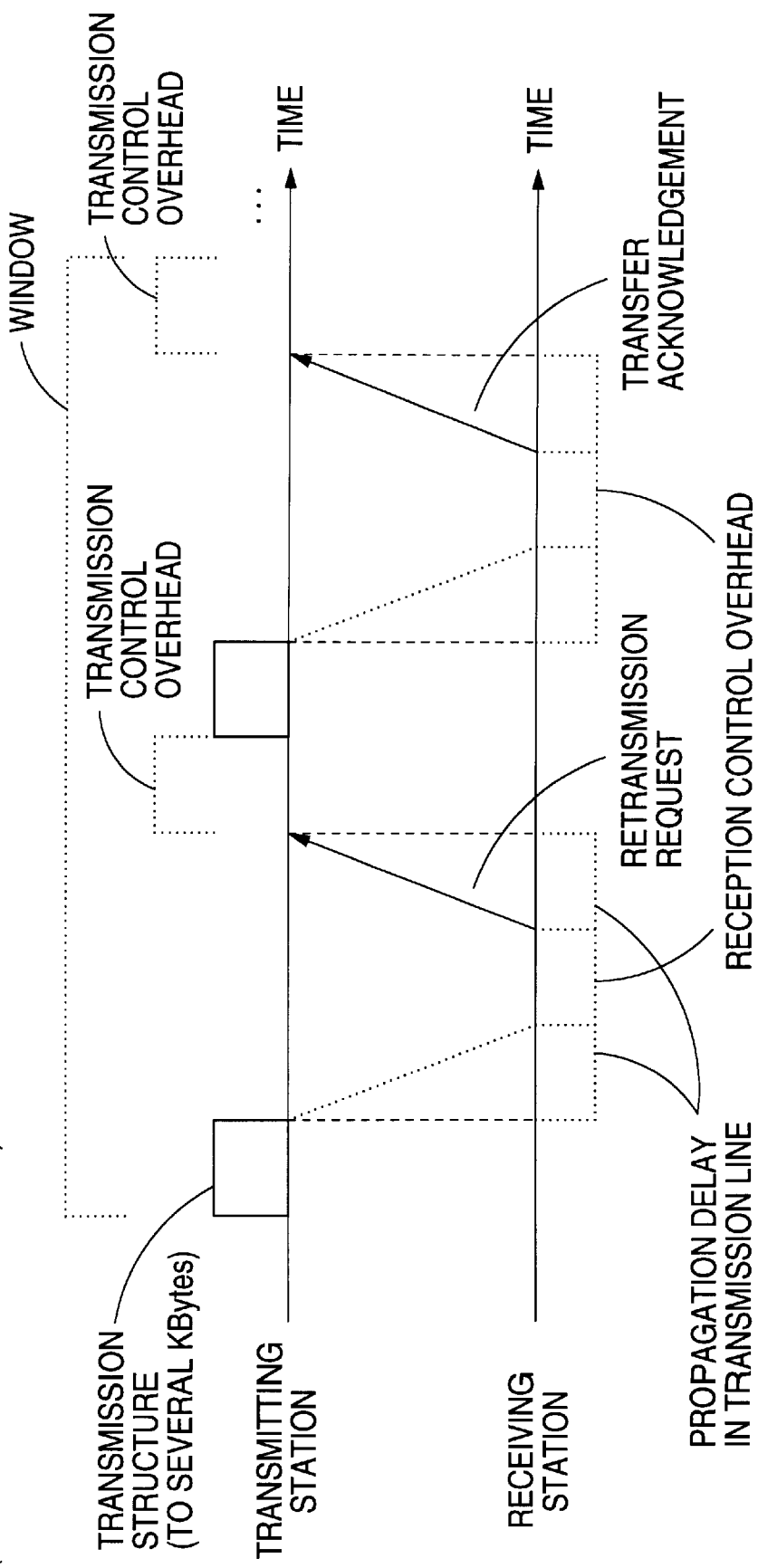
FIG. 9 is a time chart to explain transmission and reception operation (with transmission error) in the prior art.
Figure 10:
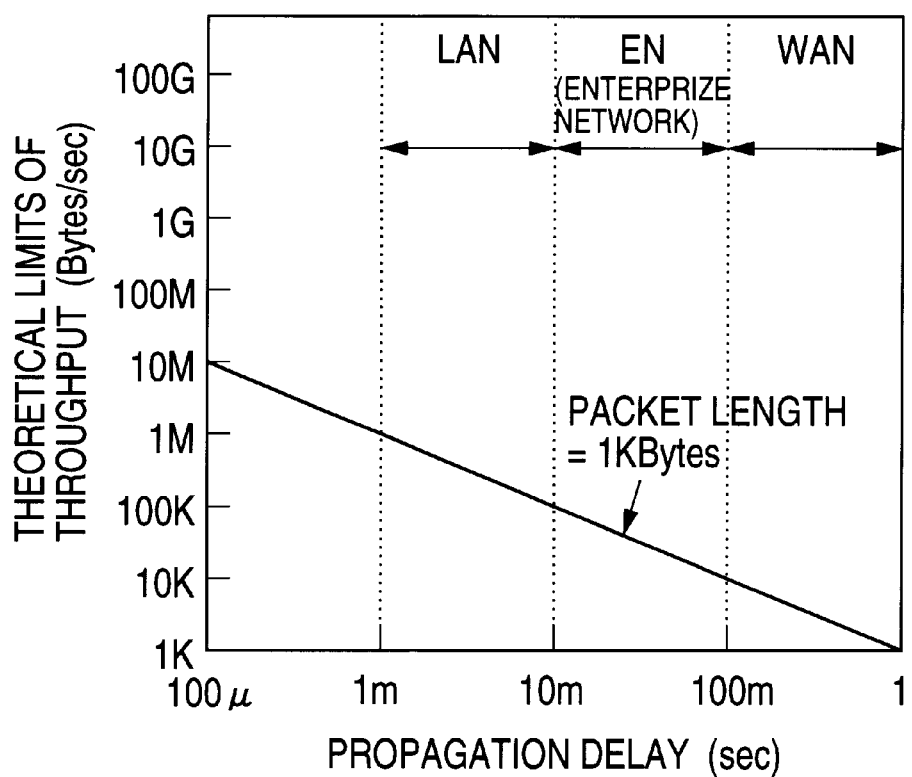
FIG. 10 is a graph to show the relationship between the throughput and propagation time in the prior art.

The reception means 108 checks each structure data piece transmitted from the transmitting station for transmission error according to the attached detection code. When detecting no transmission error, the reception means 108 sends the structure data to the structure reception means 109 over a signal line 122. When detecting a transmission error, the reception means 108 discards the structure device. The structure reception means 109 identifies the received structure data according to the structure identifier and uses the structure identifier to return a transfer acknowledgement notification over a signal line 123. It also locates the structure device with a transmission error occurring during the transmission according to the structure identifier and uses the structure identifier to return a retransmission request over a signal line 124. The structure reception means 109 also sends the structure data to the receiving data memory device 15 (FIG. 3) over a signal line 127.

In response to the retransmission request, the retransmission means 107 receives the structure data identified by the structure identifier over a signal line 125 and again transmits the structure data. The transfer acknowledgement means 106 determines transmission completion from the structure identifier of the structure data whose delivery has been secured, and sends a transfer acknowledgement notification over a signal line 126.

Figure 12:
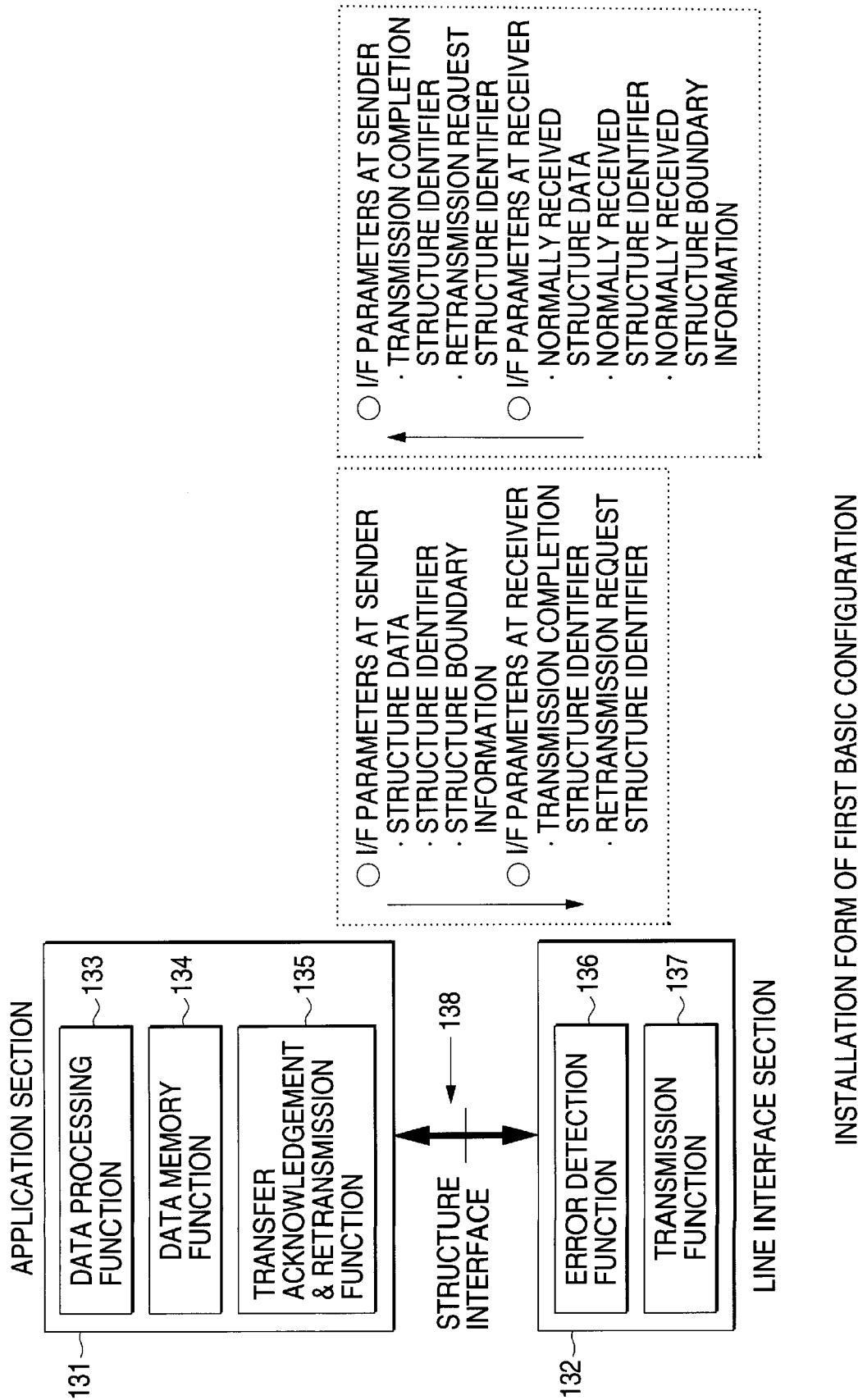
FIG. 12 is an illustration of the installation form of the basic configuration in FIG. 11.

FIG. 12 shows the installation configuration of the basic configuration in FIG. 11. In FIG. 12, the installation configuration is divided into an application section 131 and a line interface section 132. The application section 131 is provided with a data processing function 133, a data memory function 134, and a transfer acknowledgement retransmission function 135. The data processing function 133 and the data memory function 134 of the application section 131 correspond to the data processing apparatus and the data memory device (see FIG. 3) respectively. The transfer acknowledgement retransmission function 135 provides the structure marking up means 104, the retransmission means 107, and the transfer acknowledgement means 106 in FIG. 11 in the sending data transmission apparatus 101, and provides the structure reception means 109 in FIG. 11 in the receiving data transmission apparatus 102.

The line interface section 132 is provided with an error detection function 136 and a transmission function 137. In the sending data transmission apparatus, the error detection function 136 and the transmission function 137 provide the transmission means 105. Likewise, in the receiving data transmission apparatus, the error detection function 136 and the transmission function 137 provide the reception means 108.

The interface between the application section 131 and the line interface section 132 -is called a structure interface 138.

On the structure interface 138 of the sending station, structure data, a structure identifier for uniquely identifying each structure, and structure boundary information indicating the boundary of the structure are passed from the application section 131 to the line interface section 132, and a transmission completion structure identifier indicating the normal reception of the structure at the receiver and a retransmission request structure identifier indicating detection of an error in the structure are passed from the line interface section 132 to the application section 131.

On the structure interface 138 of the receiver, normally received structure data, a normally received structure identifier for uniquely identifying each normally received structure, and normally received structure boundary information indicating the boundary of the normally received structure are passed from the line interface section 132 to the application section 131, and a transmission completion structure identifier indicating the normal reception of the structure at the receiver and a retransmission request structure identifier indicating detection of an error in the structure are passed from the application section 131 to the line interface section 132. Transmission of the structure data is accomplished by the means.

Second basic configuration of the invention

Figure 13:
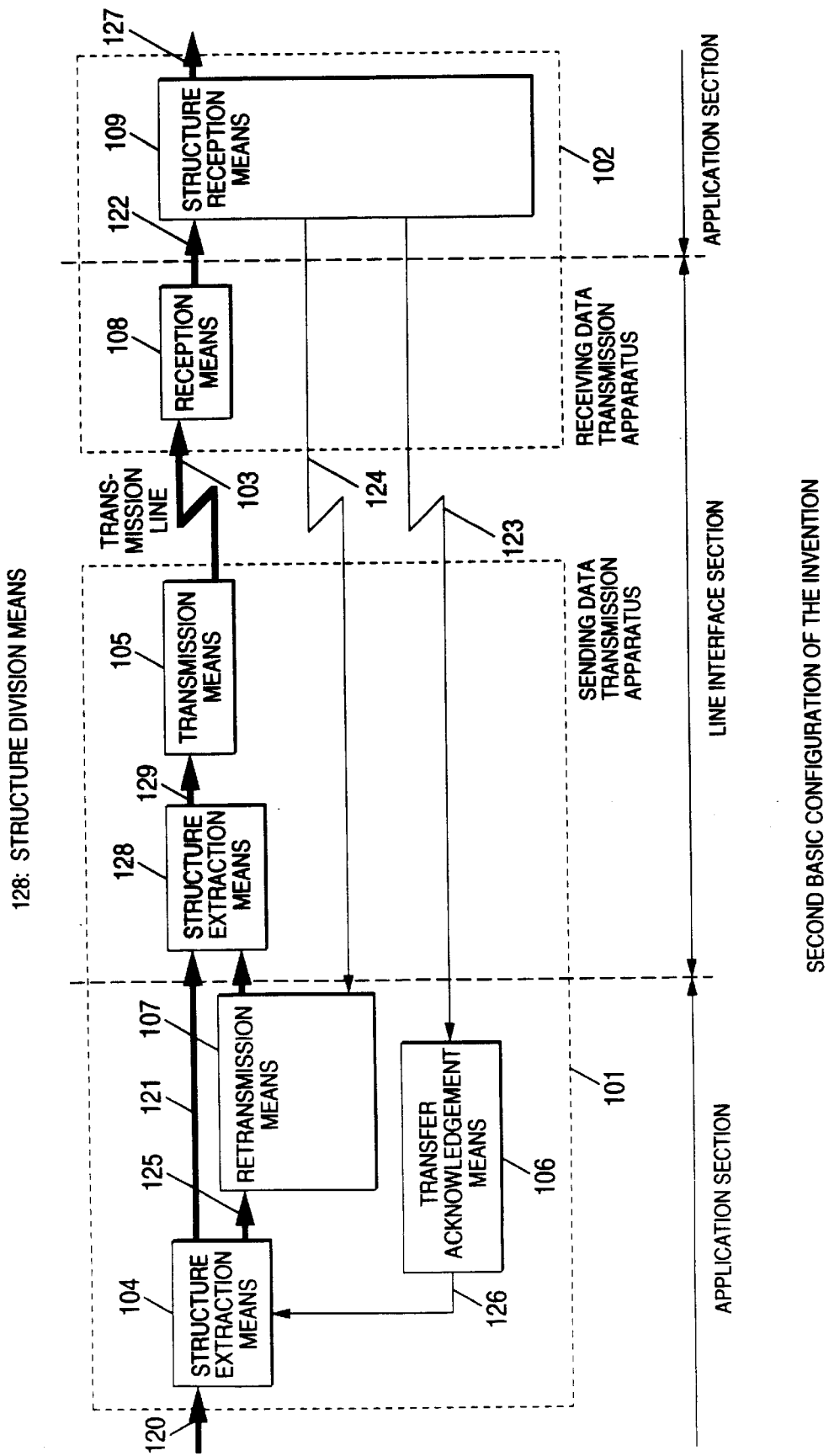
FIG. 13 is a block diagram to explain a second basic configuration of the invention.

FIG. 13 shows a second basic configuration of the invention. In the figure, a data transmission apparatus of the invention consists of a sending data transmission apparatus 101, a receiving data transmission apparatus 102, and a transmission line 103. The sending data transmission apparatus 101 has structure marking up means 104, structure division means 128, transmission means 105, transfer acknowledgement means 106, and retransmission means 107. The receiving data transmission apparatus 102 has reception means 108 and structure reception means 109. The structure marking up means 104 receives data in a structure file over a signal line 120, marks up structure information that the structure file originally has (structure device boundaries and structure identifier for identifying the structure), and sends structure data to a signal line 121, as in the first configuration in FIG. 11. The structure division means 128 divides a structure into one or more fragments, attaches a fragment identifier and fragment boundary information to each fragment data piece, and outputs them to a signal line 129. The transmission means 105 attaches an error detection code (for example, cyclic redundancy code CRC) to each fragment data piece and transmits the structure data to a receiver over the transmission line 103.

The reception means 108 checks each fragment data piece transmitted from the transmitting station for transmission error according to the attached error detection code. When detecting no transmission error, the reception means 108 sends the fragment data to the structure reception means 109 over a signal line 122. When detecting a transmission error, the reception means 108 discards the fragment data. The structure reception means 109 identifies the received fragment data according to the fragment identifier. When all structure data has been received, the structure reception means 109 judges the fact and uses the structure identifier to return a transfer acknowledgement notification over a signal line 123. It also locates the fragment data with a transmission error occurring during the transmission according to the fragment identifier and uses the fragment identifier to return a retransmission request over a signal line 124. The structure reception means 109 also sends the structure data over a signal line 127.

In response to the retransmission request, the retransmission means 107 receives the fragment data identified by the fragment identifier over a signal line 125 and again transmits the fragment data. The transfer acknowledgement means 106 determines transmission completion from the structure identifier of the structure data whose delivery has been secured, and sends a transfer acknowledgement notification over a signal line 126.

FIG. 14 shows the installation configuration of the basic configuration in FIG. 13. In FIG. 14, the installation configuration is divided into an application section 131 and a line interface section 132.

The application section 131 is provided with a data processing function 133, a data memory function 134, and a transfer acknowledgement retransmission function 135. The data processing function 133 and the data memory function 134 of the application section 131 correspond to the data processing apparatus and the data memory device (see FIG. 3) respectively. The transfer acknowledgement retransmission function 135 provides the structure marking up means 104, the retransmission means 107, and the transfer acknowledgement means 106 in FIG. 13 in the sending data transmission apparatus 101, and provides the structure reception means 109 in FIG. 13 in the receiving data transmission apparatus 102.

The line interface section 132 is provided with an error detection function 136 and a transmission function 137. In the sending data transmission apparatus, the error detection function 136 and the transmission function 137 provide the structure division means 128 and the transmission means 105. Likewise, in the receiving data transmission apparatus, the error detection function 136 and the transmission function 137 provide the reception means 108.

The interface between the application section 131 and the line interface section 132 is called a structure interface 138. On the structure interface 138 of the sending station, structure data, a structure identifier for uniquely identifying each structure, and structure boundary information indicating the boundary of the structure are passed from the application section 131 to the line interface section 132, and at the retransmission time, a fragment error part identifier for uniquely identifying each fragment is passed. A transmission completion structure identifier indicating the normal reception of the structure at the receiver and a retransmission request fragment error part identifier indicating detection of an error in the fragment are passed from the line interface section 132 to the application section 131.

On the structure interface 138 of the receiver, a received structure identifier for uniquely identifying each received structure, received structure boundary information indicating the boundary of the received structure, normally received fragment data, a normally received fragment identifier for uniquely identifying each normally received fragment, and normally received fragment boundary information indicating the boundary of the normally received fragment are passed from the line interface section 132 to the application section 131.

A transmission completion structure identifier indicating the normal reception of the structure at the receiver and a retransmission request fragment error part identifier indicating detections an error in the fragment are passed from the application section 131 to the line interface section 132. Transmission of the structure data is accomplished by the means.

Preferred Embodiments

The invention will be discussed in more details with reference to embodiments of the invention.

Structure

The expression "structure" in this specification is used to mean a collection of the coordinates of data and digital data making up the data and "structure marking up" is used to mean recognizing the coordinates of data and data separation on the coordinate axes.

First, the structure will be discussed with a specific example. A receiving processing apparatus performs application-proper processing for data input from a receiving data transmission apparatus. The input data is digital data; basically, it is a bit string of 0 and 1 and is insignificant as it is. The digital data is not referenced as significant data (simply, data) until an application for processing the data is introduced. For example, digital data (01010101) is referenced as data representing a pixel value in raster image processing or data representing a character in language processing.

Common coordinate axes to data and processing exist to relate input data to processing for the data. The coordinate axes are proper to processing and processing has one-dimensional or multi-dimensional coordinate axes. The data is mapped onto the coordinate axes, whereby it is made possible to process the data.

The structure is a collection of the coordinates of the data and digital data making up the data and structure marking up is to recognize the coordinates of data and data separation on the coordinate axes.

FIG. 15 shows an example of application-proper processing. For example, image processing includes putting a raster image into high picture quality, conversion of a raster image, and compression and decompression of video and raster images.

Figure 16:
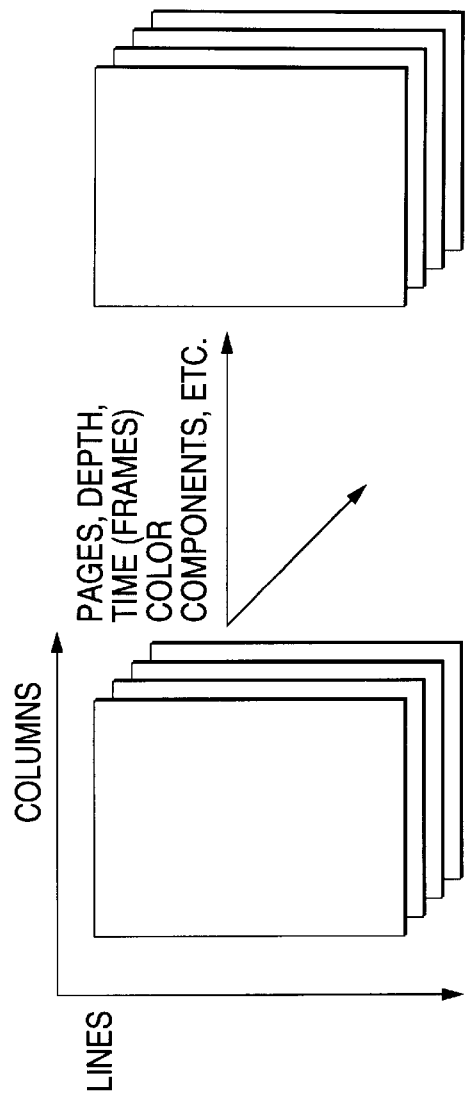
FIG. 16 is an illustration of structures used in the invention for showing coordinate axes.

As examples of the coordinate axes, various coordinate axes exist for each processing, such as columns, lines, pages, color components, depth, time (frames), frequency bands, and character strings, as shown in FIG. 16. For example, in image processing for a raster image, input digital data is referenced as pixel values on the coordinate axes such as columns, lines, pages, and color components. In raster image processing of a fault plane such as CT scan, a coordinate axis of depth is included. In video image processing, a coordinate axis representing a time axis generally called a frame is included.

Figure 17:
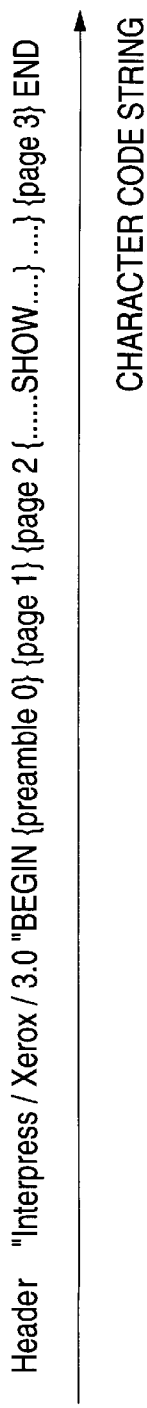
FIG. 17 is an illustration of another coordinate axis of processing.

In creation processing of a print image represented in a page description language, a character string becomes a coordinate axis, as shown in FIG. 17.

Figure 18:
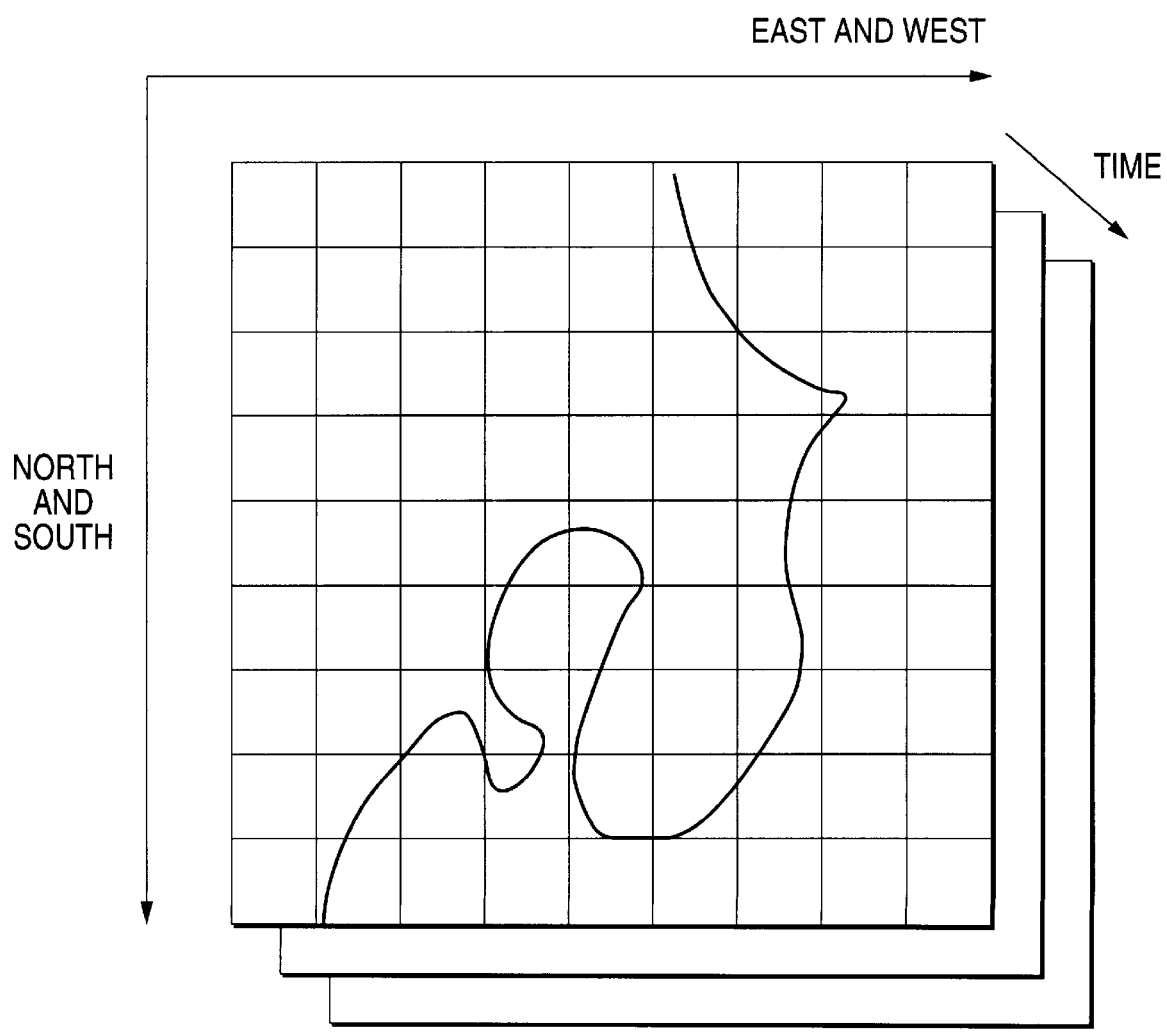
FIG. 18 is an illustration of another coordinate axis of processing.
Figure 19:
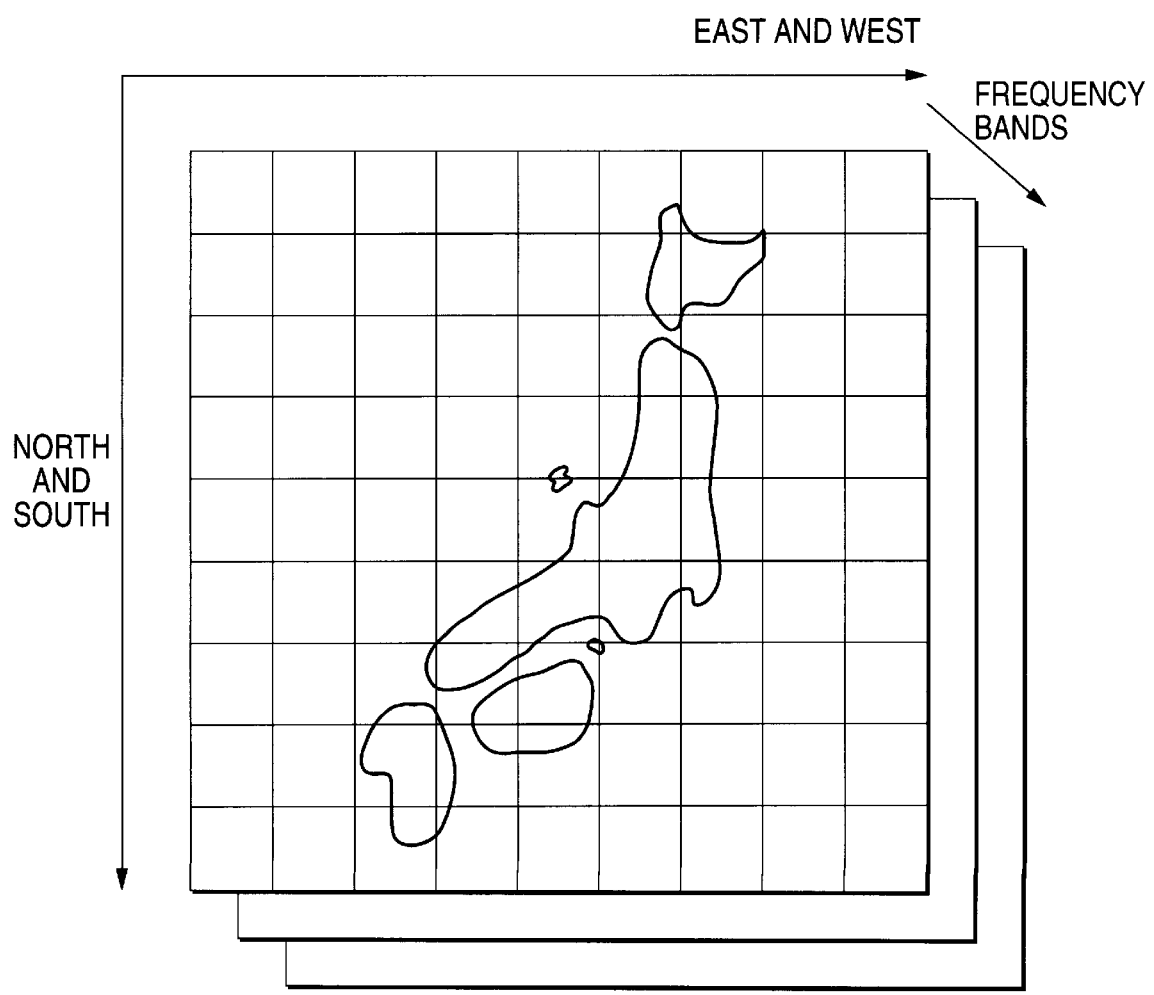
FIG. 19 is an illustration of another coordinate axis of processing.

In weather forecast analysis made by weather data prediction computation, the region to which weather prediction is applied is handled as a collection of squares into which the region is divided in the north, south, east, and west directions, as shown in FIG. 18, and input data is referenced as a value representing weather information in the region division corresponding to the square. The prediction result changes in the time axis direction.

In retrieval and analysis processing of a remote sensing image, device images resulting from shooting squares each having each side 185 Km on the earth surface are arranged in the north, south, east, and west directions and are also placed on the sensitive frequency band axis of the shooting sensor.

Structure marking up

Next, structure marking up means will be discussed. The structure marking up is to recognize the coordinates of data in a structure file and data separation on the coordinate axes. The structure files are roughly classified into the following three types:

(1) For a structure file with a held data length and a fixed number of data pieces on each coordinate axis, generally data is held in the file as an order array of the number of coordinate axes proper to processing and the data coordinates and data boundaries can be located as positions from the file top.

(2) Some structure files with a variable data length or a variable number of data pieces on each coordinate axis have delimiters each indicating the data boundary. In this case, the delimiters are detected in sequence starting at the file top, whereby the data coordinates and data boundaries can be located.

(3) Some structure files with a variable data length or a variable number of data pieces on each coordinate axis have headers indicating the data positions from the file top. In this case, the headers are referenced in sequence, whereby the data coordinates and data boundaries can be located.

Figure 20:
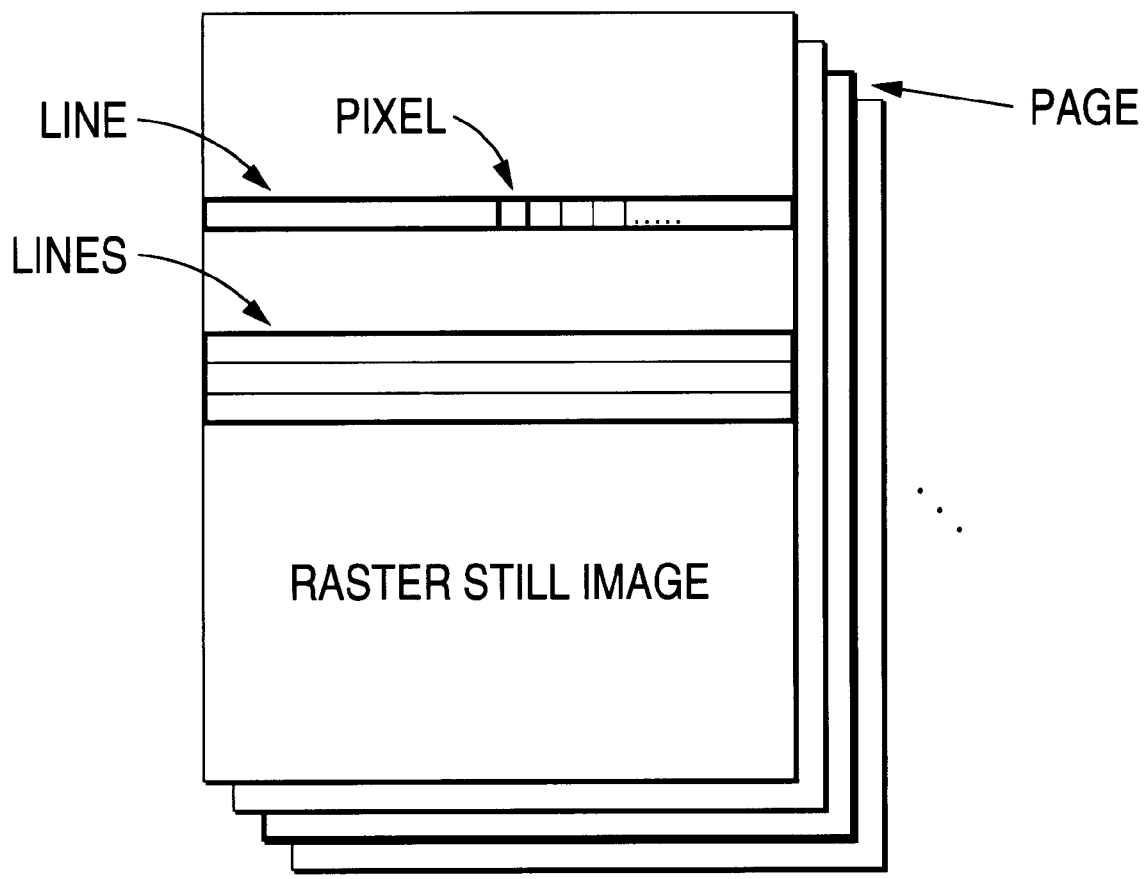
FIG. 20 is an illustration of an example of structures used in the invention.

Structure marking up examples are attached below:

A raster still image shown in FIG. 20 is an example wherein the number of data pieces on each coordinate axis is held. For the raster still image in this example, the number of lines per page, the number of pixels per line, and the bit length of each pixel are held. Thus, for example, to separate data for each page, digital data for each length of (number of lines per page)×(number of pixels per line)×(bit length of each pixel) may be marked up as a structure from the file top. For example, to separate data every N lines, digital data for each length of N×(number of pixels per line)×(bit length of each pixel) may be marked up as a structure from the file top.

Figures 21, 22:
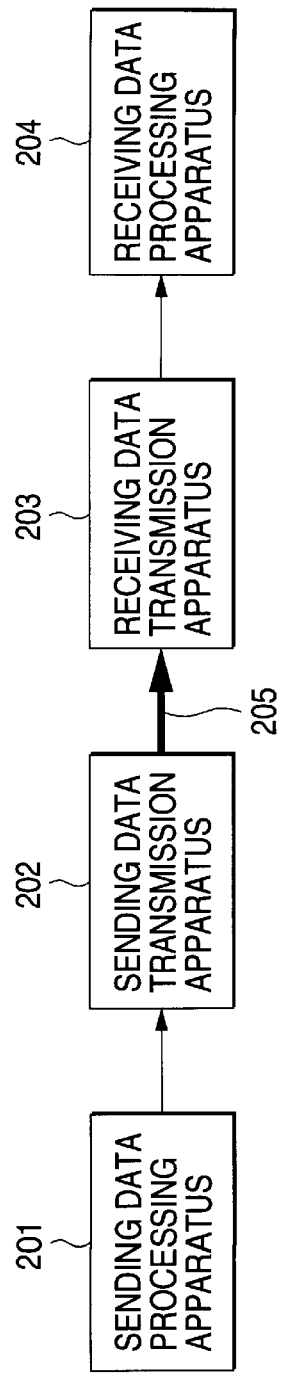
FIG. 21 is an illustration of another structure example.
FIG. 22 is a block diagram to show an embodiment of the invention as a whole.

An image in the page description language format (page description program) shown in FIG. 21 is an example wherein the data boundary is indicated by a delimiter. In this example, digital data is text-scanned as character code starting at the file top. For example, to separate the data in body devices, delimiters "{" and "}" indicating the beginning and end of a body may be detected for marking up the digital data enclosed in the delimiters as a structure; for example, to separate the data in page devices, delimiters "{" and "}" indicating the beginning and end of a page body may be detected for marking up the digital data enclosed in the delimiters as a structure.

Embodiment 1

The invention will be discussed in more detail along a first embodiment of the invention. The first embodiment corresponds to the first basic configuration in FIG. 11.

FIG. 22 shows a data transmission apparatus of the invention as a whole. In the figure, the data transmission apparatus comprises a sending data processing apparatus 201, a sending data transmission apparatus 202, a receiving data transmission apparatus 203, and a receiving data processing apparatus 204. Data held in the sending data processing apparatus 201 is sent by the sending data transmission apparatus 202 over a transmission line 205 to the receiving data transmission apparatus 203 and is processed by the receiving data processing apparatus 204.

Assuming that one or more structure data pieces (files) are memorized on a contiguous address space of memory means such as a semiconductor memory or a magnetic disk device in the sending data processing apparatus 201, the sending data processing apparatus 201 outputs the structure data of any size at any location in the file to the sending data transmission apparatus 202 in accordance with an instruction from the sending data transmission apparatus 202.

The receiving data processing apparatus 204 is provided with memory means such as a semiconductor memory or a magnetic disk device having a capacity for memorizing at least one structure and stores structure data output from the receiving data transmission apparatus 203 in any location of the memory means.

Figure 23:
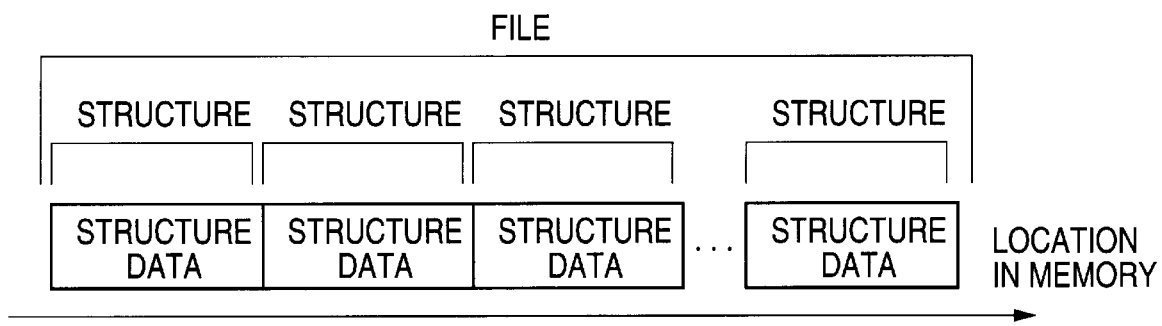
FIG. 23 is an illustration of a file, structures, and structure data.

The sending data transmission apparatus 202 transmits a file memorized in the sending data processing apparatus 201 to the receiving data processing apparatus 204 in response to an instruction from the sending data processing apparatus 201. The file is made up of one or more structures and the structure is made up of contiguous data, as shown in FIG. 23.

The sending data transmission apparatus 202 inputs data in structure devices from the sending data processing apparatus 201, forms a structure frame, and transmits the structure frame to the receiving data transmission apparatus 203.

Figure 24:
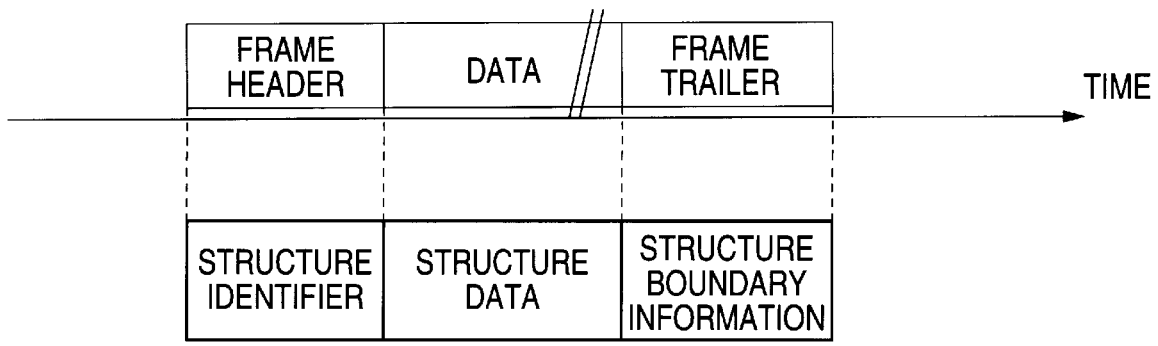
FIG. 24 is an illustration of a structure frame in the first embodiment of the invention.
Figure 25:
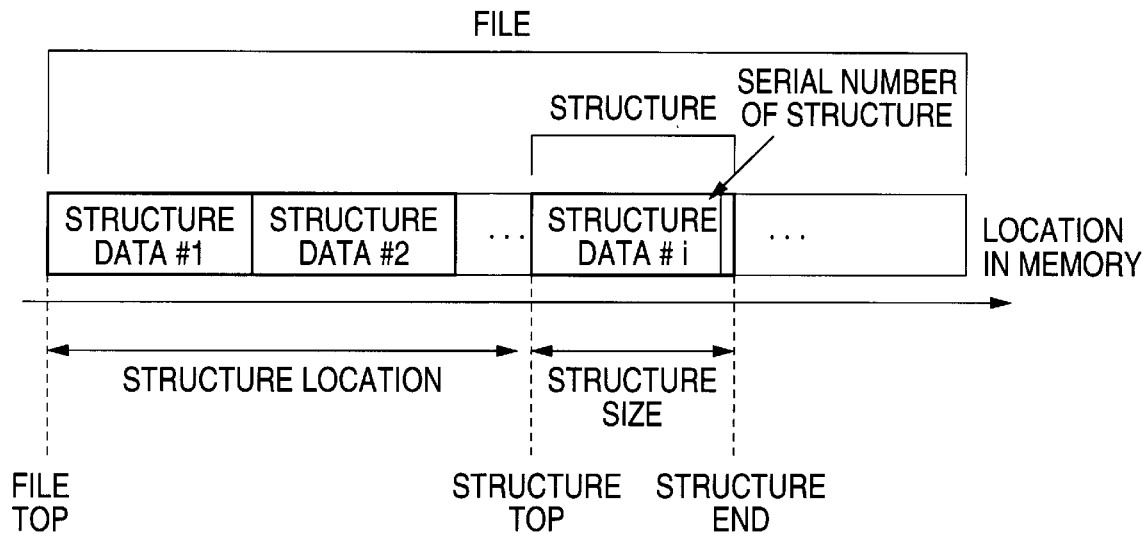
FIG. 25 is an illustration to show a state in which the structure frames in FIG. 24 are continuous.

The structure frame is made up of a frame header, data, and a frame trailer, as shown in FIG. 24. A structure identifier for uniquely identifying the structure is held in the frame header. For example, the location of the structure data from the file top is used as the structure identifier. For example, serial numbers assigned to structures in sequence starting at the file top are used as the structure identifiers. For example, structure data is held as data in the frame. Structure boundary information for determining the structure boundary is held in the frame trailer. For example, the size of the structure data is used as the structure boundary information. Frags indicating the boundaries between structure data pieces such as the structure top and structure end are used. FIG. 25 shows examples of the structure identifiers and the structure boundary information.

To form a structure frame, the sending data transmission apparatus 202 may once buffer structure data, then attaches a header preceding the structure data and a trailer following the structure data. For example, before starting transmission of structure data of one structure, the sending data transmission apparatus 202 may create a structure frame header and send the head, then may send the structure data following the header in parallel with reading from the sending data processing apparatus 201 and after the transmission termination of the structure data, may create a frame trailer and send the trailer.

For example, the sending data transmission apparatus 202 regards the file top as the top of the first structure, monitors the subsequent input data, detects the structure boundary, interprets the data immediately preceding the structure boundary as the structure end and the data following the structure boundary as the top of the next structure for forming structure frames, and transmits the structure frames in sequence to the receiving data transmission apparatus 203 until completion of transmission of all structures in the file.

Figure 26:
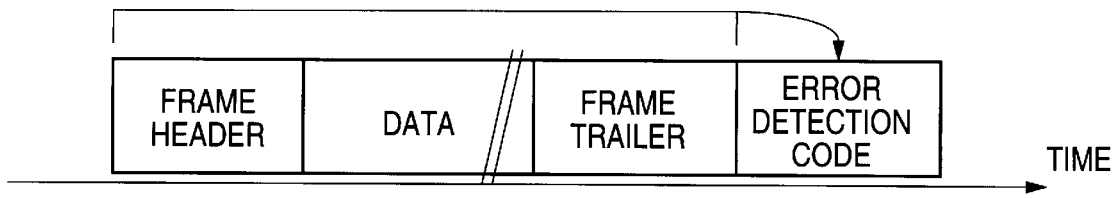
FIG. 26 is an illustration to show an example of error detection code addition to the structure frame in FIG. 24.
Figure 27:
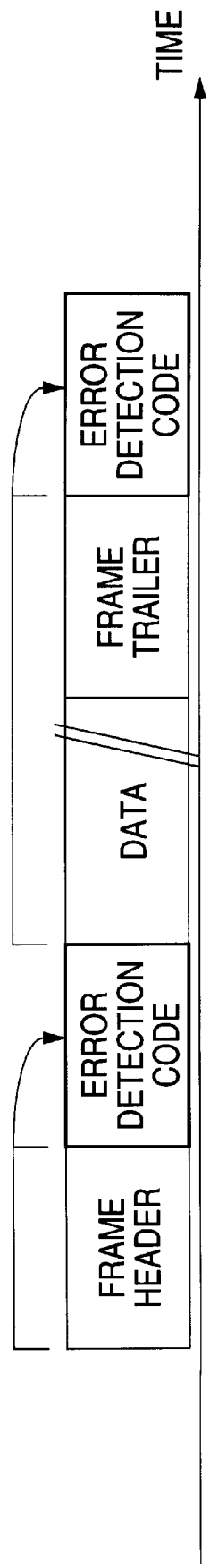
FIG. 27 is an illustration to show another example of error detection code addition to the structure frame in FIG. 24.

The sending data transmission apparatus 202 creates an error detection code in parallel with transmission of the data in the structure frame from the frame header to the frame trailer and adds the error detection code to the end of the structure frame for transmission. For example, cyclic redundancy code CRC is used as the error detection code. FIG. 26 shows an example of addition of an error detection code to a structure frame. The sending data transmission apparatus 202 may create an error detection code to a frame header aside from an error detection code to the remaining data in the structure frame and attach that error detection code to the frame header, as shown in FIG. 27.

To separate structure data from the received structure frame, for example, the receiving data transmission apparatus 203 once receives the whole structure frame from the sending data transmission apparatus 202 and buffers the frame, then outputs the structure data in the structure frame to the receiving data processing apparatus 204. Of course, the sequence is not limited to it. To receive a structure frame from the sending data transmission apparatus 202, for example, the receiving data transmission apparatus 203 may first receive a frame header, get a structure identifier held in the frame header, and output the structure identifier to the receiving data processing apparatus 204.

The receiving data transmission apparatus 203 outputs the subsequently received structure data to the receiving data processing apparatus 204 in sequence. When receiving a frame trailer, the receiving data transmission apparatus 203 uses the error detection code attached to the frame trailer to check the frame data for error. If the receiving data transmission apparatus 203 does not detect any error in the frame data, it gets structure boundary information held in the frame trailer and sends this structure boundary information to the receiving data processing apparatus 204, thereby informing the receiving data processing apparatus 204 that the already output structure identifier and structure data are valid. On the other hand, if the receiving data transmission apparatus 203 detects an error in the frame data, it informs the receiving data processing apparatus 204 that the already output structure identifier and structure data are invalid.

Upon normal reception completion of the structure data transmitted from the sending data transmission apparatus 202, the receiving data transmission apparatus 203 returns a transfer acknowledgement notification of the structure data to the sending data transmission apparatus 202.

If the sending data transmission apparatus 202 does not transmit structure data of another structure until reception of the transfer acknowledgement notification of the transmitted structure data, for example, only the transfer acknowledgement message is used as transfer acknowledgement information returned to the sending data transmission apparatus 202 from the receiving data transmission apparatus 203; if the sending data transmission apparatus 202 transmits structure data of another structure before reception of the transfer acknowledgement notification of the transmitted structure data, for example, the structure identifier of the structure data normally received at the receiving data transmission apparatus 203 is used as transfer acknowledgement information returned to the sending data transmission apparatus 202.

If the receiving data transmission apparatus 203 cannot normally receive the structure data transmitted from the sending data transmission apparatus 202, for example, if an error is detected in the structure frame and the structure data becomes invalid, it issues a request for retransmitting the structure data to the sending data transmission apparatus 202.

If the sending data transmission apparatus 202 does not transmit structure data of another structure until reception of the transfer acknowledgement notification of the transmitted structure data, for example, only the retransmission request message is used as structure data retransmission request information returned to the sending data transmission apparatus 202 from the receiving data transmission apparatus 203; if the sending data transmission apparatus 202 transmits structure data of another structure before reception of the transfer acknowledgement notification of the transmitted structure data, for example, the structure identifier of the structure data not normally received at the receiving data transmission apparatus 203 is used as retransmission request information returned to the sending data transmission apparatus 202.

When receiving the structure data retransmission request from the receiving data transmission apparatus 203, the sending data transmission apparatus 202 again inputs the structure data to be retransmitted from the sending data processing apparatus 201, forms a structure frame, and transmits the structure frame to the receiving data transmission apparatus 203.

For the sending data transmission apparatus 202 to again input the structure data from the sending data processing apparatus 201 in response to the retransmission request, at least the location information of the structure data to be retransmitted from the file top is required. For the sending data transmission apparatus 202 to know the location of the structure data to be retransmitted from the file top, for example, if the sending data transmission apparatus 202 does not transmit structure data of another structure until reception of the transfer acknowledgement notification of the transmitted structure data, the location of the structure data of the transmitted structure from the file top is memorized in the sending data transmission apparatus 202, as shown in FIG. 28; for example, if the sending data transmission apparatus 202 transmits structure data of another structure before reception of the transfer acknowledgement notification of the transmitted structure data, the structure identifier of the transmitted structure data and the location of the structure data from the file top are memorized in relation to each other in the sending data transmission apparatus 202. For example, as shown in FIG. 29, the structure identifier of the transmitted structure data, the location of the structure data from the file top, and the structure size are memorized in relation to each other in the sending data transmission apparatus 202.

When the sending data transmission apparatus 202 transmits all structure data in the file to the receiving data transmission apparatus 203 and receives transfer acknowledgement of all the structure data from the receiving data transmission apparatus 203, it informs the sending data processing apparatus 201 that the file transmission is complete, and terminates the file transmission processing.

Figure 30:
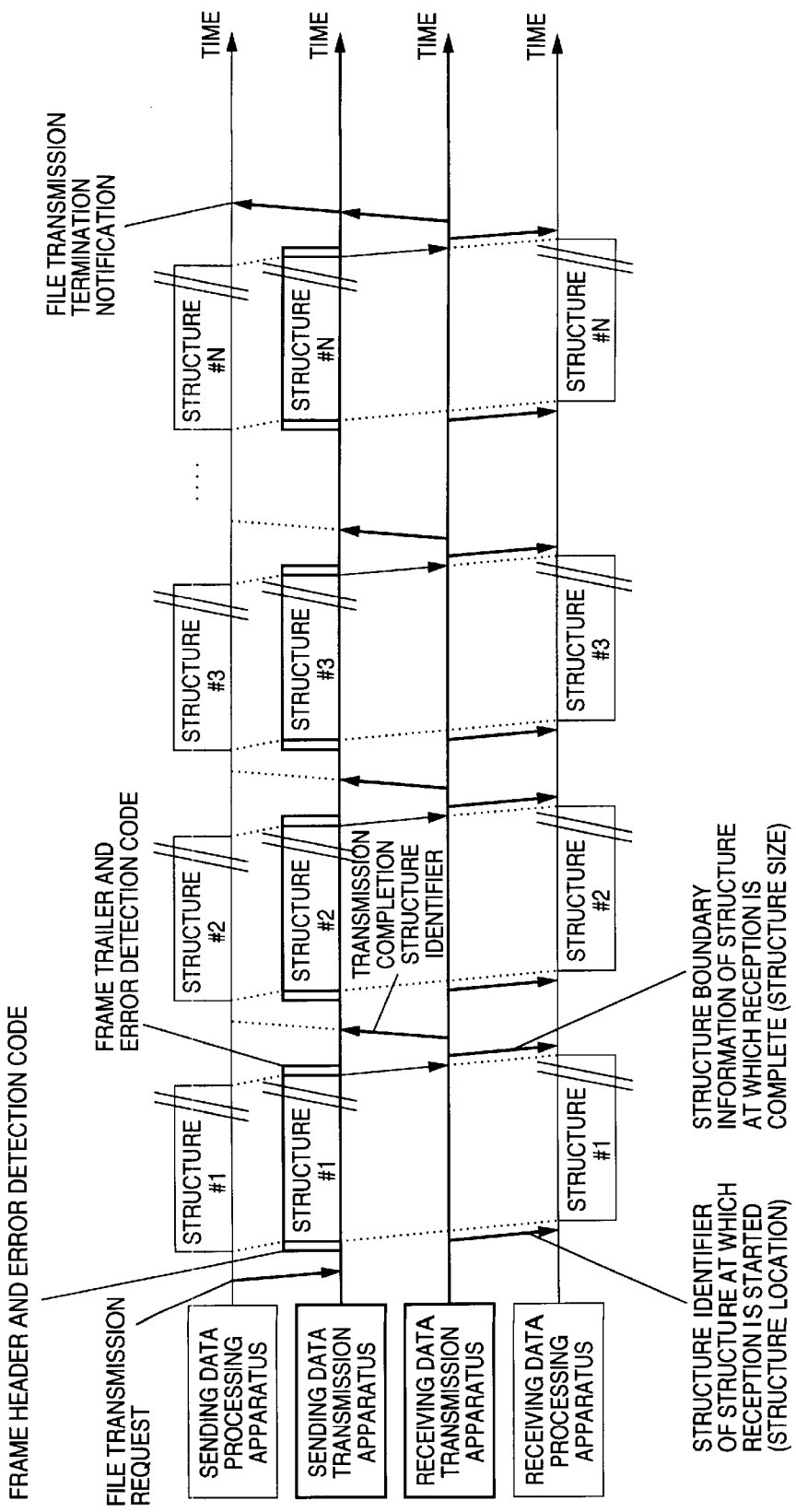
FIG. 30 is an illustration of a data transfer sequence (with no transmission error) in the first embodiment of the invention.

FIG. 30 shows a file transmission sequence when no transmission error occurs. As seen in the figure, data transmission completion is notified and secured in structure data devices. The structure data normally has a large data amount (for example, print information) and data transmission completion is notified and secured in the device, so that the data transmission throughput is improved. Since data transmission is complete in structure data devices, the receiving data processing apparatus can start data processing in structure data devices and the wait time decreases as compared with the case where all data is transmitted before processing is started.

Figure 31:
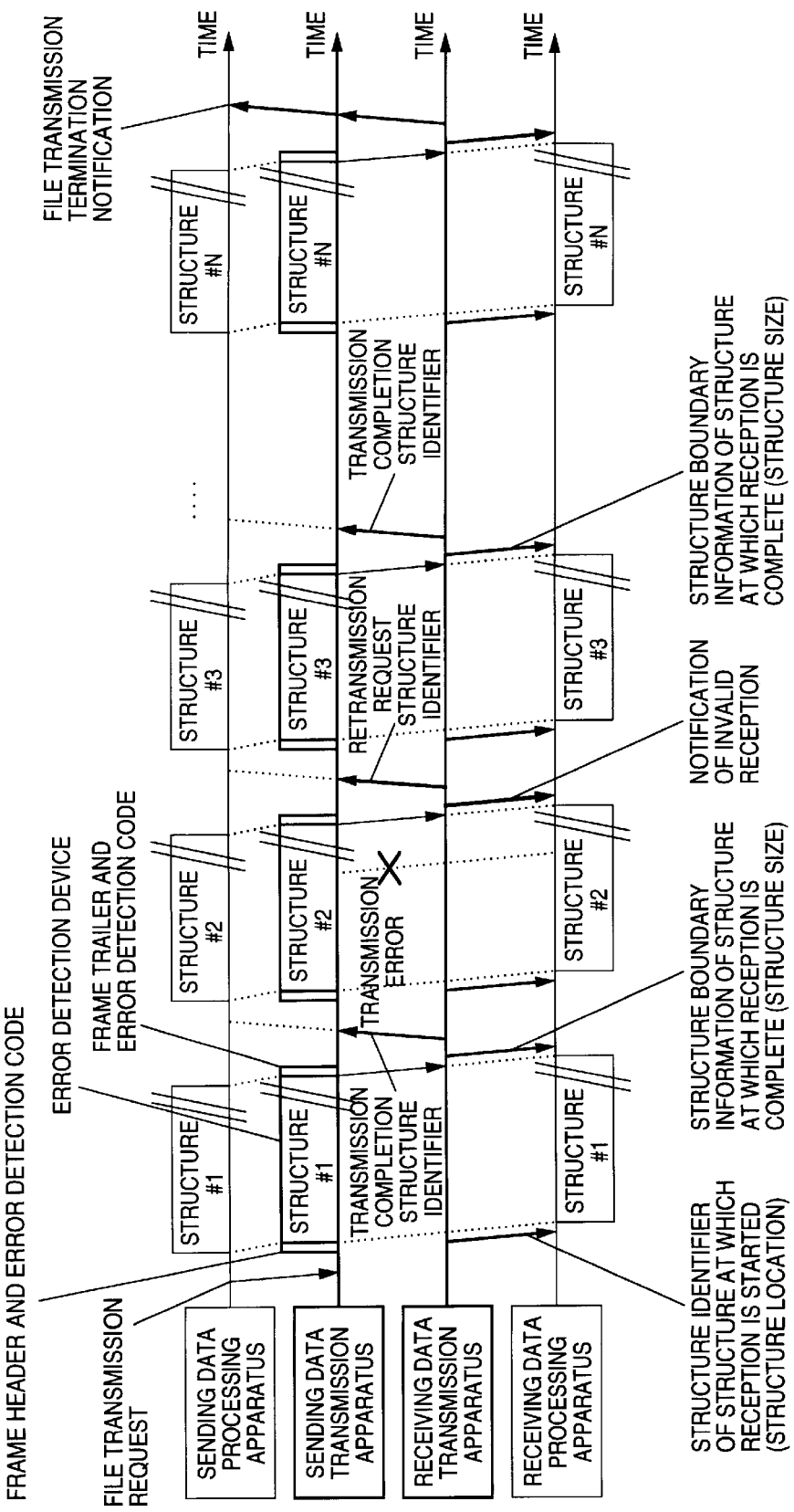
FIG. 31 is an illustration of a data transfer sequence (with a transmission error) in the first embodiment of the invention.

FIG. 31 shows a file transmission sequence of the data transmission apparatus when a transmission error occurs. When a transmission error occurs in structure data, the structure data is retransmitted immediately after it is transmitted.

Embodiment 2

The invention will be discussed in more detail along a second embodiment of the invention. The second embodiment corresponds to the second basic configuration in FIG. 13.

The general configuration of the second embodiment is similar to that of the first embodiment shown in FIG. 22. In the second embodiment, structure data is divided into error detection devices and an error detection code is added to each error detection device for transmitting the structure data. The error detection devices into which the structure data is divided are called fragments and data in each fragment is called fragment data. When a transmission error occurs, only the error detection device not normally received at a receiving data transmission apparatus 203 due to the transmission error is retransmitted. When all fragments in the structure are normally received at a receiving data transmission apparatus 203, transfer acknowledgement is made.

A sending data transmission apparatus 202 forms a structure frame from data input from a sending data processing apparatus 201 and transmits the structure frame to the receiving data transmission apparatus 203. As in the first embodiment, the structure frame is made up of a frame header, data, and a frame trailer, as shown in FIG. 24. However, data held in the structure frame is not necessarily all structure data of one structure. It is made up of data of one fragment or data of fragments in contiguous locations in the structure.

A structure identifier for uniquely identifying the structure to which the fragment held in the structure frame is held in the frame header. An fragment identifier for uniquely identifying the fragment data and fragment boundary information for determining the fragment data boundary are attached to the fragment data in the frame.

For example, the location of the fragment data from the structure top is used as the fragment identifier. For example, serial numbers assigned to fragments in sequence starting at the fragment at the structure top with the fragment data size as a fixed length are used as the fragment identifiers.

For example, the fragment data size is used as the fragment boundary information. For example, flags indicating the fragment top and end are also used.

Structure boundary information for determining the boundary of the structure to which the fragments held in the structure frame belong is held in the frame trailer. For example, the size of the structure data is used as the structure boundary information.

Figure 32:
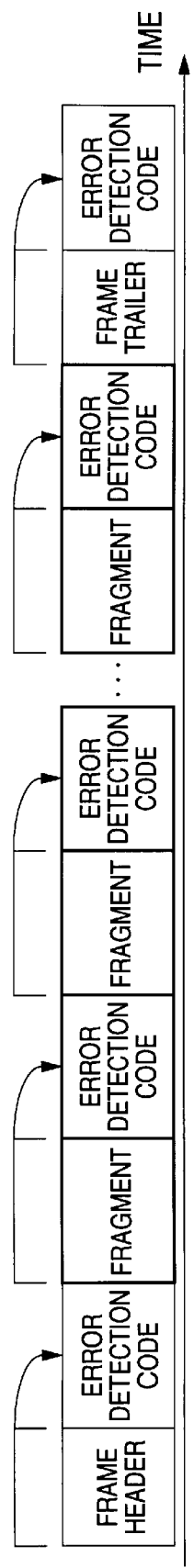
FIG. 32 is an illustration of a second embodiment of the invention.

For example, the sending data transmission apparatus 202 adds an error detection code to the frame header and frame trailer of a structure frame and each fragment in the structure frame for transmission of the structure frame. FIG. 32 shows an example of error detection code addition to the structure frame.

For example, to receive a structure frame from the sending data transmission apparatus 202, when receiving a frame header, first the receiving data transmission apparatus 203 uses an error detection code attached to the frame header to check the data in the frame header for error. If the receiving data transmission apparatus 203 does not detect any error in the data in the frame header, it gets the structure identifier held in the frame header and sends this structure identifier to the receiving data processing apparatus 204. On the other hand, if the receiving data transmission apparatus 203 detects an error in the data in the frame header, it discards the received data and does not output data to the receiving data processing apparatus 204 until reception of the next structure frame.

The receiving data transmission apparatus 203 outputs one or more subsequently received fragment data pieces to the receiving data processing apparatus 204 in sequence. When receiving each fragment to the end, the receiving data transmission apparatus 203 uses the error detection code added to the fragment to check the fragment data for error. If the receiving data transmission apparatus 203 does not detect any error in the fragment data, it informs the receiving data processing apparatus 204 that the already output fragment data is valid. If the receiving data transmission apparatus 203 detects an error in the fragment data, it informs the receiving data processing apparatus 204 that the already output the fragment data is invalid. When receiving a frame trailer, the receiving data transmission apparatus 203 uses the error detection code attached to the frame trailer to check the data in the frame trailer for error. If the receiving data transmission apparatus 203 does not detect any error in the data in the frame trailer, it gets structure boundary information held in the frame trailer and sends this structure boundary information to the receiving data processing apparatus 204. If the receiving data transmission apparatus 203 detects an error in the data in the frame trailer, it does not send the information in the frame trailer to the receiving data processing apparatus 204.

Upon normal reception completion of all the structure data of one structure transmitted from the sending data transmission apparatus 202, the receiving data transmission apparatus 203 returns a transfer acknowledgement notification of the structure data to the sending data transmission apparatus 202. On the other hand, if the receiving data transmission apparatus 203 cannot normally receive the structure data transmitted from the sending data transmission apparatus 202, for example, if an error is detected in a fragment and the fragment becomes invalid, it issues a request for retransmitting the fragment to the sending data transmission apparatus 202.

For example, the fragment identifier of the fragment data not normally received at the receiving data transmission apparatus 203 is used as fragment retransmission request information returned to the sending data transmission apparatus 202 from the receiving data transmission apparatus 203. The structure identifier of the structure to which the fragment belongs is involved as required.

When receiving the fragment data retransmission request from the receiving data transmission apparatus 203, the sending data transmission apparatus 202 again inputs the fragment data to be retransmitted from the sending data processing apparatus 201, forms a structure frame, and transmits the structure frame to the receiving data transmission apparatus 203.

For the sending data transmission apparatus 202 to again input the fragment data from the sending data processing apparatus 201 in response to the retransmission request, at least the location information of the fragment data to be retransmitted from the file top is required. The fragment size may be fixed.

For the sending data transmission apparatus 202 to know the location of the fragment data to be retransmitted from the file top, for example, the structure identifier of the transmitted structure data and the location of the structure data from the file top are memorized in relation to each other in the sending data transmission apparatus 202. For example, as shown in FIG. 29, the structure identifier of the transmitted structure data, the location of the structure data from the file top, and the structure size are memorized in relation to each other in the sending data transmission apparatus 202.

The location of the fragment data to be retransmitted from the file top is found from the information memorized in the sending data transmission apparatus 202 and the fragment retransmission request information returned to the sending data transmission apparatus 202 from the receiving data transmission apparatus 203.

When the sending data transmission apparatus 202 transmits all structure data in the file to the receiving data transmission apparatus 203 and receives transfer acknowledgement of all the structure data from the receiving data transmission apparatus 203, it informs the sending data processing apparatus 201 that the file transmission is complete, and terminates the file transmission-processing.

Figure 33:
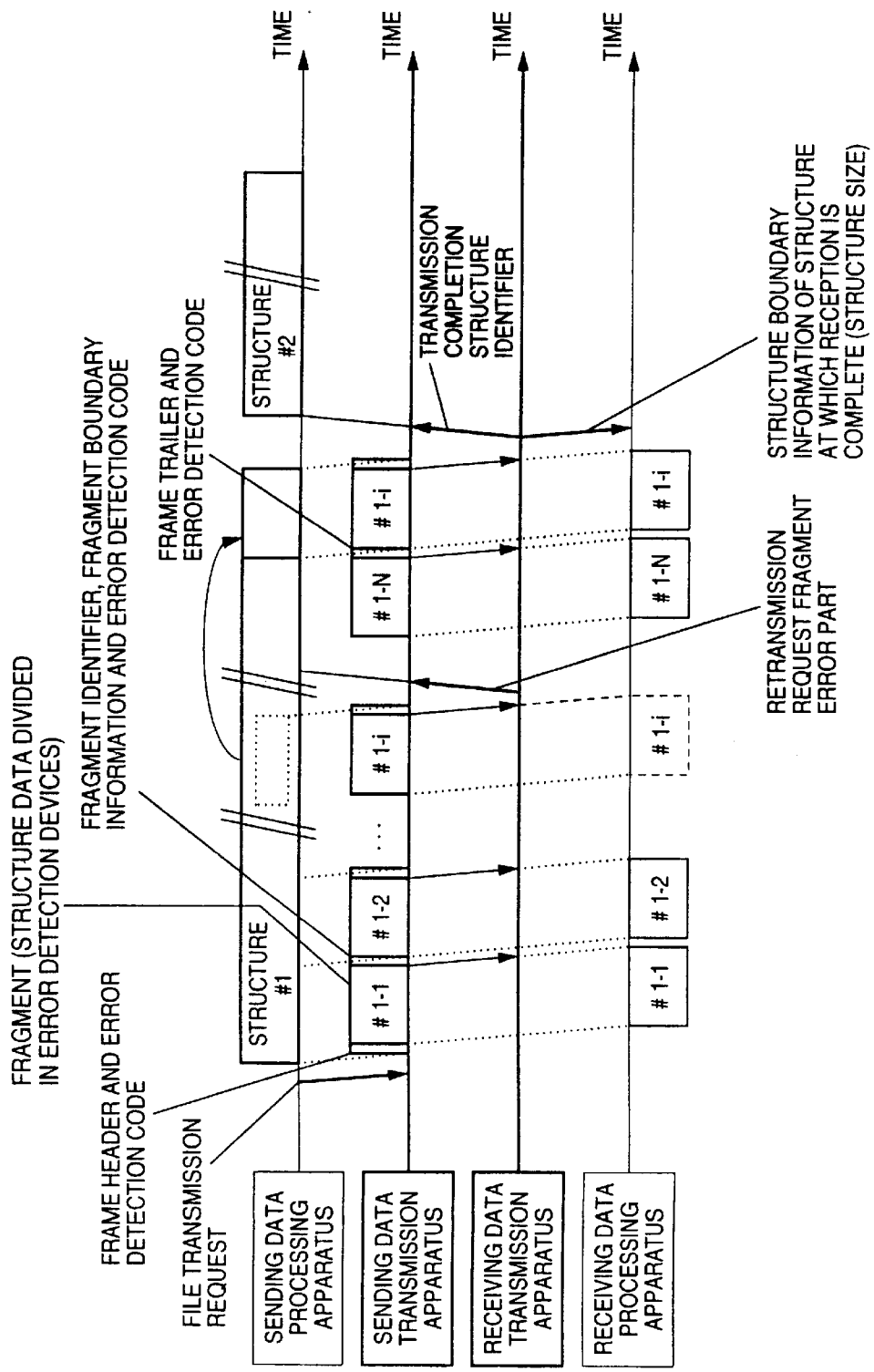
FIG. 33 is an illustration of a data transfer sequence (with a transmission error) in the second embodiment of the invention.

FIG. 33 shows a file transmission sequence of the data transmission apparatus of the second embodiment when a transmission error occurs. In the figure, a transmission error occurs in fragment data #1-i of structure data #1 and the fragment data #1-i is retransmitted after error-free transmission of fragment data #1-N.

Configuration Example of Embodiment 1

Next, a configuration example of the main part of the first embodiment of the invention will be discussed. First, a configuration example of the main part of the sending data transmission apparatus 202 will be discussed.

Figure 34:
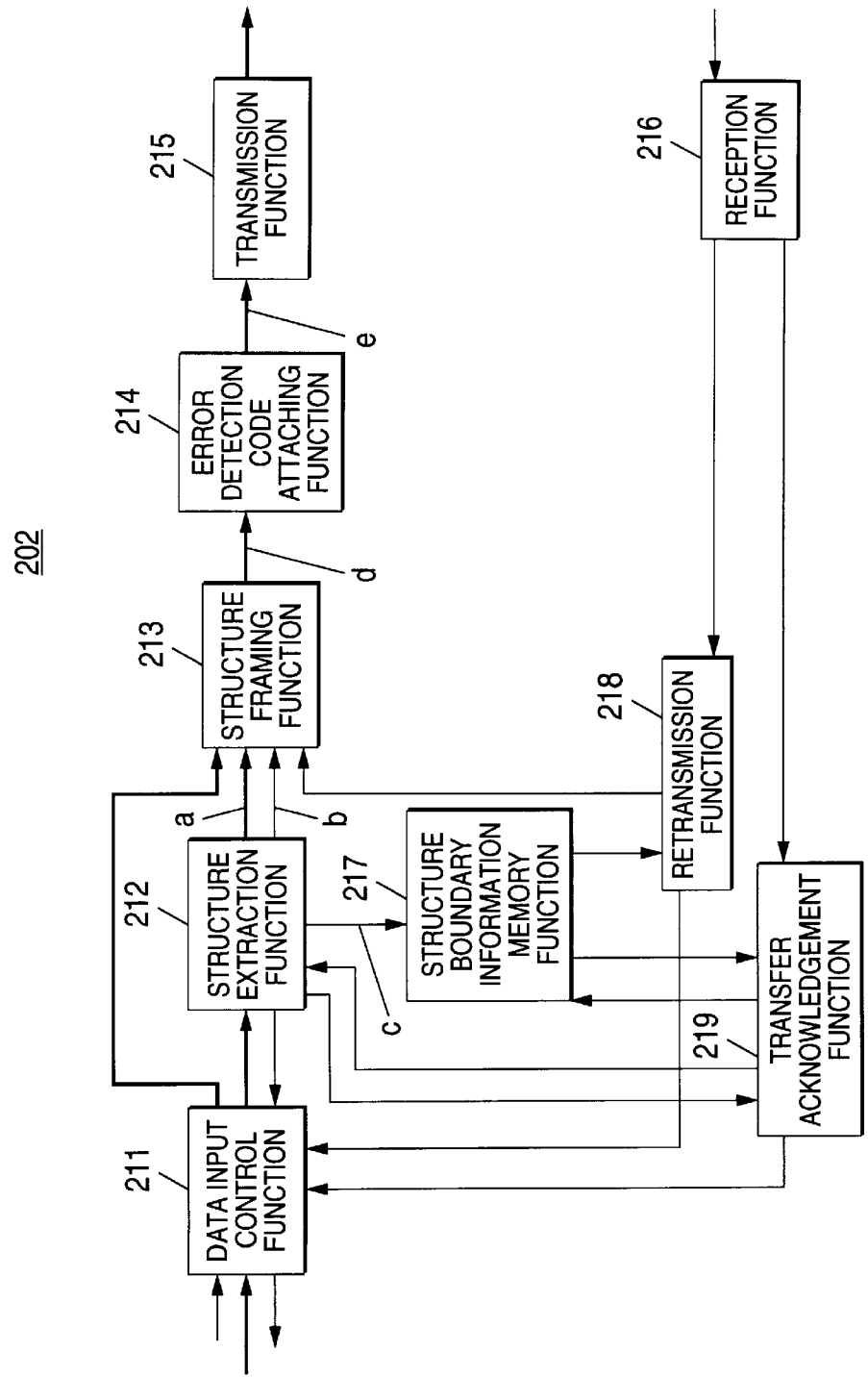
FIG. 34 is a block diagram to show a configuration example of the main part of the sending data transmission apparatus of the first embodiment of the invention.

FIG. 34 is a functional block diagram to show an example of the main part of the sending data transmission apparatus 202 of the first embodiment. In the figure, the sending data transmission apparatus 202 has the main part consisting of a data input control function 211, a structure marking up function 212, a structure framing function 213, an error detection code attaching function 214, a transmission function 215, a reception function 216, a structure boundary information memory function 217, a retransmission function 218, and a transfer acknowledgement function 219.

The functional blocks will be discussed. The data input control function 211 controls data input from the sending data processing apparatus 201. It fetches data of any size from any location of a file memorized in the sending data processing apparatus 201 in accordance with an instruction from the structure marking up function 212 or the retransmission function 218.

The data input control function 211 outputs data to the structure marking up function 212 in response to a data input instruction from the structure marking up function 212 and bypasses the structure marking up function 212 and outputs data to the structure framing function 213 in response to a data input instruction from the retransmission function 218.

Figure 35:
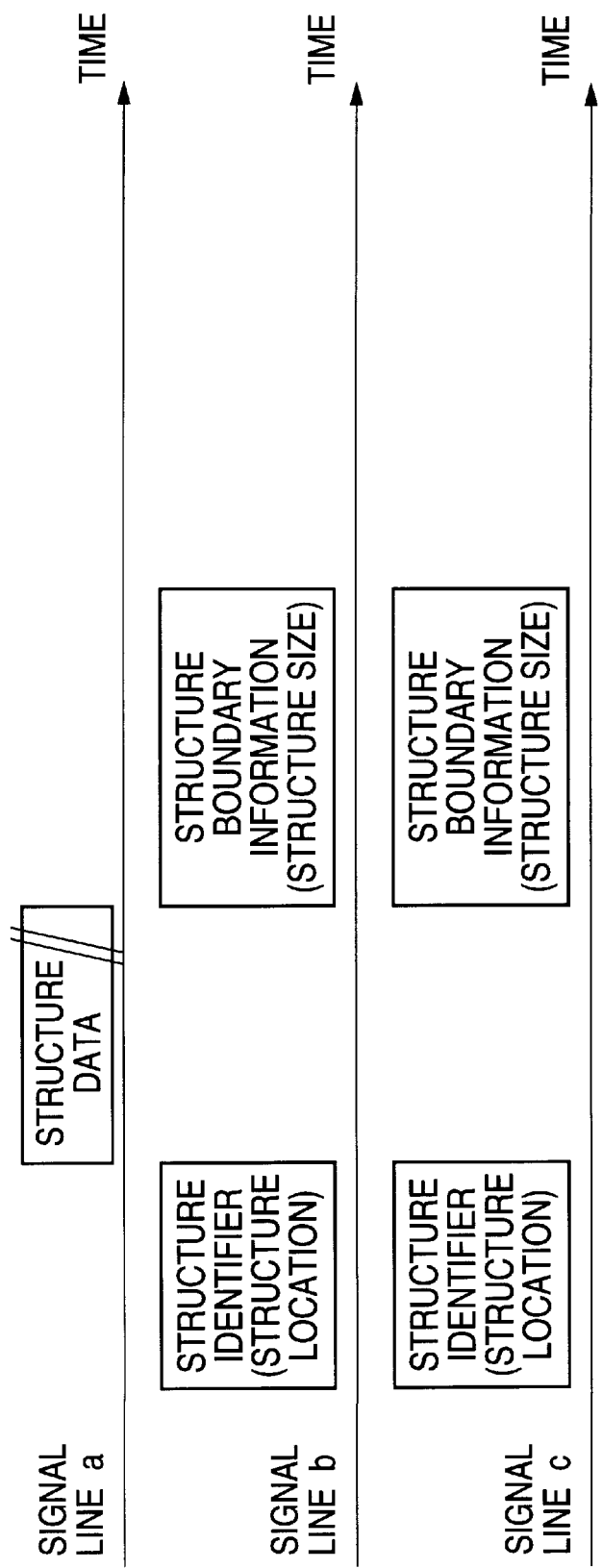
FIG. 35 is an illustration of a structure marking up function in FIG. 34.

The structure marking up function 212 outputs data input through the data input control function 211 to the structure framing function 213 in sequence. It also detects the structure boundary from the input data, creates a structure identifier for uniquely identifying the structure, and sends the structure identifier to the structure framing function 213. In addition, the structure marking up function 212 finds the data size from the top to end of the structure and sends the found data size to the structure framing function 213. FIG. 35 shows an output example of the data and control information from the structure marking up function 212.

The structure marking up function 212 first regards the file top as the top of the first structure. When detecting the structure boundary from the subsequently input data, the structure marking up function 212 interprets the structure boundary as the end of the structure and if data remains in the file at this point in time, regards the boundary as the top of the next structure.

The structure marking up function 212 outputs the location of the structure from the file top as the structure identifier for uniquely identifying the structure to the structure framing function 213 at the structure top and outputs data input through the data input control function 211 to the structure framing function 213 in sequence until detection of the boundary of the next structure. The structure marking up function 212 also outputs the location of the structure from the file top to the structure boundary information memory function 217.

The structure marking up function 212 also outputs the structure size as the structure boundary information to the structure framing function 213 and the structure boundary information memory function 217 at the structure end.

When the structure marking up function 212 has output the data at the structure end, it once stops sending data. When receiving an instruction to restart sending data from the transfer acknowledgement function 219, the structure marking up function 212 restarts sending data if data remains in the file at the point in time. If no data remains in the file, the structure marking up function 212 informs the transfer acknowledgement function 219 that the data sending is complete.

In the example, delivery of one structure is secured before another structure is sent. However, to send another structure before delivery of one structure is secured, the structure marking up function 212 may continue inputting/outputting data even when it has output the data at the structure end.

The structure framing function 213 outputs the structure data input from the structure marking up function 212 to the error detection code attaching function 214 in sequence. When receiving the structure identifier from the structure marking up function 212 at the structure top, the structure framing function 213 outputs a frame header preceding the structure data. When receiving the structure boundary information at the structure end, the structure framing function 213 outputs a frame trailer following the structure data.

The structure framing function 213 also outputs the structure data input from the data input control function 211 bypassing the structure marking up function 212 to the error detection code attaching function 214 in sequence. The structure framing function 213 outputs a frame header containing the structure identifier received from the retransmission function 218 preceding the structure data at the structure top and outputs a frame trailer containing the received structure boundary information following the structure data at the structure end.

FIG. 36 shows an output example of the data from the structure framing function 213. As shown here, the frame header is made up of a structure start flag indicating the start of the structure and a structure location from the file top as a structure identifier, and the frame trailer consists of a structure end flag indicating the end of the structure and a structure size as the structure boundary information.

The error detection code attaching function 214 outputs the data input from the structure framing function 213 to the transmission function 215 in sequence. It also creates error detection codes for the frame header and the input data immediately following the frame header and preceding the frame trailer and gives the error detection codes to the frame header and the frame trailer for output. FIG. 37 shows an output example of the data from the error detection code attaching function 214.

The transmission function 215 sends the data output from the error detection code attaching function 214 to the transmission line 205 in sequence for output to the receiving data transmission apparatus 203.

The reception function 216 receives a retransmission request and transfer acknowledgement returned from the receiving data transmission apparatus 203 over the transmission line 205 and outputs the retransmission request and transfer acknowledgement to the retransmission function 218 and the transfer acknowledgement function 219 respectively.

The structure boundary information memory function 217 holds the memory location of the file being transmitted and the structure boundary information in relation to the structure identifier. It holds the structure location from the file top as the structure identifier and the structure size as the structure boundary information.

The structure boundary information memory function 217 gives the structure boundary information of the structure indicated by the structure identifier to the retransmission function 218. If delivery of the structure is secured, the structure boundary information memory function 217 discards the structure boundary information corresponding to the specified structure identifier in response to an instruction from the transfer acknowledgement function 219; if delivery of all structures in the file is secured, the structure boundary information memory function 217 discards the memory location information of the file in response to an instruction from the transfer acknowledgement function 219.

FIG. 38 shows a format example of the structure information held in the structure boundary information memory function. In the example, only the structure boundary information of the current structure being transferred is held. However, to send another structure before delivery of one structure is secured, the structure boundary information of structures whose delivery is not yet secured after transmission is started may be held.

The retransmission function 218 performs retransmission processing of the corresponding structure in response to a retransmission request structure identifier returned from the receiving data transmission apparatus 203. FIG. 39 shows a format example of the retransmission request structure identifier.

When receiving the retransmission request structure identifier through the reception function 216, the retransmission function 218 gets the structure boundary information corresponding to the specified structure identifier and the file memory location from the structure boundary information memory function 217, finds the memory location of the structure from the file memory location and the structure location from the file top as the structure identifier, and specifies the found structure memory location together with the structure size as the structure boundary information for instructing the data input control function 211 to again input the data. In this case, the input data is output to the structure framing function 213 bypassing the structure marking up function 212.

To again input the data, the retransmission function 218 outputs the structure location from the file top as the structure identifier to the structure framing function 213 at the structure top and the structure size as the structure boundary information to the structure framing function 213 at the structure end.

The transfer acknowledgement function 219 discards the structure information of the corresponding structure, starts transmitting the next structure, and senses file transmission completion in response to a transmission completion structure identifier returned from the receiving data transmission apparatus 203. FIG. 40 shows a format example of the transmission completion structure identifier.

When receiving the transmission completion structure identifier through the reception function 216, the transfer acknowledgement function 219 instructs the structure boundary information memory function 217 to discard the memory contents corresponding to the structure identifier indicated by the transmission completion structure identifier. When receiving the transmission completion structure identifier through the reception function 216, the transfer acknowledgement function 219 instructs the structure marking up function 212 to restart sending data. When receiving a notification of the termination of sending all data in the file from the structure marking up function 212, the transfer acknowledgement function 219 instructs the structure boundary information memory function 217 to discard the memorized file memory location information, and informs the sending data processing apparatus 201 that the file transmission is complete.

Figure 41:
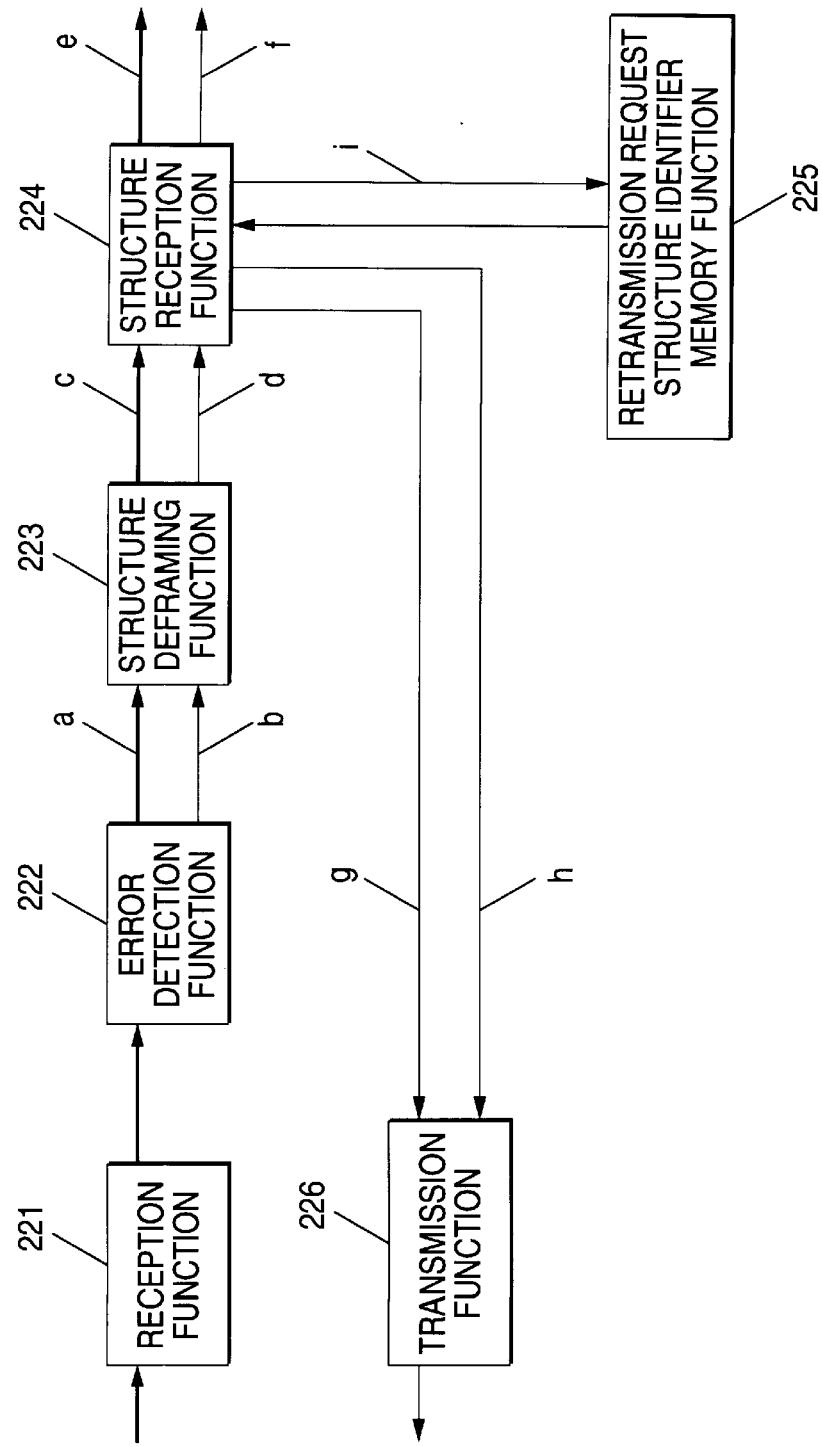
FIG. 41 is a block diagram to show a configuration example of the main part of the receiving data transmission apparatus of the first embodiment of the invention.

Next, a configuration example of the main part of the receiving data transmission apparatus 203 of the first embodiment will be discussed. FIG. 41 is a functional block diagram to show an example of the main part of the receiving data transmission apparatus 203. In the figure, the receiving data transmission apparatus 203 has functional blocks of a reception function 221, an error detection function 222, a structure deframing function 223, a structure reception function 224, a retransmission request structure identifier memory function 225, and a transmission function 226.

The functional blocks will be discussed in order. The reception function 221 receives data sent from the sending data transmission apparatus 202 over the transmission line 205 and outputs the data to the error detection function 222 in sequence.

The error detection function 222 monitors the data input through the reception function 221, separates an error detection code from the data, and outputs the data to the structure deframing function 223.

When detecting a frame header, the error detection function 222 uses the error detection code following the frame header to check the frame header for error, and sends the result to the structure deframing function 223. When detecting a frame trailer, the error detection function 222 uses the error detection code following the frame trailer to check the input data immediately following the frame header and preceding the frame trailer for error, and sends the result to the structure deframing function 223. FIG. 42 shows an output example of the error detection function.

The structure deframing function 223 separates the frame header and the frame trailer from the data input through the error detection function 222 and outputs structure data to the structure reception function 224. It also marks up a structure identifier from the separated frame header and structure boundary information from the separated frame trailer and outputs them to the structure reception function 224.

If an error is detected in the frame header based on the frame header error check result received from the error detection function 222, the structure deframing function 223 discards the data following the frame header to the next frame header and does not output the data to the structure reception function 224. When receiving a notification of error detection in data from structure data to a structure trailer from the error detection function 222, the structure deframing function 223 discards the structure boundary information in the frame trailer and does not output the information to the structure reception function 224. FIGS. 43 and 44 show output examples of the structure deframing function 223.

When getting the structure identifier from the structure deframing function 223 at the structure top, the structure reception function 224 outputs the structure identifier to the receiving data processing apparatus 204 and the retransmission request structure identifier memory function 225. Further, it outputs the structure data input following the structure identifier at the structure top from the structure deframing function 223 to the receiving data processing apparatus 204. The structure reception function 224 gets the structure size as the structure boundary information from the structure deframing function 223 at the structure end and outputs the structure size to the receiving data processing apparatus 204. In the example, as the structure boundary information is gotten, all the data in the structure has been received normally and the structure boundary information from the receiving data transmission apparatus 203 to the receiving data processing apparatus 204 is synonymous with notification of reception completion of one structure and a request to start processing the structure.

Figure 45:
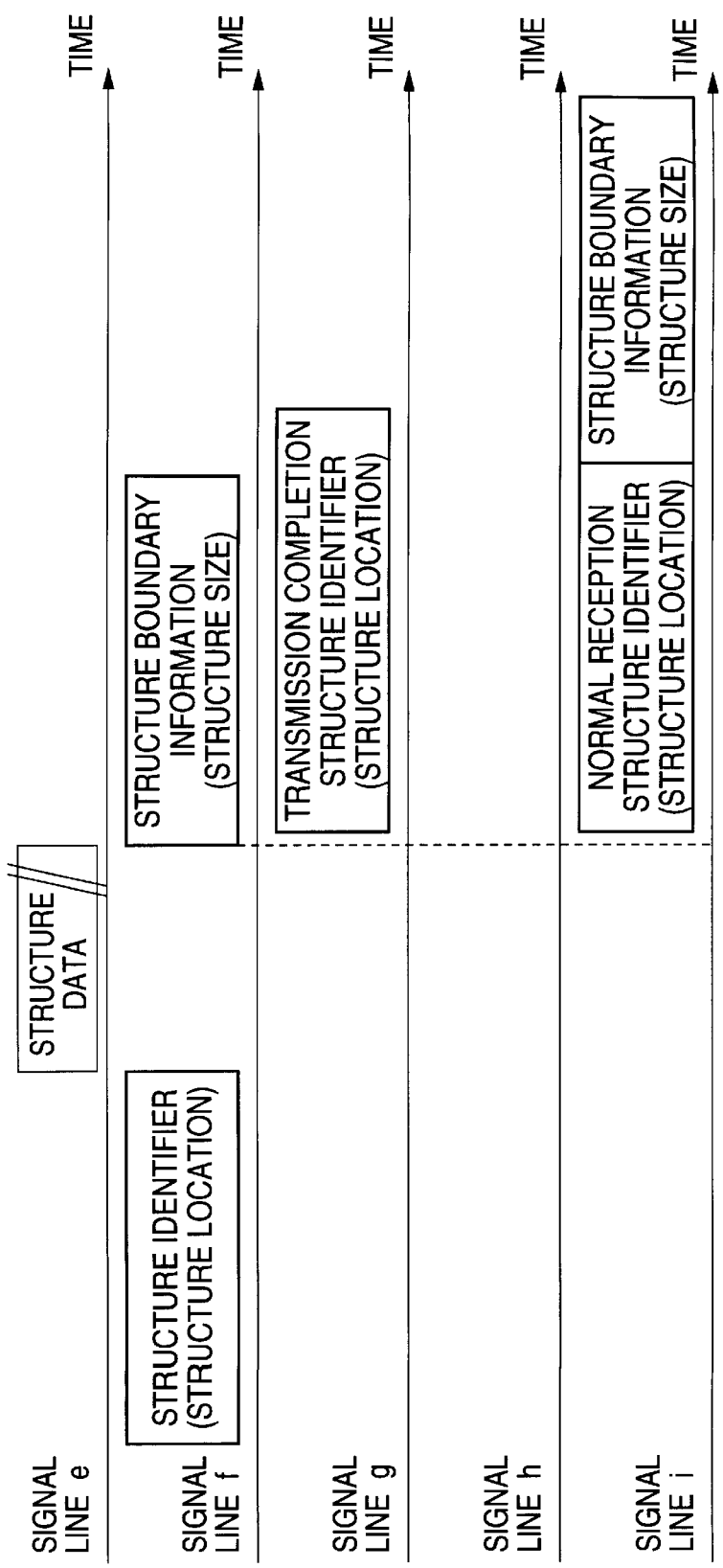
FIG. 45 is an illustration of a structure reception function in FIG. 41.

At the normal termination of reception of one structure, the structure reception function 224 returns the structure identifier of the structure as a transmission completion structure identifier to the sending data processing apparatus 201 and outputs the structure identifier to the retransmission request structure identifier memory function 225. FIG. 45 shows an output example of the structure reception function at the normal reception of the structure.

Figure 46:
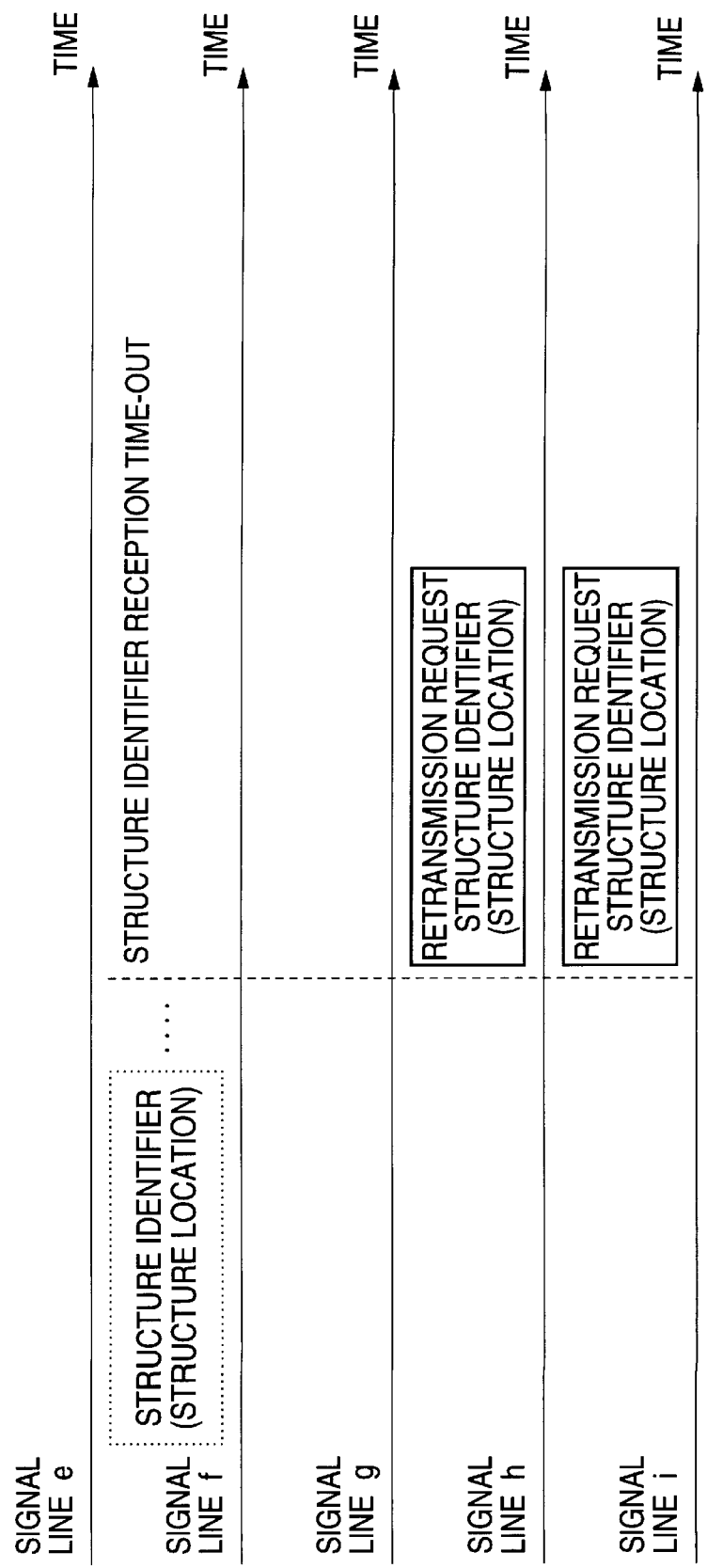
FIG. 46 is an illustration of the structure reception function in FIG. 41.

If input of the structure identifier from the structure deframing function 223 times out at the structure top, the structure reception function 224 finds the structure identifier of the structure whose reception has timed out from the structure identifier and the structure boundary information of the structure whose transmission is complete just before the time-out, and returns the found structure identifier as a retransmission request structure identifier to the sending data processing apparatus 201 and outputs the structure identifier to the retransmission request structure identifier memory function 225. Assume that the structure identifier of the structure at the file top is known. FIG. 46 shows an output example of the structure reception function 224 when input of the structure identifier times out at the structure top.

Figure 47:
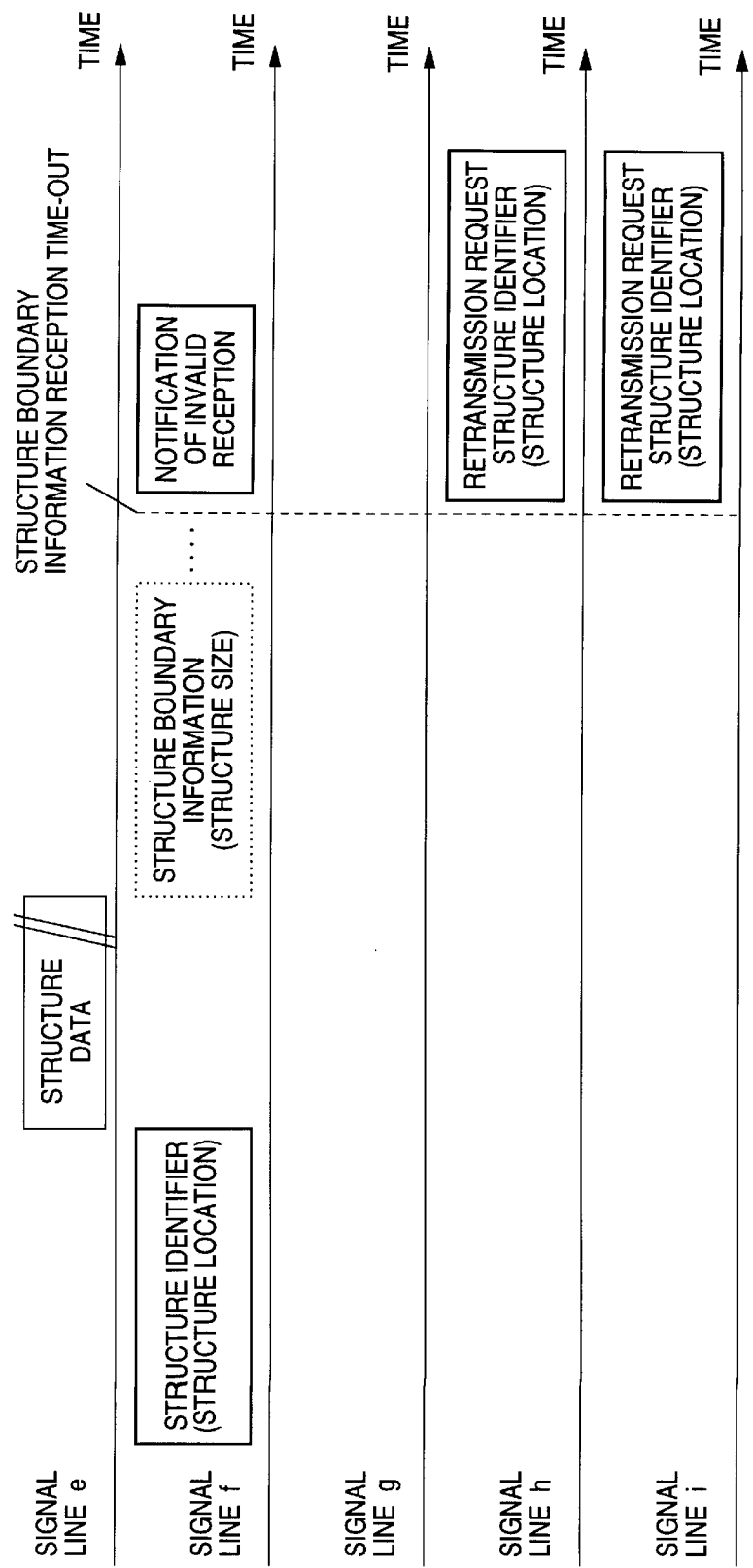
FIG. 47 is an illustration of the structure reception function in FIG. 41.

If input of the structure boundary information from the structure deframing function 223 times out at the structure end, the structure reception function 224 returns the structure identifier as a retransmission request structure identifier to the sending data processing apparatus 201, outputs the structure identifier to the retransmission request structure identifier memory function 225, and sends a notification of invalid reception to the receiving data processing apparatus 204. Assume that the structure identifier of the structure at the file top is known. FIG. 47 shows an output example of the structure reception function 224 when input of the structure boundary information times out at the structure end.

If a structure whose header cannot be received is detected based on the structure identifier of the structure at which reception is started, the structure reception function 224 returns the structure identifier as a retransmission request structure identifier to the sending data processing apparatus 201 and outputs the structure identifier to the retransmission request structure identifier memory function 225.

If reception of the structure identifier of the structure whose reception is incomplete, held in the retransmission request structure identifier memory function 225 again times out, the structure reception function 224 returns the structure identifier as a retransmission request structure identifier to the sending data processing apparatus 201 and again outputs the structure identifier to the retransmission request structure identifier memory function 225.

The transmission function 226 sends the retransmission request and transfer acknowledgement output from the structure reception function 224 to the transmission line 205 for output to the receiving data transmission apparatus 203.

When inputting the retransmission request structure identifier from the structure reception function 224, the retransmission request structure identifier memory function 225 generates the time-out time to again receiving the top of the structure and holds the time-out time in relation to the structure identifier.

When inputting the structure identifier of the structure whose header has been received normally from the structure reception function 224, the retransmission request structure identifier memory function 225 discards the structure identifier of the structure and the time-out time memorized therein. FIG. 48 shows a format example of the information held in the retransmission request structure identifier memory function 225.

Configuration Example of Embodiment 2

Figure 49:
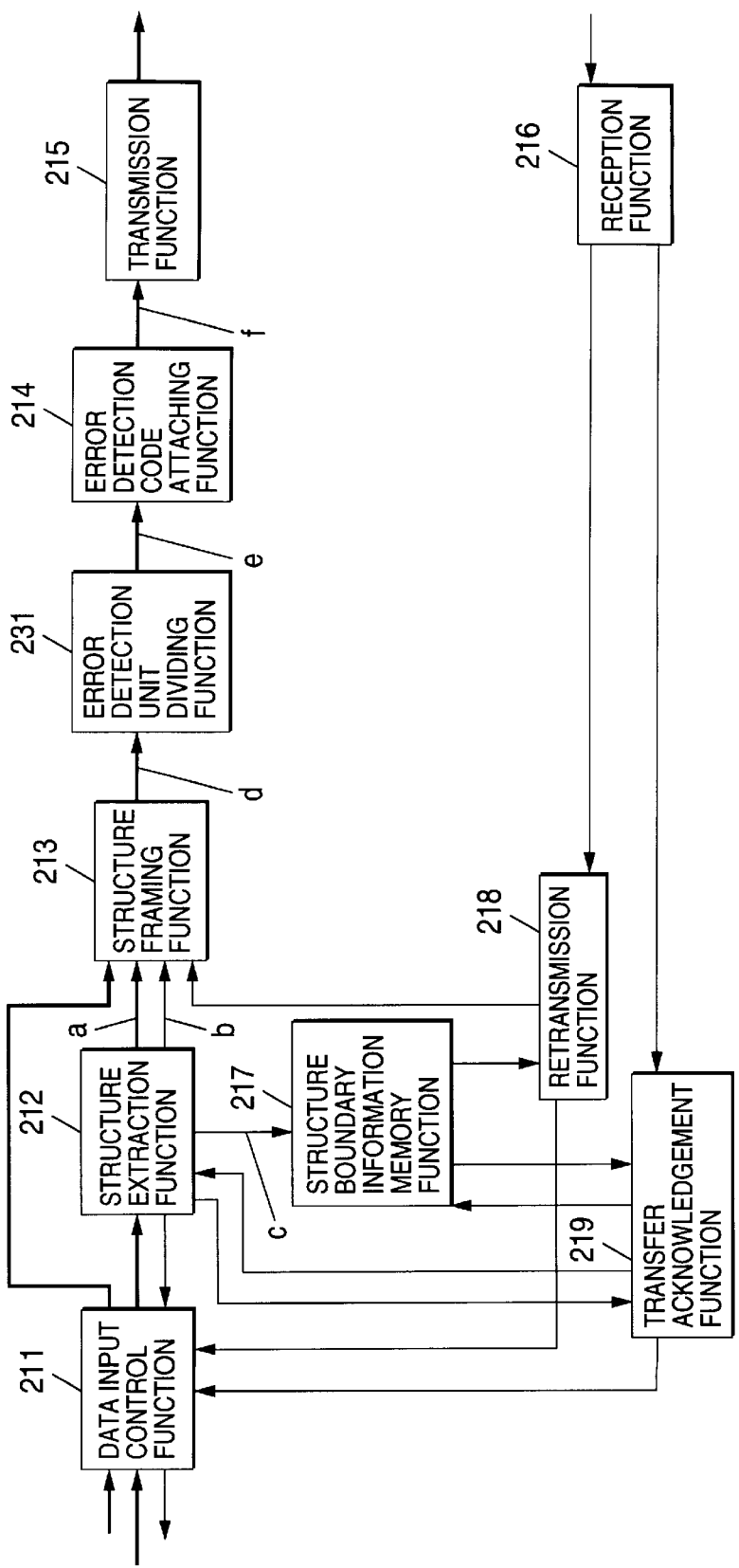
FIG. 49 is a block diagram to show a configuration example of the main part of the sending data transmission apparatus of the second embodiment of the invention.

Next, a configuration example of the main part of the second embodiment of the invention will be discussed. First, a configuration example of the main part of the sending data transmission apparatus 202 will be discussed. FIG. 49 is a functional block diagram to show an example of the main part of the sending data transmission apparatus 202 of the second embodiment. In the figure, the sending data transmission apparatus 202 has the main part consisting of a data input control function 211, a structure marking up function 212, a structure framing function 213, an error detection unit dividing function 231, an error detection code attaching function 214, a transmission function 215, a reception function 216, a structure boundary information memory function 217, a retransmission function 218, and a transfer acknowledgement function 219.

Figure 50:
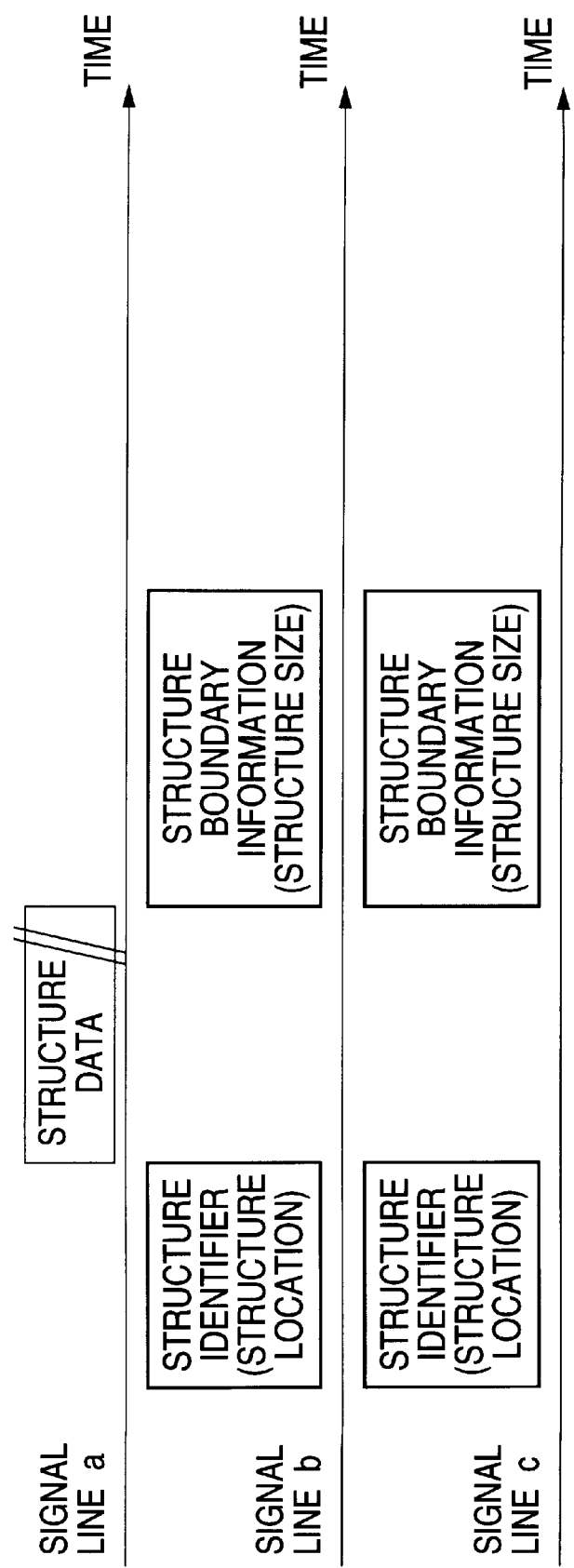
FIG. 50 is an illustration of a structure marking up function in FIG. 49.

The functional blocks will be discussed in order. The data input control function 211 and the structure marking up function 212 are similar to those of the first embodiment in FIG. 34. An output example of structure marking up function 212 is as shown in FIG. 50.

Before a sequence of data input from the structure marking up function 212, the structure framing function 213 forms a frame header from a structure identifier received from the structure marking up function 212 and outputs the frame header to the error detection unit dividing function 231. Subsequently, the structure framing function 213 outputs the input data to the error detection unit dividing function 231 in sequence. After the termination of the data input, the structure framing function 213 forms a frame trailer from structure boundary information received from the structure marking up function 212 and outputs the frame trailer to the error detection unit dividing function 231.

Before a sequence of data input from the data input control function 211 bypassing the structure marking up function 212, the structure framing function 213 forms a frame header from a structure identifier and a retransmission fragment error part identifier received from the retransmission function 218 and outputs the frame header to the error detection unit dividing function 231. Subsequently, the structure framing function 213 outputs the input data to the error detection unit dividing function 231 in sequence. After the termination of the data input, the structure framing function 213 forms a frame trailer from structure boundary information received from the retransmission function 218 and outputs the frame trailer to the error detection unit dividing function 231.

Figure 51:
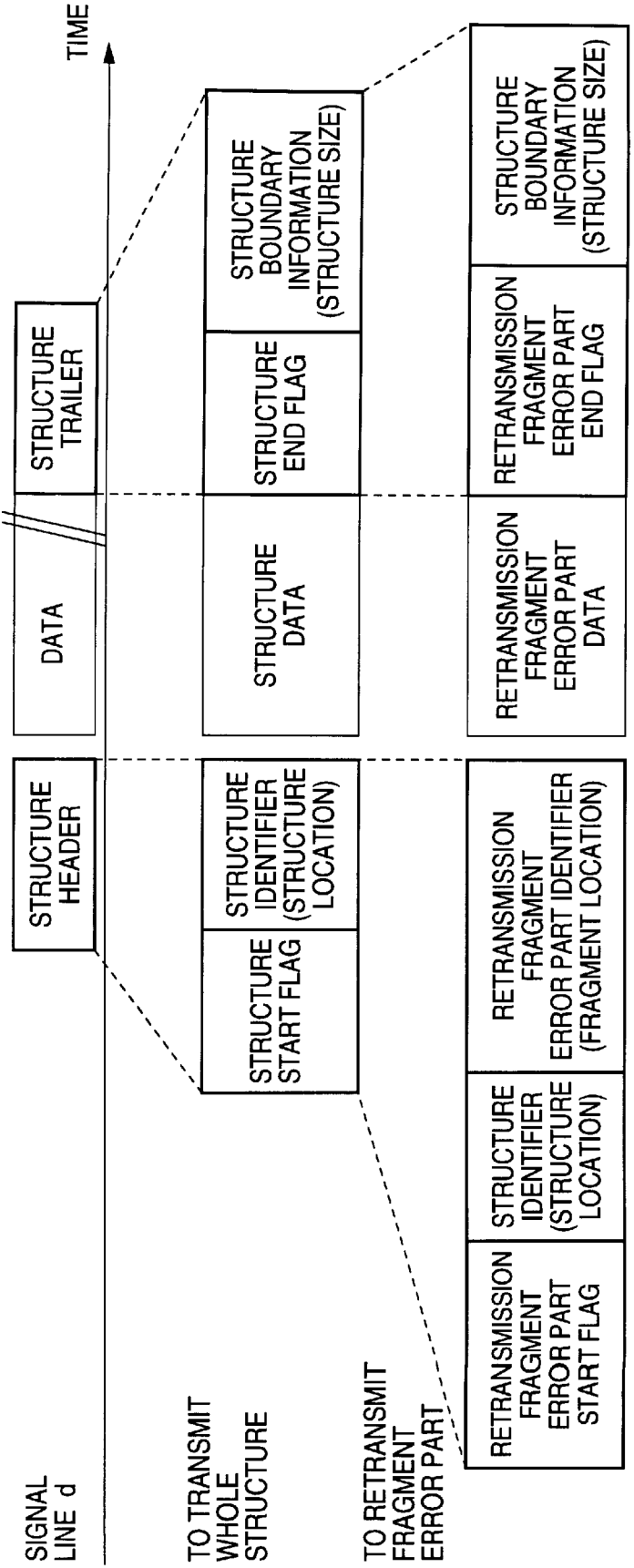
FIG. 51 is an illustration of a structure framing function in FIG. 49.

FIG. 51 shows an output example of data from the structure framing function. As shown here, to frame structure data input from the structure marking up function 212, the frame header is made up of a structure start flag indicating the start of the structure and a structure location from the file top as a structure identifier, and the frame trailer consists of a structure end flag indicating the end of the structure and a structure size as the structure boundary information.

To frame error part data in a retransmission structure input from the data input control function 211 bypassing the structure marking up function 212, the frame header is made up of a retransmission fragment error part start flag indicating the start of the error part in the retransmission structure, a structure location from the file top as a structure identifier, and a fragment location as a retransmission fragment identifier, and the frame trailer consists of a retransmission fragment error part end flag indicating the end of the error part in the retransmission structure and a structure size as the structure boundary information.

Figure 52:
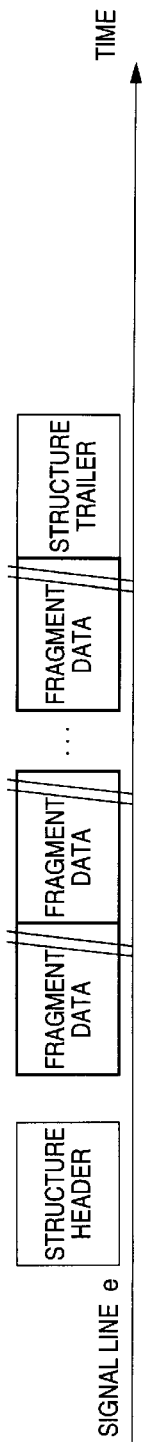
FIG. 52 is an illustration of an error detection device dividing function in FIG. 49.

The error detection unit dividing function 231 divides the data input from the structure framing function 213 into error detection devices. The structure data divided into error detection devices is called fragment data. FIG. 52 shows an output example of the error detection device dividing function.

Figure 53:
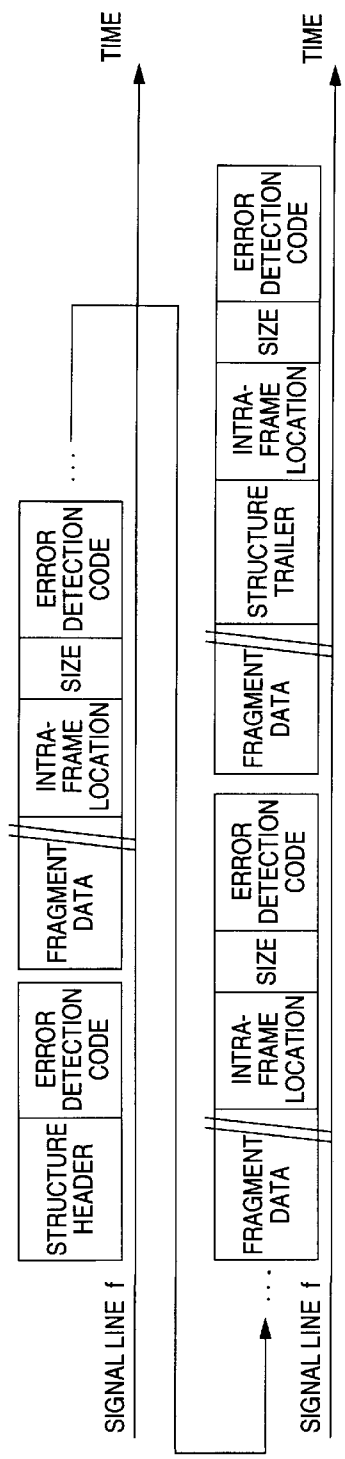
FIG. 53 is an illustration of an error detection code attaching function in FIG. 49.

The error detection code attaching function 214 outputs data in the error detection devices input from the error detection unit dividing function 231 to the transmission function 215 in sequence. It also creates an error detection code for the data in each error detection device and gives the error detection code together with the intra-frame location and the size to the data in the error detection unit for output. FIG. 53 shows an output example of the data from the error detection code attaching function.

The transmission function 215, the reception function 216, and the structure boundary information memory function 217 are similar to those of the first embodiment in FIG. 34.

Figure 54:
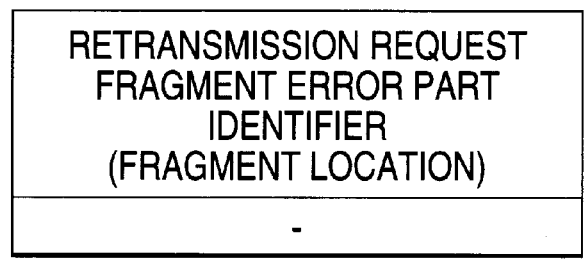
FIG. 54 is an illustration of a retransmission function in FIG. 49.

The retransmission function 218 retransmits the corresponding fragment error part in response to a retransmission request fragment error part identifier returned from the receiving data transmission apparatus 203. FIG. 54 shows a format example of the retransmission request fragment error part identifier. When receiving the retransmission request fragment error part identifier through the reception function 216, the retransmission function 218 gets the structure identifier and the structure boundary information of the structure to which the fragment corresponding to the specified fragment error part identifier belongs and the file memory location from the structure boundary information memory function 217, finds the memory location of the error part from the file memory location, the structure location from the file top as the structure identifier, and the error part location in the structure as the fragment error part identifier, and instructs the data input control function 211 to again input the data. In this case, the input data is output to the structure framing function 213 bypassing the structure marking up function 212. The example assumes that the size of each fragment error part is a fixed length and is known.

To again input the data, before a sequence of data input, the retransmission function 218 outputs the structure location from the file top as the structure identifier and the error part location in the structure as the retransmission fragment error part identifier to the structure framing function 213. After the termination of the data input, the retransmission function 218 outputs the size of the structure to which the error part belongs as the structure boundary information to the structure framing function 213.

The transfer acknowledgement function 219 is similar to that of the first embodiment in FIG. 34.

Figure 55:
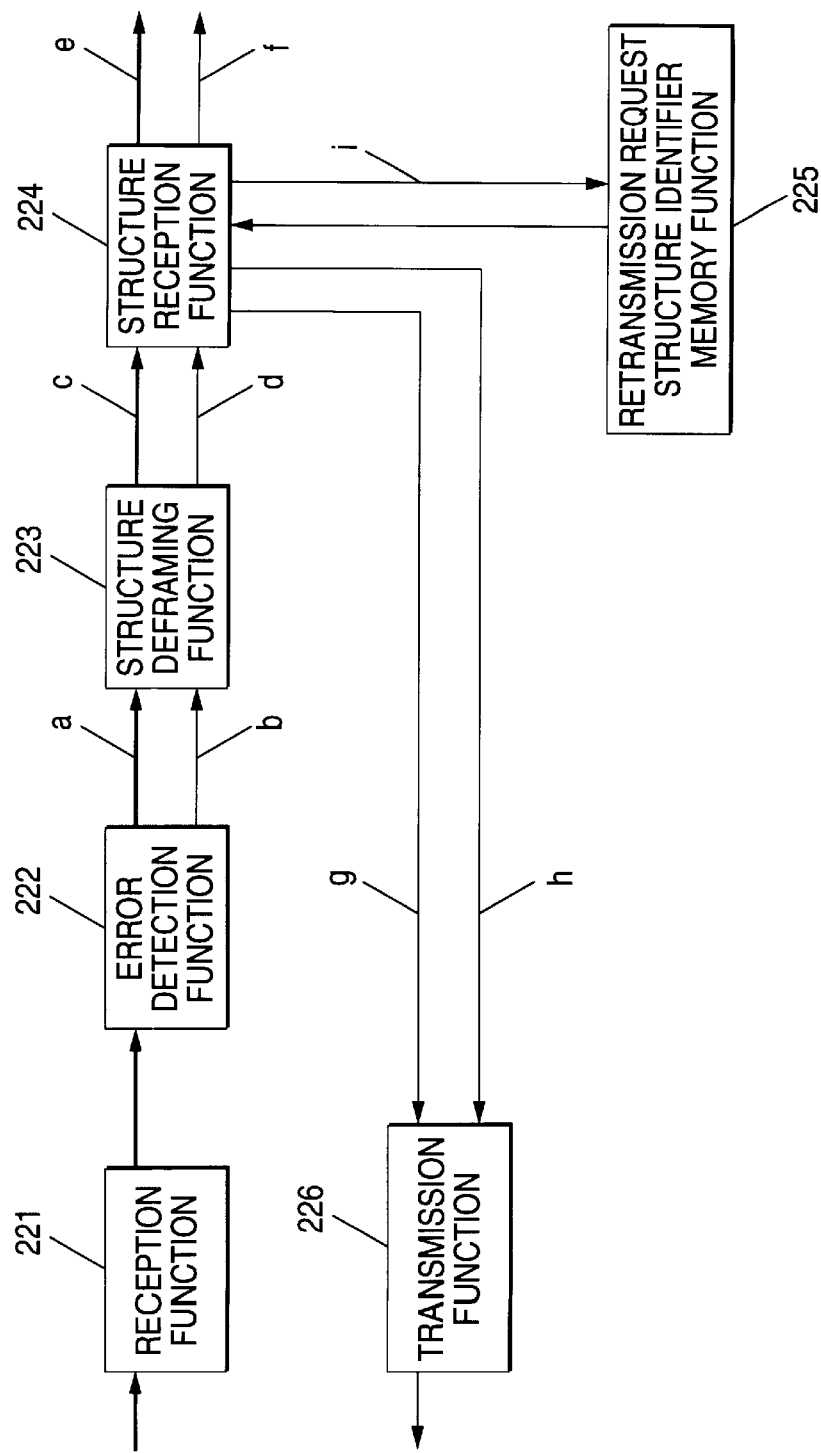
FIG. 55 is a block diagram to show a configuration example of the main part of the receiving data transmission apparatus of the second embodiment of the invention.

Next, a configuration example of the receiving data transmission apparatus 203 of the second embodiment will be discussed. FIG. 55 shows the configuration example of the receiving data transmission apparatus 203. In the figure, the receiving data transmission apparatus 203 has the main part consisting of functional blocks of a reception function 221, an error detection function 222, a structure deframing function 223, a structure reception function 224, a retransmission request structure identifier memory function 225, and a transmission function 226.

The functional blocks will be discussed in order. The reception function 221 is similar to that of the first embodiment in FIG. 41.

Figure 56:
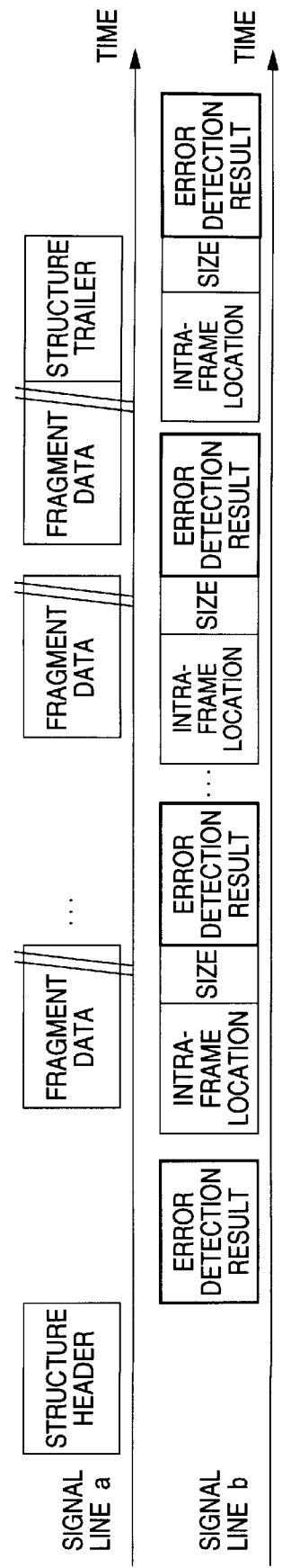
FIG. 56 is an illustration of an error detection function in FIG. 55.

The error detection function 222 monitors the data input through the reception function 221, separates an error detection code from the data, and outputs the data to the structure deframing function 223. For each error detection device, the error detection function 222 uses the error detection code following the error detection device to check the error detection device for error, and sends the result to the structure deframing function 223. FIG. 56 shows an output example of the error detection function 222.

Figure 57:
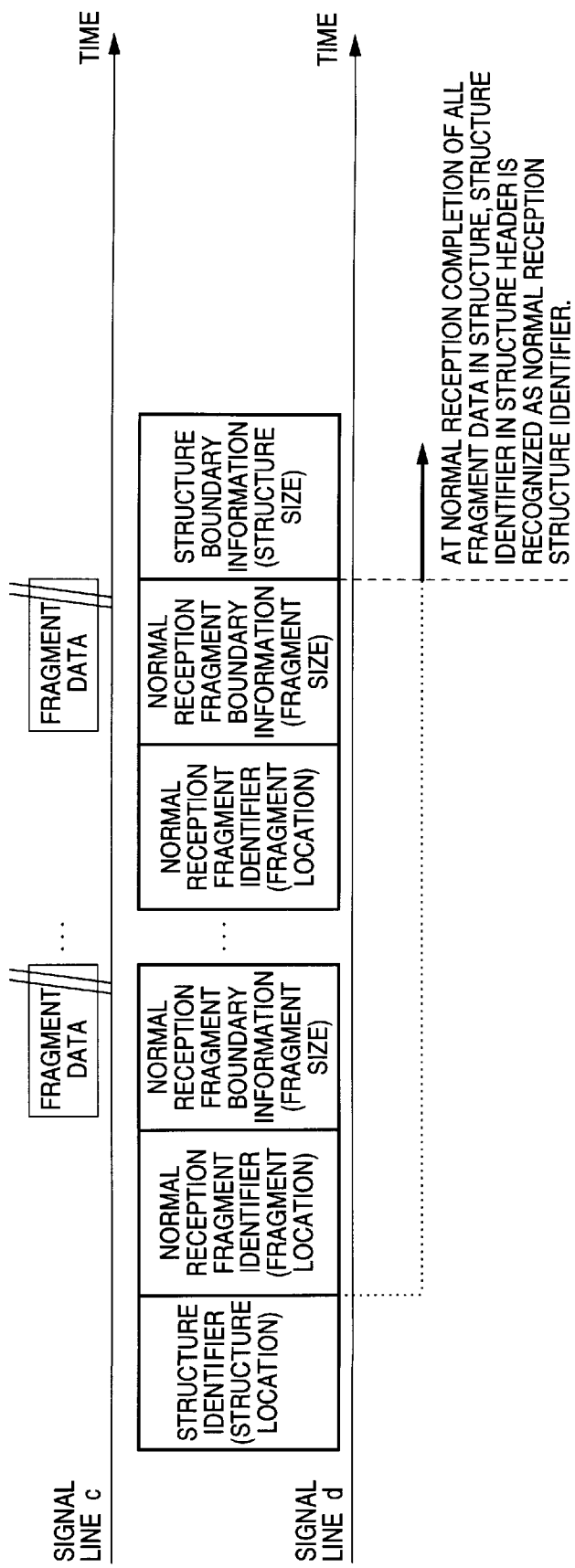
FIG. 57 is an illustration of a structure deframing function in FIG. 55.
Figure 58:
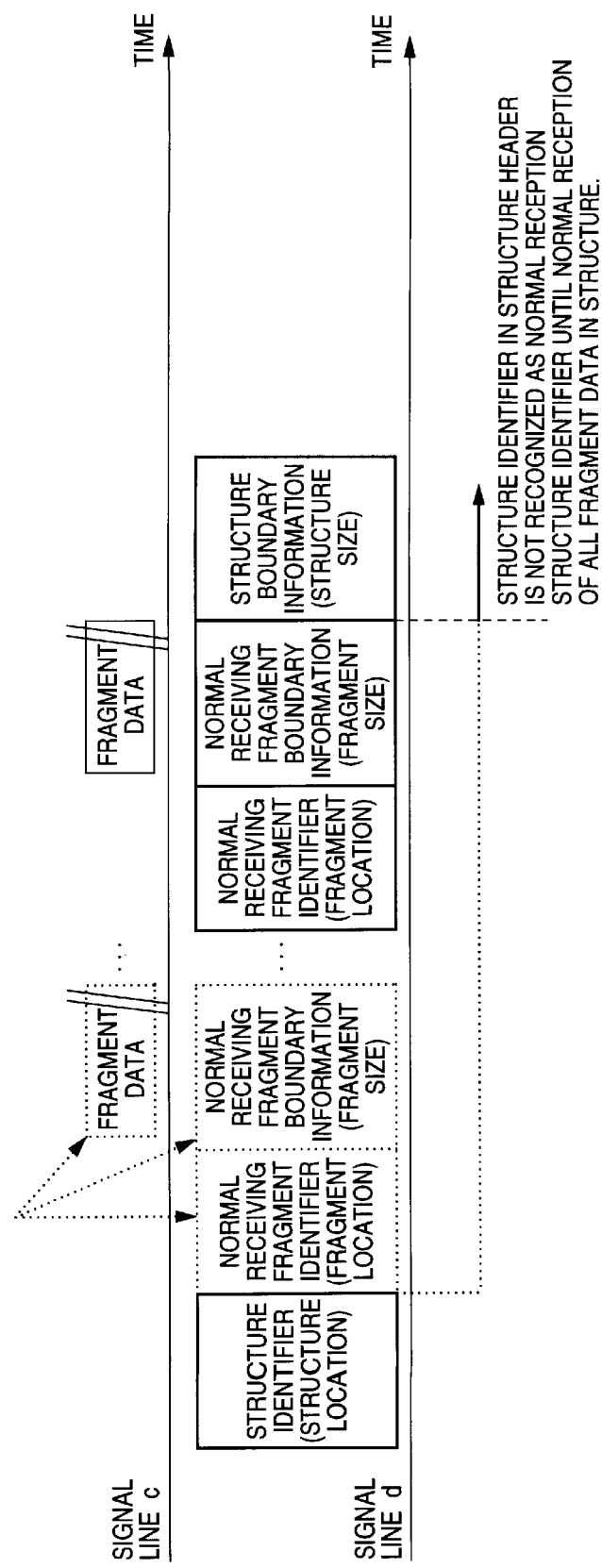
FIG. 58 is an illustration of the structure deframing function in FIG. 55.
Figure 59:
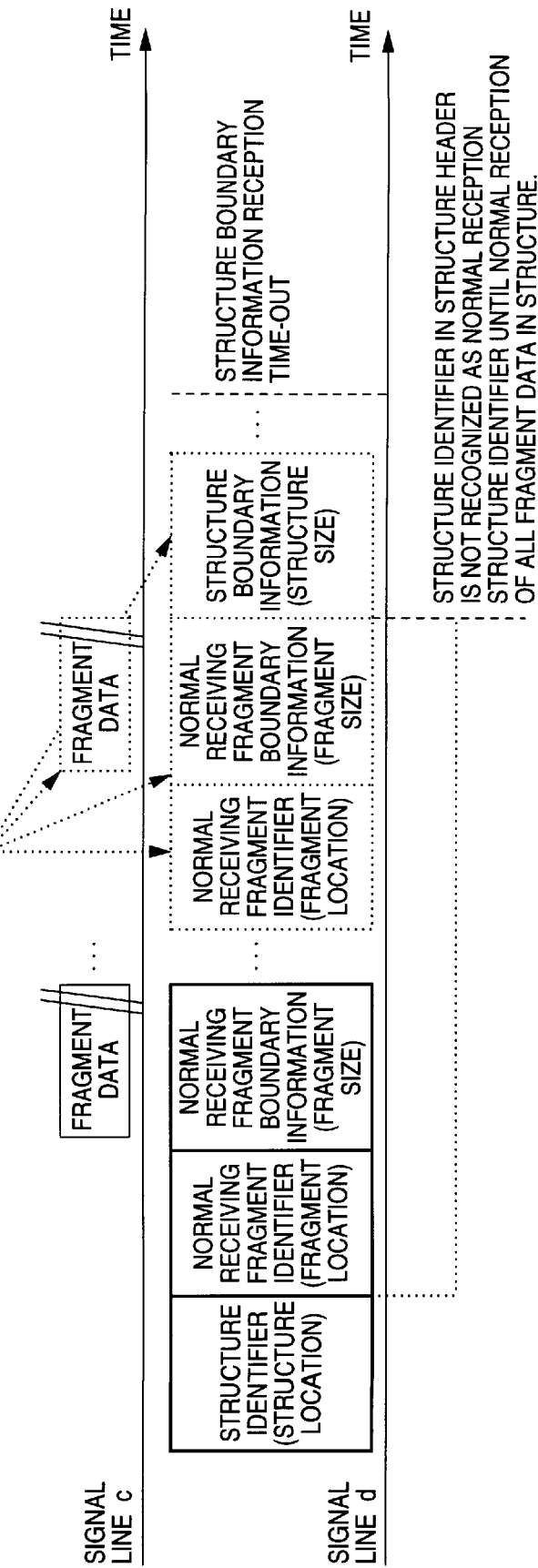
FIG. 59 is an illustration of the structure deframing function in FIG. 55.

The structure deframing function 223 separates the frame header and the frame trailer from the data input through the error detection function 222 and outputs fragment data into which the structure data is divided in error detection devices to the structure reception function 224 in sequence. It also marks up a structure identifier from the frame header separated from the data and structure boundary information from the separated frame trailer and outputs them to the structure reception function 224. If an error is contained in the frame header based on the frame header error check result received from the error detection function 222, the structure deframing function 223 discards the data following the frame header to the next frame header and does not output the data to the structure reception function 224. If an error is detected based on the fragment error check result received from the error detection function 222, the structure deframing function 223 discards the corresponding fragment and does not output the fragment data to the structure reception function 224. If no error is detected in the fragment, the structure deframing function 223 finds the fragment location in the structure and the fragment size from the intra-frame location and the size output for each fragment data piece from the error detection function 222 and outputs the found fragment location and size as a normal reception fragment identifier and normal reception fragment boundary information. If an error is contained in the frame trailer based on the frame trailer error check result received from the error detection function 222, the structure deframing function 223 discards the frame trailer header and does not output to the structure reception function 224. FIGS. 57 to 59 show output examples of the structure deframing function 223.

When getting the structure identifier from the structure deframing function 223 at the structure top, the structure reception function 224 outputs the structure identifier to the receiving data processing apparatus 204 and the retransmission request structure identifier memory function 225.

Each time the structure reception function 224 inputs fragment data following the structure top from the structure deframing function 223, it gets the fragment location and size of the fragment data as a normal reception fragment identifier and normal reception fragment boundary information and outputs them to the receiving data processing apparatus 204 and the retransmission request structure identifier memory function 225.

The structure reception function 224 gets the structure size as the structure boundary information from the structure deframing function 223 at the structure end. If all fragments in the structure are normally received at the point in time, the structure reception function 224 outputs the structure size as structure boundary information to the receiving data processing apparatus 204. That is, the structure boundary information from the receiving data transmission apparatus 203 to the receiving data processing apparatus 204 is synonymous with notification of reception completion of one structure and a request to start processing the structure.

Figure 60:
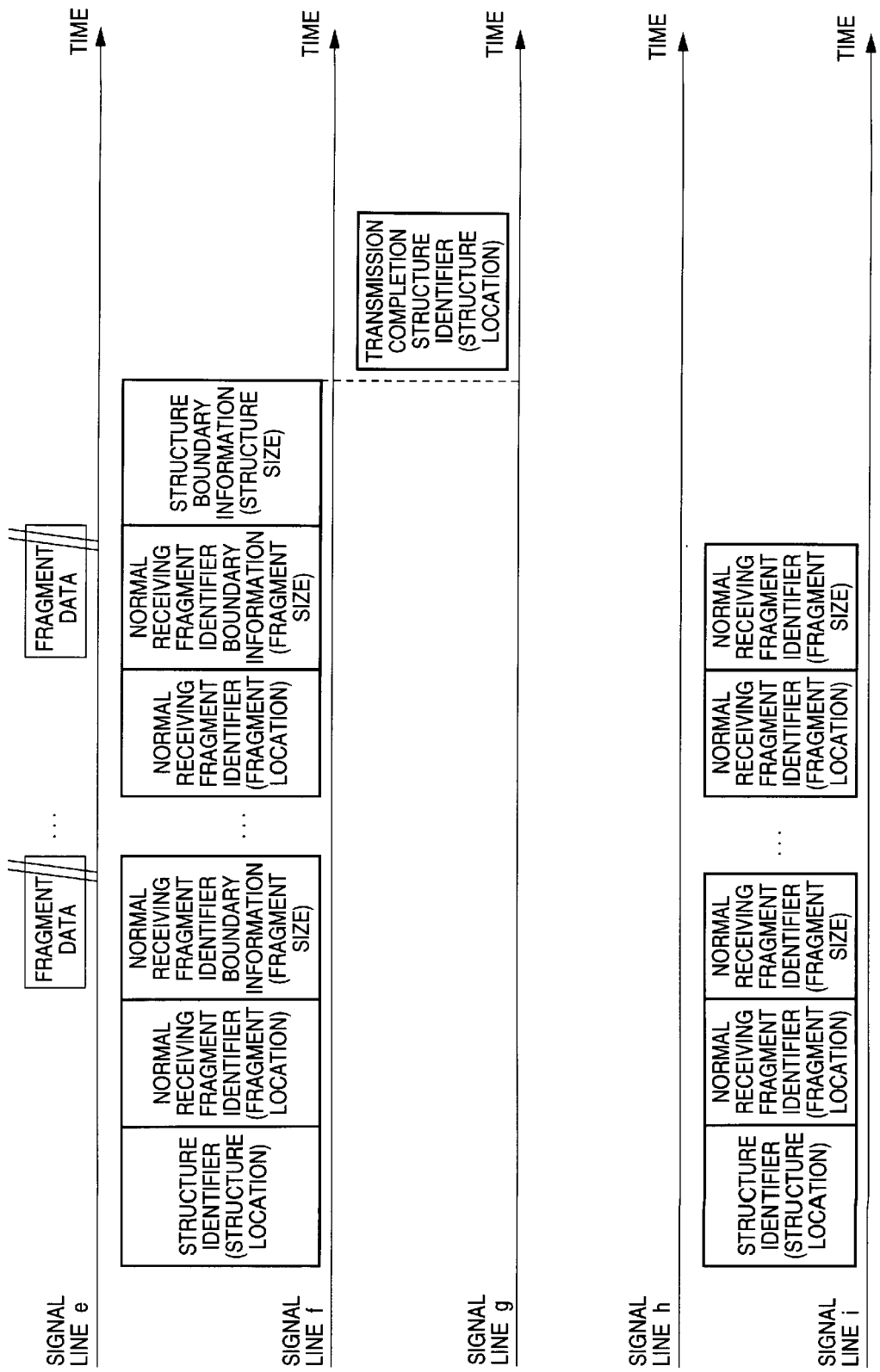
FIG. 60 is an illustration of a structure reception function in FIG. 55.

At the normal termination of reception of one structure, the structure reception function 224 returns the structure identifier of the structure as a transmission completion structure identifier to the sending data processing apparatus 201. FIG. 60 shows an output example of the structure reception function 224 at the normal reception of the structure.

Figure 61:
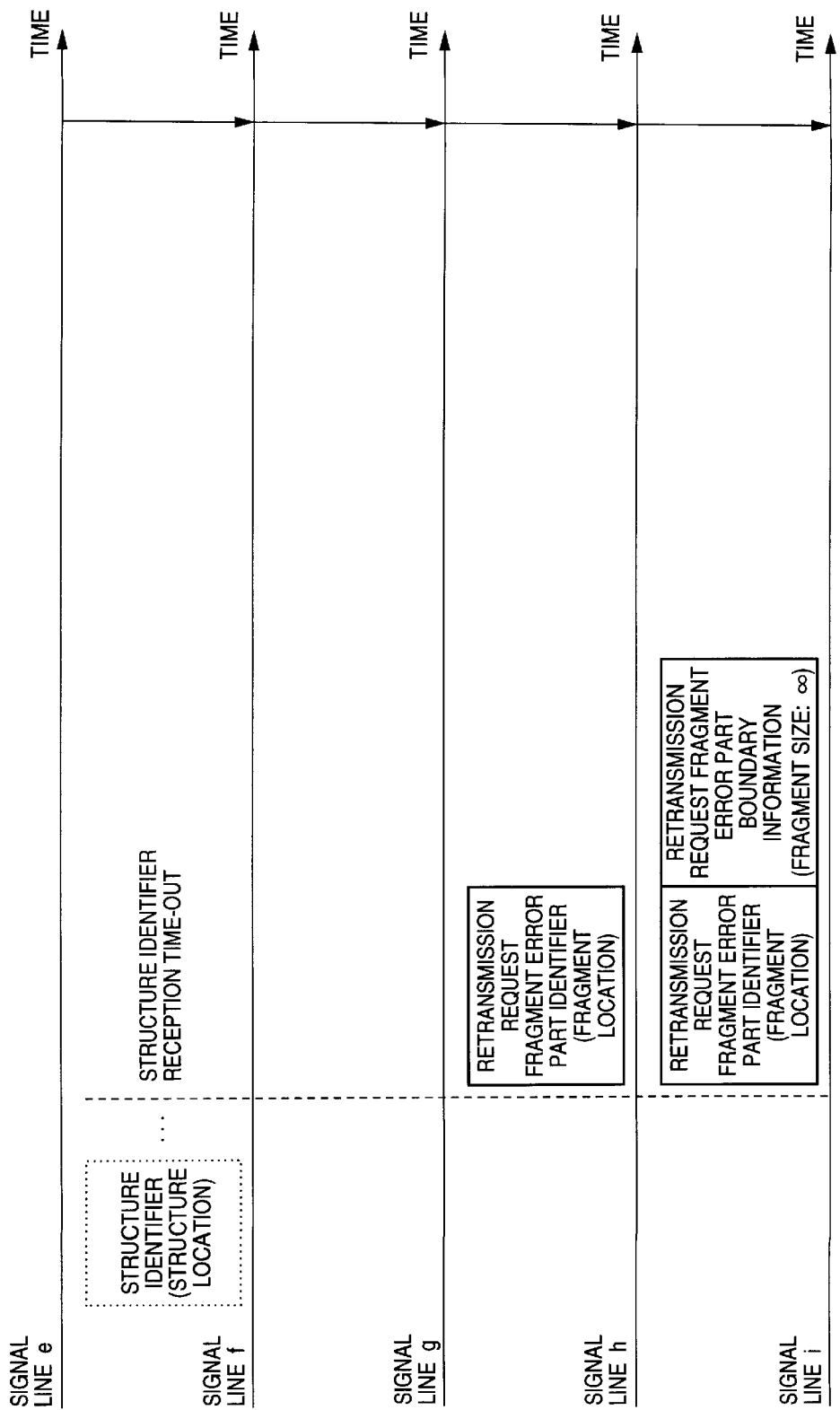
FIG. 61 is an illustration of the structure reception function in FIG. 55.

If input of the structure identifier from the structure deframing function 223 times out at the structure top, the structure reception function 224 regards the fragment error part location as the structure top and returns the fragment error part location as a retransmission request fragment error part identifier to the sending data processing apparatus 201. It also outputs the fragment location to the retransmission request structure identifier memory function 225. FIG. 61 shows an output example of the structure reception function 224 when input of the structure identifier times out at the structure top.

Figure 62:
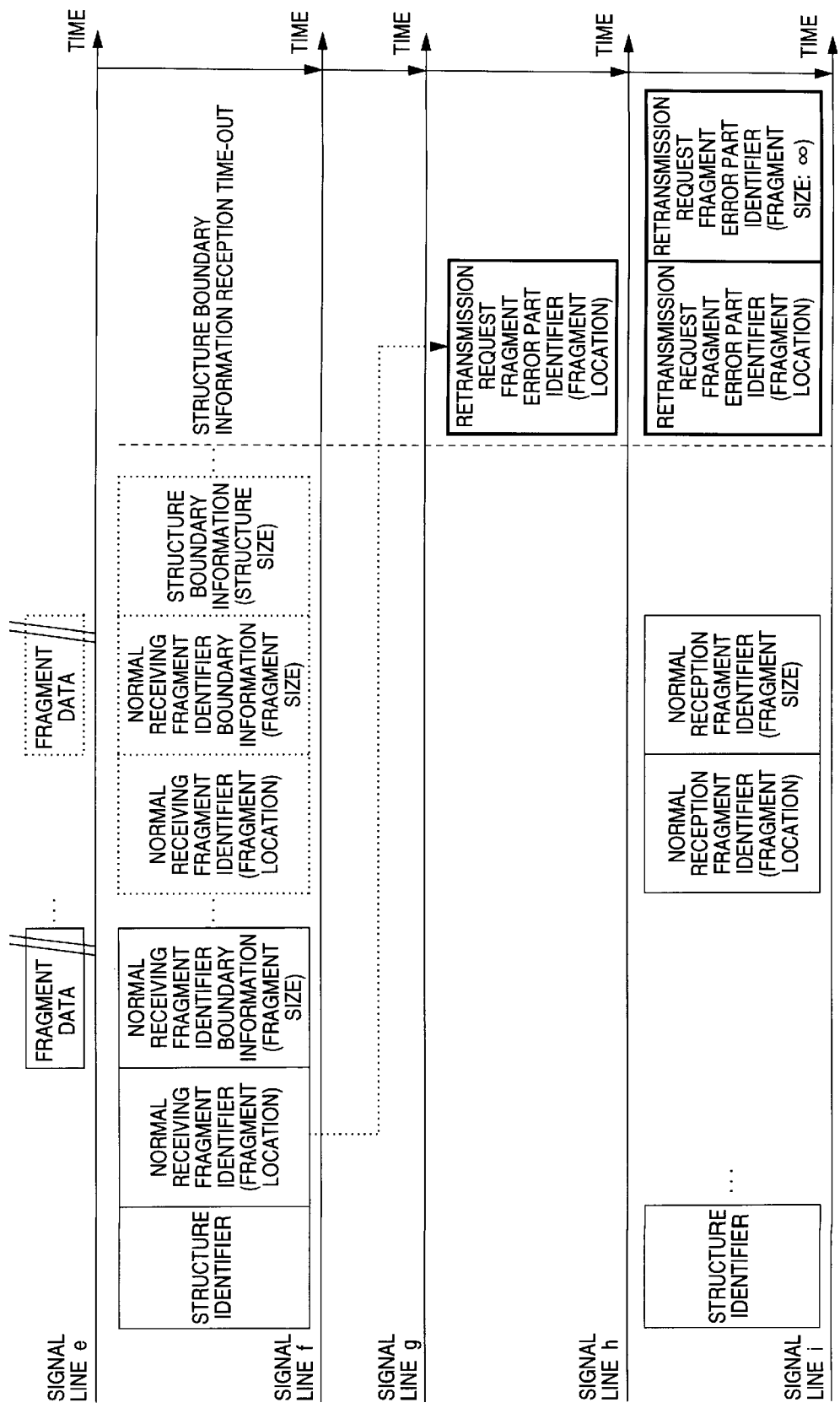
FIG. 62 is an illustration of the structure reception function in FIG. 55.

If input of the structure boundary information from the structure deframing function 223 times out at the structure end, the structure reception function 224 returns the fragment location just after the last one of the normally received fragments as a retransmission request fragment error part identifier to the sending data processing apparatus 201 and also outputs the fragment location to the retransmission request structure identifier memory function 225. FIG. 62 shows an output example of the structure reception function 224 when input of the structure boundary information times out at the structure end.

Figure 63:
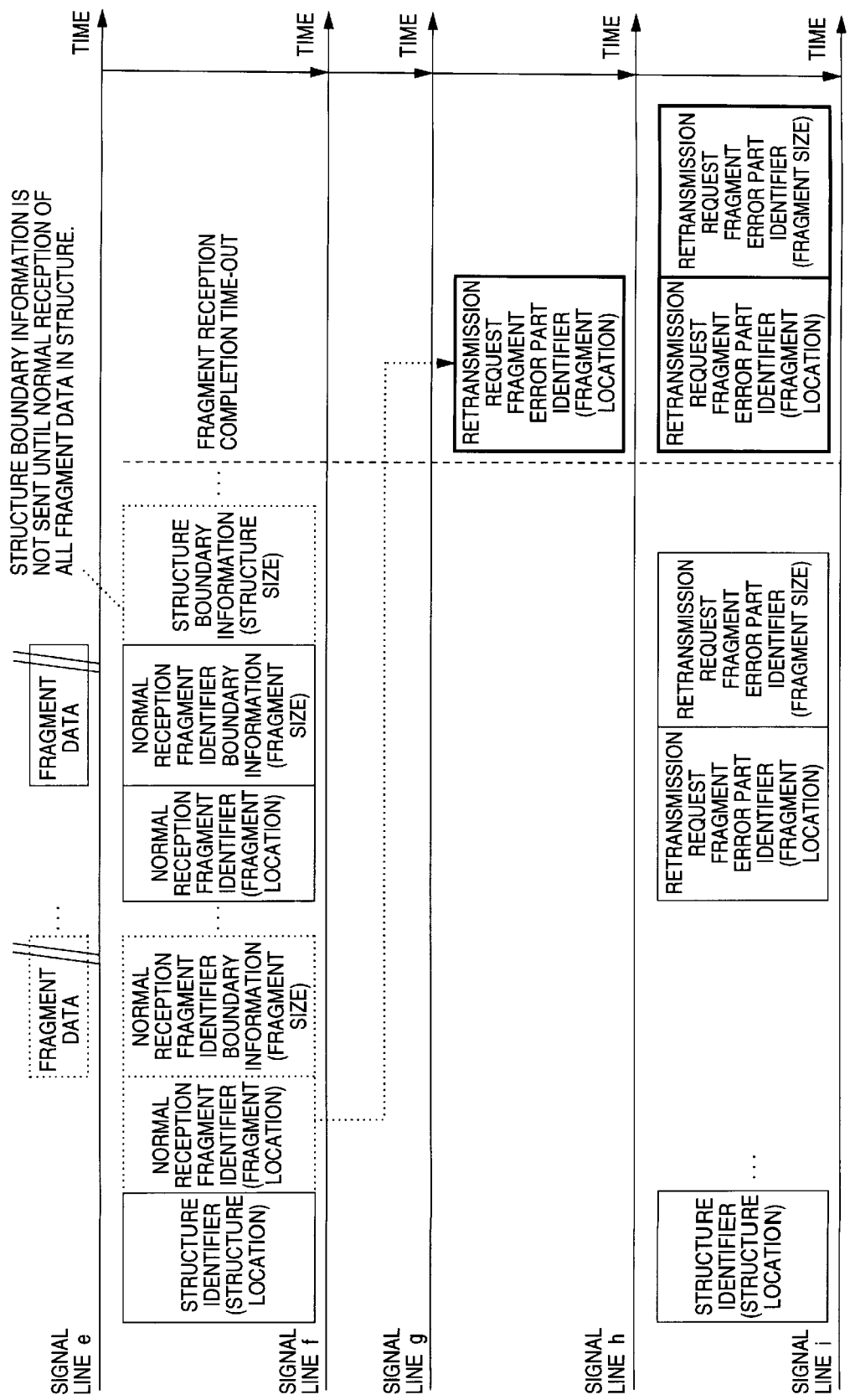
FIG. 63 is an illustration of the structure reception function in FIG. 55.

If fragment reception time-out is detected based on the locations and size of the normally received fragments, the structure reception function 224 returns the location of the corresponding fragment as a retransmission request fragment error part identifier to the sending data processing apparatus 201 and outputs the location and size of the fragment whose reception timed out to the retransmission request structure identifier memory function 225. FIG. 63 shows an output example of the structure reception function 224 when fragment reception times out.

If reception of the fragment whose reception is incomplete, held in the retransmission request structure identifier memory function 225 again times out, the structure reception function 224 returns the location of the fragment as a retransmission request fragment error part identifier to the sending data processing apparatus 201 and again outputs the location and size of the fragment to the retransmission request structure identifier memory function 225.

The transmission function 226 is similar to that of the first embodiment in FIG. 41.

When inputting the location of the fragment whose reception is incomplete from the structure reception function 224, the retransmission request structure identifier memory function 225 generates the time-out time to again receiving the fragment and holds the time-out time in relation to the fragment identifier.

When inputting the location and size of each normally received fragment from the structure reception function 224, the retransmission request structure identifier memory function 225 discards the information concerning the fragment memorized therein. FIG. 64 shows a format example of the information held in the retransmission request structure identifier memory function 225.

Configuration Example of Structure Marking up Function

Next, a configuration example of the structure marking up function 212 used in the configuration examples of the first and second embodiments will be discussed. First, specific examples of structures in the invention are attached below:

(1) PDL

Drawing processing is applied to structure elements making up a page in an SPDL (standard page description language) defined in ISO/IEC 10180. Therefore, the structure elements can become structures.

For page image data written in graphic commands of GDI (graphic display interface) used for personal computer display, Quick Draw (trademark), etc., and printer control commands of PCL [56], etc., drawing processing is performed at least in command devices. The commands can become structures.

(2) Raster still images

Figure 65:
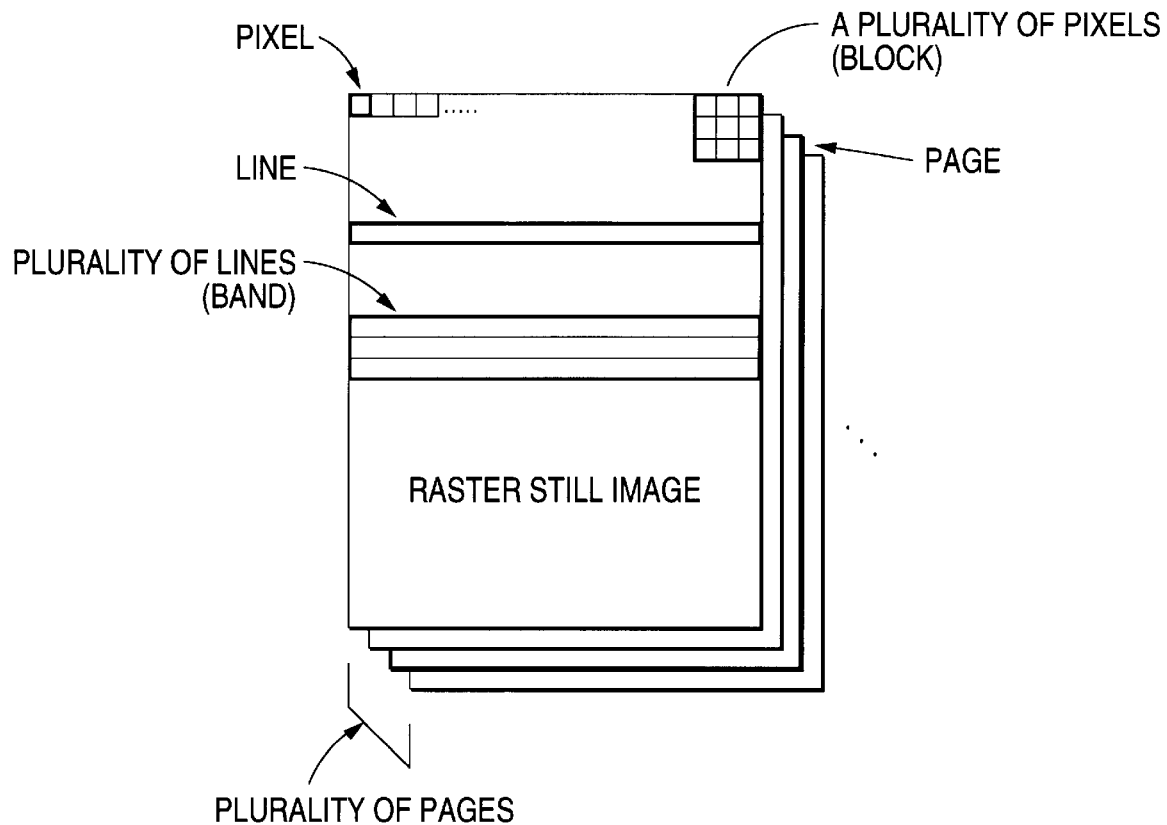
FIG. 65 is an illustration of space devices of a raster still image.

The raster still images have space devices as shown in FIG. 65, namely, a pixel, pixels (block), a line, lines (band), a page, and pages. These devices can become processing devices of image processing application as they are, namely, can become structures. Here, a division image in the raster still image refers to a part of the space image. For example, a division image for the raster still image of a number of pages refers to a page, lines (band), a line, pixels (block), or a pixel; a division image for the raster still image of a page refers to lines (band), pixels (block), or a pixel.

Raster image data is represented by color component values of pixels and the color components can also become processing devices of image processing application, thus can become structures.

Figure 66:
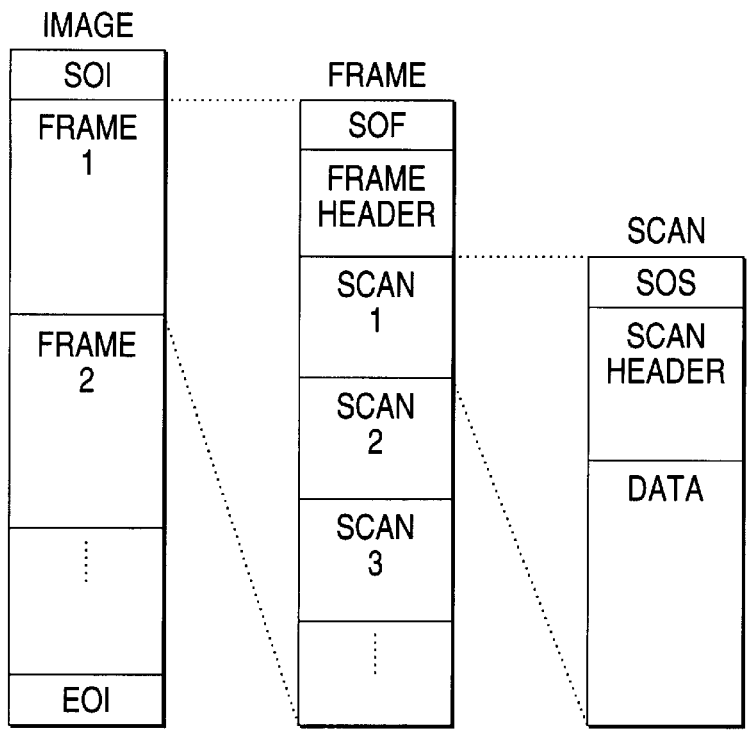
FIG. 66 is an illustration of a compressed data structure using JPEG.

FIG. 66 shows a compressed data structure when JPEG (joint photographic coding experts group), a representative still image coding standard, is used. The data takes three stages of image, frame, and scan and the structure boundaries are recognized according to boundary indicating codes (delimiters) called "marker codes." The image is sandwiched between marker codes called SOI (start of image) and EOI (end of image). The frame begins with a marker code called SOF (start of frame), followed by parameters as a frame header. The scan begins with a marker code called SOS (start of scan), followed by parameters as a scan header, followed by compressed image data.

Figure 67:
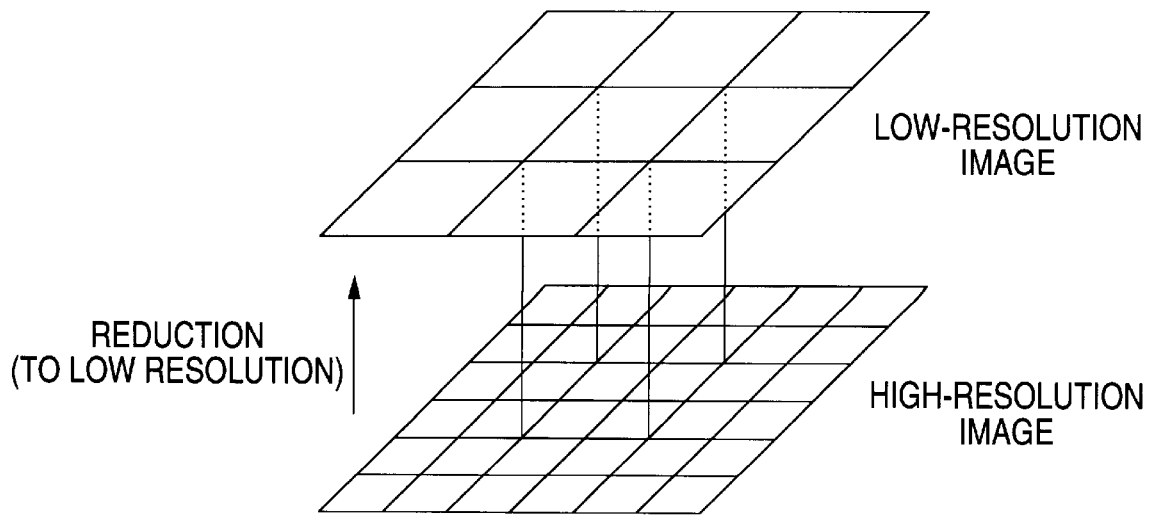
FIG. 67 is an illustration of data layers in JBIG.

The layers when progressive coding is performed can also become structures. For example, high-resolution and low-resolution images in JBIG (joint bi-level image coding experts group) are processed separately in progressive display, thus can become structures. (See FIG. 67.)

On the other hand, generally, raster data read through a scanner in document recognition processing is divided into partial spaces according to features on a layout and recognition processing is performed for the partial spaces by different processing methods according to the partial space type, for example, according to which of tables, images, and characters the partial space is made up of. Therefore, the partial spaces can become structures.

(3) Miscellaneous data formats

In MIME (Multipurpose Internet Message Extensions) messages defined in RFC1522, visualization processing is applied to objects contained in multipart according to the object type, thus the objects can become processing devices. Therefore, they can become structures. In this case, delimiters become values specified as a boundary attribute. (See FIG. 68.)

In SGML (Standard Generalized Markup Language) defined in ISO 88791, different processing may be applied to portions enclosed by markup tags when allocation processing, etc., is performed. The portions enclosed by markup tags can become structures.

We have discussed various structures. Subsequently, PDL (page description language) will be discussed in more detail. In the description that follows, a page description language provided by extending Interpress (trademark of Xerox USA), a representative page description language, is used.

An Interpress program has a structure as shown in FIG. 69. Header indicates that the program is an Interpress program, that the character code encoding type follows "Xerox" (trademark of Xerox USA) encode, and that the Interpress version is 3.0. BEGIN indicates the beginning of a block and END indicates the end of the block. The portion enclosed in {} is called a body. Interpress instructions can be described in the body. The body following BEGIN is called a preamble, wherein instructions common to the block are defined. The body following the preamble is called a page body representing page separation. Therefore, the Interpress program in FIG. 69 represents a 3-page program.

Arguments to the Interpress instructions are transferred mainly with a stack. The representative instructions (options) are as follows (for details, refer to Harrington, S. J., Buckley, R. R.: "Interpress, The Source Book—The Document and Page Description Language for Performance Printing-," Brady (1988)):

MOVETO: Generates an empty trajectory with coordinates of two numeric values on a stack as the end point.

LINETO: Adds a line to a trajectory from the end point of the trajectory to two numeric values on a stack. The end point of the trajectory becomes the end point of the line.

CURVETO: Adds to a trajectory, a Bezier Curve with the end point of the trajectory and three numeric values on a stack as control points. The end point of the trajectory becomes the end point of the Bezier Curve.

MASKSTROKE: Draws a trail along a trajectory.

MASKFILL: Fills a trajectory.

SHOW: Draws one character string on a stack from the current point.

MASKPIXEL: Draws a pixel array on a stack.

FIG. 70 shows an example of an Interpress program and the execution result of the program. The program on the left of FIG. 70 will be discussed. The first line of the program is Header previously described. BEGIN on the second line represents the beginning of a block, which is a program block, and the third line indicates an empty preamble. On the fourth line, a body begins and the fifth to twelfth lines enable 18-point font to be used with the name "xerox, XC1-1-1, times". On the thirteenth to fifteenth lines, a character string of ABC is drawn starting at the position of X coordinate 0.1 and Y coordinate 0.1. On the sixteenth to twenty-first lines, a square of the 1-side size 0.1 meters with (0.1, 0.2), (0.1, 0.3), (0.2, 0.3), and (0.2, 0.2) as vertexes is drawn.

In the example in FIG. 70, the options MOVETO, LINETO, and CURVETO are options for constructing data representing a graphic form and the options MASKSTROKE and SHOW are options for embodying the constructed graphic form. Thus, in the PDL, the options classified into several categories are combined for constructing one graphic form, from which a processing structure is formed.

Thus, when input document data is a document in the page description program format, a program text is scanned for detecting the delimiters of each body ("{" and "}"), whereby processing structures can be marked up. The body following the preamble is called a page body and the delimiters represent page separation.

If command data only is listed and image data is not contained in the PDL as in the example in FIG. 70, the processing structure data amount (structure data amount) lessens. In such a case, data of a number of processing structures also containing those other than PDL structures may be collected into one group handled as one structure data piece for improving the throughput.

Next, another PDL example will be discussed in more detail. In the description that follows, PostScript language of Adobe Apparatuses, a representative page description language, is used.

Figure 71:
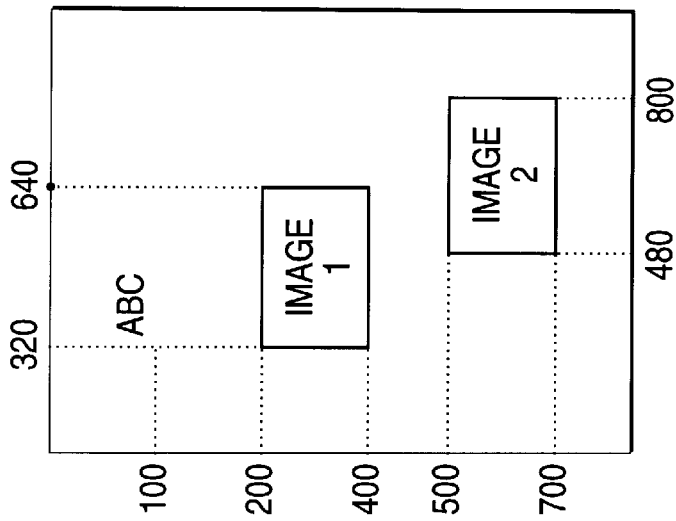
FIG. 71 is an illustration of an example of document data in a page description language format.

A PostScript program has a structure as shown in FIG. 71. The first line indicates that the program is a PostScript program and that the PostScript DSC (document structure convention) version is 3.0. The second line represents that the program is a 3-page document. %%Page: XX represents the start of the X-th page.

Arguments to the PostScript instructions are transferred mainly with a stack. The representative instructions (options) are as follows (for details, refer to "PostScript Reference Manual Second Edition," ASCII Shuppan Kyoku (1991)):

moveto: Sets coordinates of two numeric values on a stack to the current point.

lineto: Adds a line to a path from the end point of the path to two numeric values on a stack. The end point of the path becomes the end point of the line.

curveto: Adds to a path, a Bezier Curve with the end point of the path and three numeric values on a stack as control points. The end point of the path becomes the end point of the Bezier Curve.

stroke: Draws a trail along a path.

fill: Fills a path.

show: Draws one character string on a stack from the current point.

image: Draws a pixel array.

Figures 72, 73:
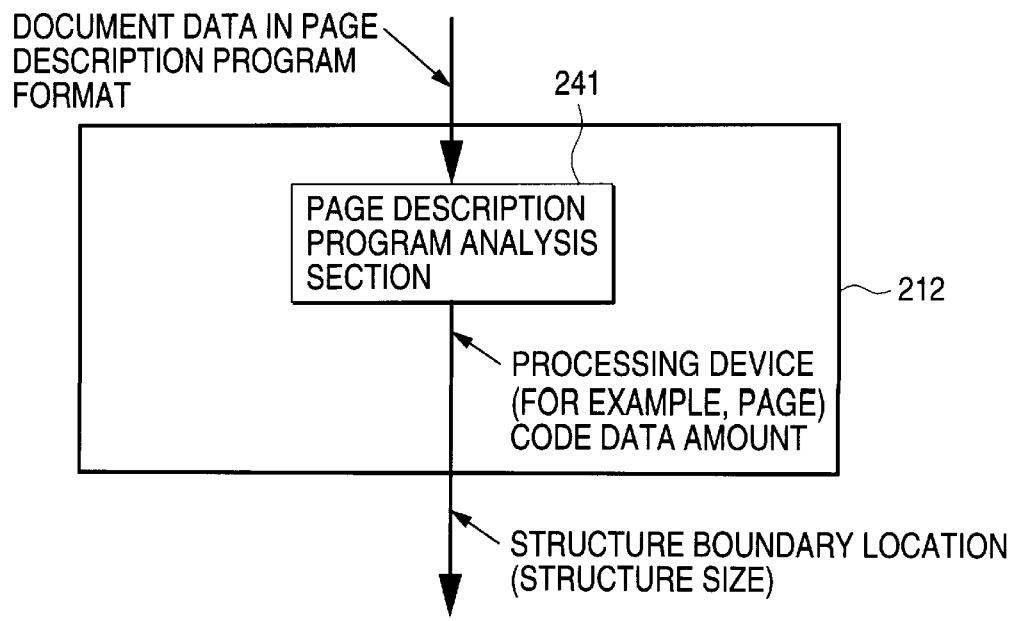
FIG. 72 is an illustration of an example of document data in a page description language format.
FIG. 73 is an illustration of a configuration example of the structure marking up function of the embodiments.

FIG. 72 shows an example of a PostScript program and the execution result of the program. The program on the left of FIG. 72 will be discussed. The first line of the program indicates that the program is a PostScript program and that the PostScript DSC (document structure convention) version is 3.0. The second line moves the current point to coordinates (320100). The third line draws character string "ABC" starting at the position of the current point. The fourth to tenth lines and the eleventh to seventeenth lines specify data input formats by the filter options and draw image data like output images on the right of FIG. 71 by the image options. Thus, in the PDL, the options classified into several categories are combined for forming a processing structure. Thus, when input document data is a document in the page description program format, a program text is scanned for detecting the delimiters, whereby processing structures can be marked up.

If not only a list of command data, but also image data is contained even for a PDL document as shown in FIG. 72, the structure data amount increases and transmission security and retransmission processing are performed at structure data device timing, whereby the transmission throughput is improved.

Next, a configuration example of the main part of the structure marking up function 212 will be discussed. In the description to follow, only data input to the structure marking up function 212 and control information output therefrom are illustrated. FIG. 73 shows the configuration example, wherein when input document data is a document in the page description program format, the structure size is output as document structure information.

In FIG. 73, a page description program analysis section 241 scans the input document data in the page description program format, detects the delimiters of a page body, and outputs the code data amount of the page body. It may detect only the top delimiter of contiguous structure data and mark up structure data rather than detecting both the top and last delimiters of structure data (the page body of each page) for marking up the structure data.

Figure 74:
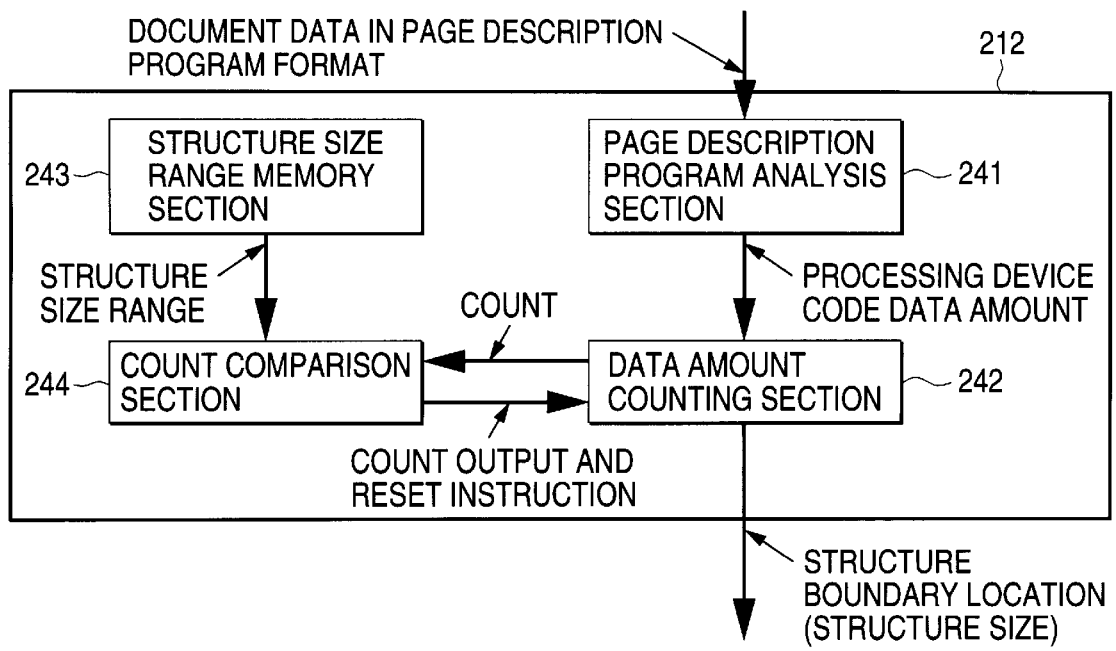
FIG. 74 is an illustration of another configuration example of the structure marking up function of the embodiments.

FIG. 74 shows a second configuration example of the structure marking up function 212. In the configuration example, when input document data is a document in the page description program format, a structure size is output as document structure information based on the page description program document data processing boundaries and the structure size limit values.

That is, to set the structure size to the lower limit value or more, the sending data transmission apparatus sends a number of structure data pieces as new structure data. The subsequent processing handles the new structure data like conventional structure data. Further, the receiving data transmission apparatus can handle the received structure data (in fact, a number of structure data pieces) as one structure data piece.

The new structure data is a cluster of contiguous structure data pieces in one file and can be set to the size of the lower limit value or more. The new structure data is a collection of a number of processing devices in the processing apparatus and processing is complete in the new structure data piece.

Here, assuming that the transmission and reception delay time is T and that the target band is S, the lower limit value can be represented as T×S. For example, if the delay time is 10 ms and the target band is 1 GBPS, the lower limit value results in 10 MB.

The upper limit value depends on the resource amounts and performance of the sending and receiving data transmission apparatuses, because if 100-MB data is sent to the receiving data transmission apparatus having only a 10-MB memory, for example, the receiving data transmission apparatus cannot process the data.

A specific description will be attached based on FIG. 74.

In FIG. 74, a page description program analysis section 241 scans the input document data in the page description program format, detects the delimiters of each body for marking up a processing device, and outputs the code data amount of the processing device to a data amount counting section 242, which then adds up the code data amounts of the processing devices output from the page description program analysis section 241.

A structure size range memory section 243 stores values in a proper range as the size of an output structure from the structure marking up function 212. In the invention, the transfer throughput depends on the structure size, thus the lower limit value of the structure size fitted to the required throughput becomes necessary. Since infinite enlarging the structure size results in a structure transfer delay and an increase in the structure memory capacity, the upper limit value of a proper structure size fitted to the apparatus requirements is also required.

A count comparison section 244 compares the count of the code data amounts of the processing devices added up by the data amount counting section 242 with the output structure size limit value memorized in the structure size range memory section 243. If the count is a proper value, the count comparison section 244 instructs the data amount counting section 242 to output the count at the point in time and reset the count. In response to the instruction, the data amount counting section 242 outputs and resets the count. As a result, the structure marking up function 212 outputs a structure provided by collecting one or more page description program processing devices to a proper size.

Figure 75:
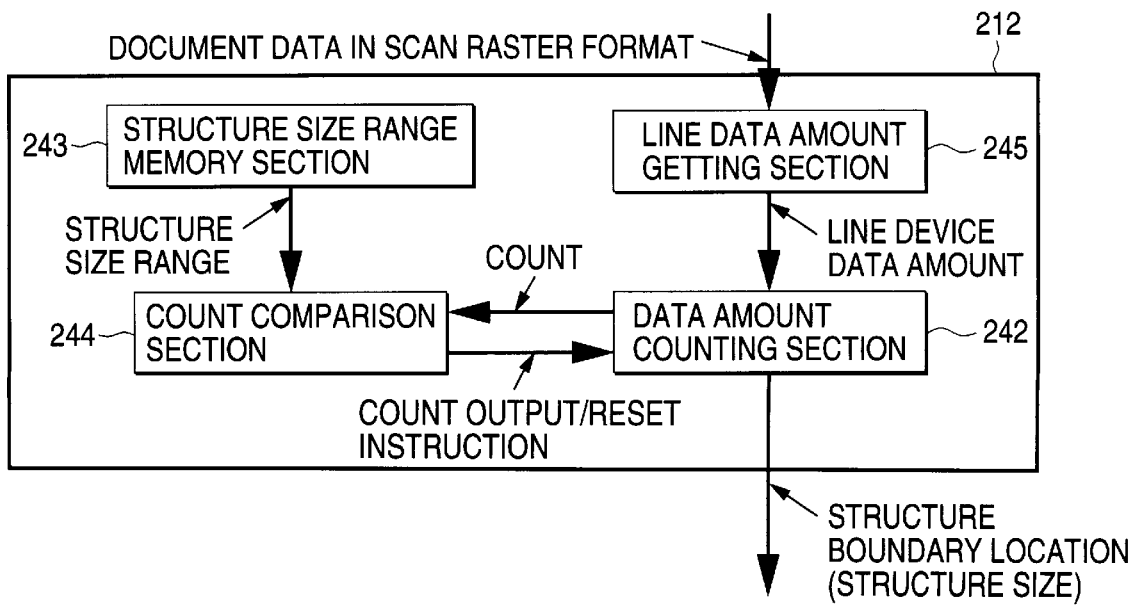
FIG. 75 is an illustration of another configuration example of the structure marking up function of the embodiments.

FIG. 75 shows a configuration example of the structure marking up function 212 used when input document data is a document in the scan raster format. As shown in this example, when input document data is a document in the scan raster format, the data amounts per pixel, scan line, and page are fixed and processing structures can be easily marked up. In the example, a structure is marked up with scan lines as the minimum devices. In FIG. 75, a line data amount getting section 245 marks up a line device and outputs the data amount of the line device to a data amount counting section 242. A count comparison section 244 compares the count of the code data amounts of the line devices added up by the data amount counting section 242 with the output structure size limit value memorized in a structure size range memory section 243. If the count is a proper value, the count comparison section 244 instructs the data amount counting section 242 to output the count at the point in time and reset the count. In response to the instruction, the data amount counting section 242 outputs and resets the count. As a result, the structure marking up function 212 outputs a structure provided by collecting data in line devices to a proper size.

Structure data may be provided for each page based on the data amount of the page or the data amount of the page may be compared with that of a half, quarter, or eighth of the page to provide structure data in 2-, 4-, or 8-division devices. Preferably, the structure data type or format is changed depending on the data amount. If the data amount in page devices becomes large, preferably structure data is provided in division devices.

All image data such as image data described in a PDL and raster image data read through a scanner is structure files. In addition, some data such as CAD data has structures in drawing devices; the invention is applied to various types of data.

In the conventional apparatus for making transfer acknowledgement in transmission structure devices attached for transmission independently of the transmission data amount, when a large amount of data is transmitted, constant throughput results. The throughput value becomes about several Mbytes/sec in the range of several kilometers and cannot be applied to service requiring a more transmission distance or throughput.

In contrast, according to the embodiments, the upper limit of throughput varies in response to data amount for each structure of transmission data (see FIG. 76.) Generally, high throughput is required for service for handling large-capacity data. For large-capacity data, the data amount for each structure is also large, thus throughput adaptive to service can be provided. Moreover, the throughput value can be accomplished to about several hundreds of Mbytes/sec even between points tens of thousands of kilometers distant from each other. (See FIG. 77.) Therefore, the embodiments enable high-speed, high-definition print service requiring unprecedented high throughput, for example.

Figure 78:
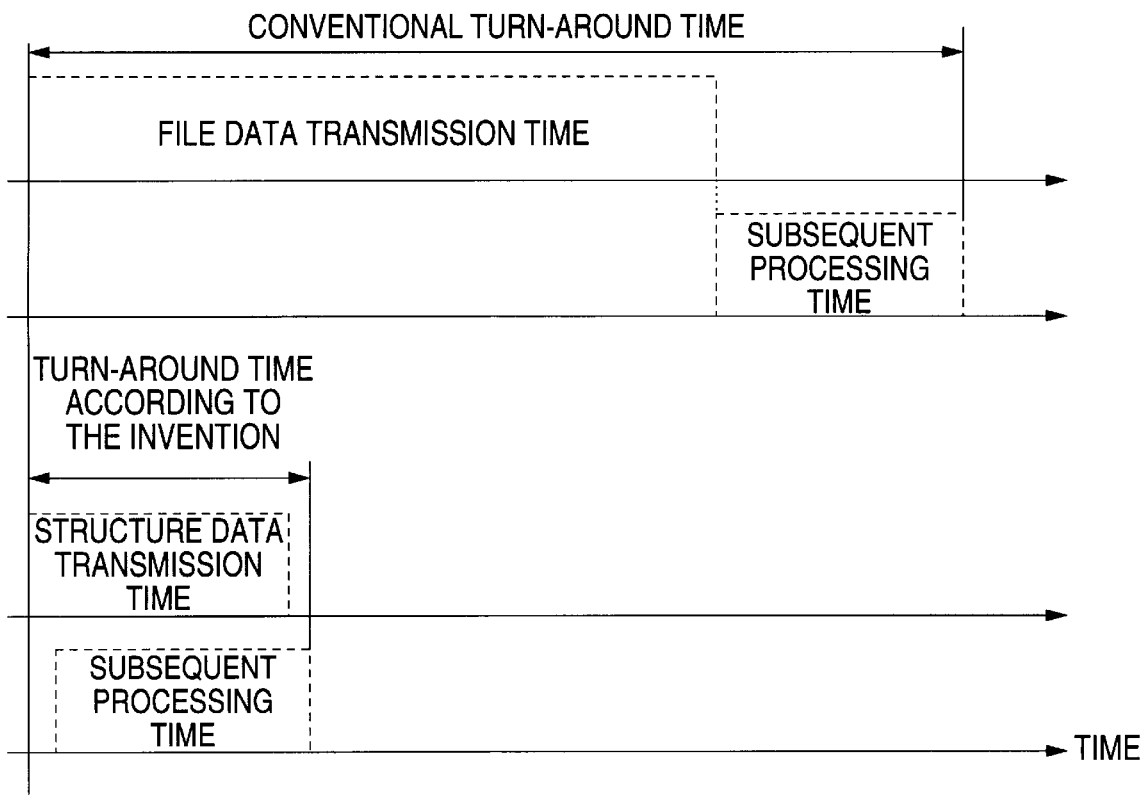
FIG. 78 is an illustration of effect estimation of the embodiments from the viewpoint of the turn-around time.

Since the conventional apparatus handles structure files like non-structure files, subsequent processing cannot be started at the receiver until transmission of data in a file is complete and the file is recomposed. The file transmission time is contained in the turn-around time between the transmission start at the transmitting station and the processing termination at the receiver. A file, particularly an image data file may extend to several Gbytes; high throughput is provided, whereby the structure data transmission time is shortened, and subsequent processing can be started with structure devices memorized, so that the turn-around time can also be shortened. (See FIG. 78.)

As we have discussed, according to the invention, as the data amount for each structure of transmission data increases, the upper limit of throughput grows. Generally, high throughput is required for service for handling large-capacity data. For large-capacity data, the data amount for each structure is also large, thus throughput adaptive to service can be provided. Since subsequent processing can be started with structure devices memorized, the turn-around time can be shortened.

What is claimed is:

1. A data transmission apparatus comprising:
   memory means for storing at least one structure data piece of a data processing device in a receiving data processing apparatus;
   transmission error detection code computation means for computing a transmission error detection code from the at least one structure data piece stored in said memory means;
   attaching means for attaching the transmission error detection code computed by said transmission error detection code computation means to the at least one structure data piece stored in said memory means;
   transmitting means for transmitting to the receiving data processing apparatus, the at least one structure data to which the transmission error detection code is attached;
   reception means for receiving a retransmission request for each return structure data piece returned from the receiving data processing apparatus when a transmission error is detected based on the transmission error detection code and the at least one structure data piece transmitted by said transmission means; and
   retransmission means for retransmitting a corresponding structure data piece to the receiving data processing apparatus in response to the retransmission request for each return structure data piece received by said reception means.

2. The data transmission apparatus of claim 1, further comprising:
   second memory means for storing a correspondence between structure data and a memory location of the structure data in said memory means, wherein
   said retransmission means is responsive to the retransmission request for retransmitting structure data to be retransmitted based on the correspondence between the structure data and the memory location of the structure data, stored in said second memory means.

3. A data transmission apparatus comprising:
   memory means for storing a file containing at least one structure data piece of a data processing device in a receiving data transmission apparatus;
   structure data marking up means for marking up structure data from the file stored in said memory means;
   transmission error detection code computation means for computing a transmission error detection code from the structure data marked up by said structure data marking up means;
   attachment means for attaching the transmission error detection code computed by said transmission error detection code computation means to the structure data marked up by said structure data marking up means;
   transmission means for transmitting the structure data to which the transmission error detection code is attached, to the receiving data transmission apparatus;
   reception means for receiving a retransmission request for each return structure data piece returned from the receiving data transmission apparatus when a transmission error is detected based on the transmission error detection code and structure data transmitted by said transmission means; and
   means responsive to the retransmission request for each return structure data piece received by said reception means for retransmitting the corresponding structure data piece to the receiving data transmission apparatus.

4. The data transmission apparatus of claim 3, wherein the at least one structure data piece in the file stored in said memory means in said data transmission apparatus begins with a top delimiter of a data separation indication code, and wherein
   said structure data marking up means marks up data between the top delimiter of the at least one structure data and a top delimiter of the next structure data in the file stored in said memory means, thereby marking up the at least one structure data.

5. The data transmission apparatus of claim 3, wherein the at least one structure data in the file stored in said memory means in said data transmission apparatus begins with a first delimiter of a data separation indication code and ends with a second delimiter, and wherein said structure data marking up means marks up data between the first delimiter and the second delimiter in the file stored in said memory means, thereby marking up the at least one structure data.

6. The data transmission apparatus of claim 5, wherein the file stored in said memory means in said data transmission apparatus is a document file described in a page description language, wherein
the first delimiter of the at least one structure data is a delimiter indicating the top of a page, and wherein
the second delimiter of the at least one structure data is a delimiter indicating the end of a page.

7. The data transmission apparatus of claim 3, wherein the file stored in said memory means in said data transmission apparatus is a document image file consisting of a plurality of pages, and wherein
said structure data marking up means marks up a document image in the document image file stored in said memory means, thereby marking up the at least one structure data.

8. The data transmission apparatus of claim 3, wherein the file stored in said memory means is a document image file consisting of a plurality of division images, and wherein
said structure data marking up means marks up an image in division image devices in the document image file stored in said memory means, thereby marking up the structure data.

9. The data transmission apparatus of claim 3, wherein the file stored in said memory means is a document image file consisting of image data for each color component, and wherein
said structure data marking up means marks up an image in color component devices in the document image file stored in said memory means, thereby marking up the structure data.

10. The data transmission apparatus of claim 3, wherein the file stored in said memory means contains location information of structure data in the file, and wherein
said structure data marking up means marks up structure data in response to the location information in the file stored in said memory means.

11. The data transmission apparatus of claim 3, wherein the file stored in said memory means is a document image file coded in layers, and wherein
said structure data marking up means marks up coded data for each layer in the document image file stored in said memory means, thereby marking up the structure data.

12. A data transmission apparatus comprising:
memory means for storing a file containing at least one primary structure data piece of a data processing device in a receiving data processing apparatus;
structure data marking up means for marking up a plurality of primary contiguous structure data pieces from the file stored in said memory means as secondary structure data;
transmission error detection code computation means for computing a transmission error detection code from the secondary structure data marked up by said structure data marking up means;
transmission error detection code attaching means for attaching the transmission error detection code computed by said transmission error detection code computation means to the secondary structure data marked up by said structure data marking up means;
transmission means for transmitting the secondary structure data to which the transmission error detection code is attached by said transmission error detection code attaching means to the receiving apparatus;
reception means for receiving a retransmission request for each secondary structure data piece returned from the receiving apparatus when a transmission error is detected based on the transmission error detection code and secondary structure data transmitted by said transmission means; and
retransmission means for retransmitting a corresponding secondary structure data piece to the receiving apparatus in response to the retransmission request for each secondary structure data piece received by said reception means.

13. A data transmission apparatus comprising:
data processing means for processing data;
reception means for receiving, from a sending apparatus, structure data to which a transmission error detection code is attached;
detection means for detecting a transmission error based on the transmission error detection code and structure data received by said reception means;
retransmission request creation means for creating a retransmission request for structure data when a transmission error is detected by said transmission error detection means for each structure data piece; and
transmission means for returning, to the sending apparatus, the retransmission request created by said retransmission request creation means.

14. The data transmission apparatus of claim 13, wherein the structure data received by said reception means begins with a delimiter of a data separation indicator code, and wherein
said reception means receives data between the top delimiter of structure data and that of a next structure data as structure data.

15. The data transmission apparatus of claim 13, wherein the structure data received by said reception means begins with a top delimiter of a data separation indicator code and ends with an end delimiter, and wherein
said reception means receives data between the top delimiter and the end delimiter as structure data.

16. The data transmission apparatus of claim 13, further comprising:
control means for causing said data processing means to start processing when structure data having no error detected by said transmission error detection means is received.

17. A data transmission apparatus comprising:
a sending data transmission apparatus for transmitting data,
a receiving data transmission apparatus for receiving the data transmitted from said sending data transmission apparatus, and
a data processing apparatus for processing the data received by said receiving data transmission apparatus, wherein
said sending data transmission apparatus comprises:
memory means for storing at least one structure data piece of a data processing device in a receiving data processing apparatus;
transmission error detection code computing means for computing a transmission error detection code from the structure data stored in said memory means;
transmission error detection code attaching means for attaching the transmission error detection code computed by said transmission error detection code computation means to the structure data stored in said memory means; and
transmission means for transmitting the structure data to which the transmission error detection code is attached by said transmission error detection code attaching means to the receiving apparatus, and wherein
said receiving data transmission apparatus comprises:
reception means for receiving structure data to which the transmission error detection code is attached, transmitted by said transmission means in said sending data transmission apparatus;
transmission error detection means for detecting a transmission error based on the transmission error detection code and the structure data received by said reception means;
retransmission request creation means for creating a retransmission request of structure data when a transmission error is detected by said transmission error detection means for each structure data piece; and
second transmission means for returning the retransmission request created by said retransmission request creation means to the sending apparatus, said sending data transmission apparatus, further includes:
retransmission request reception means for receiving a retransmission request for each structure data piece returned from the second transmission means; and
means responsive to the retransmission request received by said retransmission request reception means for retransmitting a corresponding structure data piece to the receiving apparatus.

18. A data transmission apparatus comprising:
memory means for storing at least one structure data piece of a data processing device in a receiving apparatus;
transmission device data division means for dividing structure data stored in said memory means into transmission device data for each device capacity applied when the structure data is transmitted;
transmission error detection code computation means for computing a transmission error detection code from the transmission device data into which the structure data is divided by said transmission device data division means;
transmission error detection code attaching means for attaching the transmission error detection code computed by said transmission error detection code computation means to the transmission device data into which the structure data is divided by said transmission device data division means;
transmission means for transmitting, to the receiving apparatus, the transmission device data to which the transmission error detection code is attached by said transmission error detection code attaching means;
retransmission request reception means for receiving a retransmission request containing an identification code of transmission device data in the structure data returned from the receiving apparatus when a transmission error is detected based on the transmission error detection code and transmission device data transmitted by said transmission means; and
retransmission means, responsive to the identification code in the structure data in the retransmission request received by said reception means, for retransmitting transmission device data corresponding to the identification code to the receiving apparatus.

19. A sending data transmission apparatus comprising:
memory means for storing a file containing at least one structure data piece of a data processing device in a receiving apparatus;
structure data marking up means for marking up structure data from the file stored in said memory means;
transmission device data division means for dividing the structure data marked up by said structure data marking up means into transmission device data for each device capacity applied when the structure data is transmitted;
transmission error detection code computation means for computing a transmission error detection code from the transmission device data into which the structure data is divided by said transmission device data division means;
transmission error detection code attaching means for attaching the transmission error detection code computed by said transmission error detection code computation means to the transmission device data into which the structure data is divided by said transmission device data division means;
transmission means for transmitting the transmission device data to which the transmission error detection code is attached by said transmission error detection code attaching means, to the receiving apparatus;
reception means for receiving retransmission request containing an identification code of the transmission device data in the structure data returned from the receiving apparatus when a transmission error is detected based on the transmission error detection code and transmission device data transmitted by said transmission means; and
means responsive to the identification code in the structure data in the retransmission request received by said reception means for retransmitting the transmission device data corresponding to the identification code to the receiving apparatus.

20. The sending data transmission apparatus of claim 19, wherein
the structure data in the file stored in said memory means in said sending data transmission apparatus begins with a top delimiter of a data separation indication code, and
wherein
said structure data marking up means marks up data between the top delimiter of the structure data and that of a next structure data in the file stored in said memory means, thereby marking up the structure data.

21. The sending data transmission apparatus of claim 19, wherein
the structure data in the file stored in said memory means in said sending data transmission apparatus begins with a delimiter of a data separation indicator code and ends with a delimiter, and
wherein
said structure data marking up means marks up data between a top delimiter and a corresponding end delimiter in the file stored in said memory means, thereby marking up the structure data.

22. The sending data transmission apparatus of claim 31, wherein
the file stored in said memory means in said sending data transmission apparatus is a document file described in a page description language, wherein
the top delimiter of the structure data is a delimiter indicating the top of a page, and wherein
the end delimiter of the structure data is a delimiter indicating the end of a page.

23. A receiving data transmission apparatus comprising:
data processing means for processing data;
reception means for receiving transmission device data of a transmission device capacity to which a transmission error detection code is attached, transmitted from a sending apparatus;

transmission error detection means for detecting a transmission error based on the transmission device data and the transmission error detection code received by said reception means;

retransmission request creation means for creating a retransmission request containing an identification code in the structure data when a transmission error is detected by said transmission error detection means;

transmission means for returning the retransmission request, created by said retransmission request creation means, to the sending apparatus;

memory means for storing the transmission device data received by said reception means; and structure data creation means for creating structure data from a plurality of transmission device data pieces stored in said memory means.

24. The receiving data transmission apparatus of claim 23, wherein at least one transmission device data piece received by said reception means in said receiving data transmission apparatus contains a top delimiter of a data separation indication code at a top of the structure data, and wherein said structure data creation means creates structure data from data between the top delimiter and a next delimiter in a plurality of transmission device data pieces stored in said memory means.

25. The receiving data transmission apparatus of claim 23, wherein at least one transmission device data piece received by said reception means in said receiving data transmission apparatus contains a top delimiter of a data separation indication code at a top of the structure data and at least another transmission device data piece contains an end delimiter at an end of the structure data, and wherein said structure data creation means creates structure data from data between the top delimiter and the end delimiter in a plurality of transmission device data pieces stored in said memory means.

26. The receiving data transmission apparatus of claim 25, wherein the top delimiter of the structure data received by said reception means in said receiving data transmission apparatus is a delimiter indicating the top of a page in a page description language and the end delimiter of the structure data is a delimiter indicating the end of a page.

27. The sending data transmission apparatus of claim 19 or 23, further comprising:

second memory means for storing a correspondence between structure data and a memory location of the structure data in said memory means, wherein said retransmission means is responsive to the retransmission request for retransmitting structure data to be retransmitted based on the correspondence between the structure data and the memory location of the structure data, stored in said second memory means.

28. A data transmission apparatus comprising:

memory means for storing a file containing at least one primary structure data piece of a data processing device in a receiving apparatus;

structure data marking Up means for marking up a plurality of primary contiguous structure data pieces from the file stored in said memory means as secondary structure data;

transmission device data division means for dividing the secondary structure data marked up by said structure data marking up means into transmission device data for each device capacity applied when the secondary structure data is transmitted;

transmission error detection code computation means for computing a transmission error detection code from the transmission device data into which the structure data is divided by said transmission device data division means;

transmission error detection code attaching means for attaching the transmission error detection code computed by said transmission error detection code computation means to the transmission device data into which the structure data is divided by said transmission device data division means;

transmission means for transmitting to the receiving apparatus, the transmission device data to which the transmission error detection code is attached by said transmission error detection code attaching means;

reception means for receiving a retransmission request containing an identification code of the transmission device data in the secondary structure data returned from the receiving apparatus when a transmission error is detected based on the transmission error detection code and transmission device data transmitted by said transmission means; and retransmission means responsive to the identification code in the secondary structure data in the retransmission request received by said reception means for retransmitting the transmission device data corresponding to the identification code to the receiving apparatus.

29. A data transmission apparatus comprising:

a sending data transmission apparatus for transmitting data, a receiving data transmission apparatus for receiving the data transmitted from said sending data transmission apparatus, and a data processing apparatus for processing the data received by said receiving data transmission apparatus, wherein said sending data transmission apparatus comprises:

memory means for storing at least one structure data piece of a data processing device in the data processing apparatus;

transmission device data division means for dividing structure data stored in said memory means into transmission device data for each device capacity applied when the structure data is transmitted;

transmission error detection code computation means for computing a transmission error detection code from the transmission device data into which the structure data is divided by said transmission device data division means;

transmission error detection code attaching means for attaching the transmission error detection code computed by said transmission error detection code computation means to the transmission device data into which the structure data is divided by said transmission device data division means; and first transmission means for transmitting the transmission device data to which the transmission error detection code is attached by said transmission error detection code attaching means to the receiving apparatus, and wherein said receiving data transmission apparatus comprises:

first reception means for receiving transmission device data of a transmission device capacity to which the transmission error detection code is attached, transmitted by said first transmission means in said sending data transmission apparatus;

transmission error detection means for detecting a transmission error based on the transmission device data and transmission error detection code received by said first reception means;

retransmission request creation means for creating a retransmission request containing an identification code in the structure data when a transmission error is detected by said transmission error detection means;

second transmission means for returning the retransmission request created by said retransmission request creation means to said sending data transmission apparatus;

second memory means for storing the transmission device data received by said reception means; and structure data creation means for creating structure data from a plurality of transmission device data pieces stored in said second memory means, said sending data transmission apparatus further comprises:

second reception means for receiving retransmission request containing an identification code of the transmission device data in the structure data returned from said transmission means in said receiving data transmission apparatus; and retransmission means responsive to the identification code in the structure data in the retransmission request received by said second reception means for retransmitting the transmission device data corresponding to the identification code to said receiving data transmission apparatus.

30. A method for transmitting data from a sending data transmission apparatus to a receiving data transmission apparatus over a transmission line, said method comprising the steps of:

storing, in said sending data transmission apparatus, at least one structure data piece of a data processing device in a receiving data processing apparatus;

computing a transmission error detection code from the stored structure data in said sending data transmission apparatus;

attaching the computed transmission error detection code to the stored structure data in said sending data transmission apparatus;

transmitting the structure data to which the transmission error detection code is attached over said transmission line to said receiving data transmission apparatus;

receiving, in said receiving data transmission apparatus, structure data to which the transmission error detection code is attached;

detecting a transmission error based on the transmission error detection code and structure data;

creating a retransmission request of structure data wherein a transmission error is detected for each structure data piece in said receiving data transmission apparatus;

returning the retransmission request to said sending data transmission apparatus over said transmission line;

receiving the retransmission request for each structure data piece returned over said transmission line; and responding to the retransmission request for each structure data piece for retransmitting a corresponding structure data piece to the receiving apparatus.

31. A method for transmitting data from a sending data transmission apparatus to a receiving data transmission apparatus over a transmission line, said method comprising the steps of:

storing, in said sending data transmission apparatus, at least one structure data piece of a data processing device in a receiving data processing apparatus;

dividing the stored structure data into transmission device data for each device capacity applied when the structure data is transmitted;

computing a transmission error detection code from the transmission device data into which the structure data is divided;

attaching the computed transmission error detection code to the transmission device data into which the structure data is divided;

transmitting the transmission device data to which the transmission error detection code is attached over said transmission line to said receiving data transmission apparatus;

receiving, in said receiving data transmission apparatus, transmission device data of a transmission device capacity to which a transmission error detection code is attached;

detecting a transmission error based on the received transmission device data and transmission error detection code;

creating a retransmission request containing an identification code of the transmission device data having a detected transmission error in the structure data;

returning the created retransmission request to said sending data transmission apparatus over said transmission line;

storing the received transmission device data in said receiving data transmission apparatus;

creating structure data from a plurality of transmission device data pieces stored in said receiving data transmission apparatus;

receiving the retransmission request containing an identification code of transmission device data in the structure data returned over said transmission line in said sending data transmission apparatus; and responding to the identification code in the structure data in the received retransmission request in said sending data transmission apparatus for retransmitting transmission device data corresponding to the identification code.

32. A method for transmitting data from a sending data transmission apparatus to a receiving data transmission apparatus over a transmission line, said method comprising the steps of:

attaching an error detection code to each first data device and transmitting the resultant data to said receiving data transmission apparatus over said transmission line;

securing data transmission between said sending and receiving data transmission apparatuses for each second data device containing a plurality of the first data devices; and when an error is detected in the first data devices in the second transmission device in said receiving data transmission apparatus, retransmitting the first data device corresponding to the error from said sending data transmission apparatus to said receiving data transmission apparatus over said transmission line after transmission of the second data device containing the error.

* * * * *